(12) United States Patent
Takeuchi et al.

(10) Patent No.: US 6,281,868 B1
(45) Date of Patent: Aug. 28, 2001

(54) DISPLAY

(75) Inventors: Yukihisa Takeuchi, Nishikamo-gun; Tsutomu Nanataki, Toyoake; Iwao Ohwada, Nagoya; Takayoshi Akao, Kasugai, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/230,376

(22) PCT Filed: Mar. 30, 1998

(86) PCT No.: PCT/JP98/01449

§ 371 Date: Jan. 25, 1999

§ 102(e) Date: Jan. 25, 1999

(87) PCT Pub. No.: WO98/54609

PCT Pub. Date: Dec. 3, 1998

(30) Foreign Application Priority Data

May 30, 1997 (JP) .................................................. 9-142284

(51) Int. Cl.[7] ...................................................... G09G 3/36
(52) U.S. Cl. .............................. 345/90; 385/129; 310/328
(58) Field of Search .................................. 345/92, 91, 87, 345/89, 90; 310/328, 330, 331; 385/19, 129, 147

(56) References Cited

U.S. PATENT DOCUMENTS

| | | |
|---|---|---|
| 2,565,514 | 8/1951 | Pajes . |
| 2,997,922 | 8/1961 | Kaprelian . |
| 3,376,092 | 4/1968 | Kushner et al. . |
| 3,698,793 | 10/1972 | Tellerman . |
| 4,113,360 | 9/1978 | Güenter et al. . |
| 5,210,455 * | 5/1993 | Takeuchi et al. .................... 310/328 |
| 5,319,491 | 6/1994 | Selbrede . |
| 5,600,197 * | 2/1997 | Takeuchi et al. .................... 310/328 |
| 5,636,072 | 6/1997 | Shibata et al. . |
| 5,734,373 * | 3/1998 | Rosenberg et al. .................... 345/161 |
| 5,771,321 | 6/1998 | Stern . |
| 5,862,275 * | 1/1999 | Takeuchi et al. ....................... 385/19 |
| 5,953,469 | 9/1999 | Zhou . |
| 6,028,978 * | 2/2000 | Takeuchi et al. .................... 385/147 |
| 6,091,182 * | 7/2000 | Takeuchi et al. .................... 310/330 |
| 6,108,479 * | 8/2000 | Takeuchi et al. .................... 385/129 |

FOREIGN PATENT DOCUMENTS

| | | |
|---|---|---|
| 0 408 305 | 1/1991 | (EP) . |
| 0 675 477 | 10/1995 | (EP) . |
| 7-287176 | 10/1995 | (JP) . |

* cited by examiner

Primary Examiner—Bipin Shalwala
Assistant Examiner—Ricardo Osorio
(74) Attorney, Agent, or Firm—Burr & Brown

(57) ABSTRACT

A switching TFT (thin-film transistor) 40 is disposed closely to an actuator 14 which comprises a lower electrode 28b, a shape holding layer 26, and an upper electrode 28a that are disposed on a vibrator. The upper electrode 28a of the actuator 14 is electrically connected through a contact 44 to a source/drain region 42 of the TFT 40. A gate line 46 and the gate electrode of the TFT 40 are electrically connected to each other through a contact 50. A data line 48 and a source/drain region 52 of the TFT 40 are electrically connected to each other through a contact 54. The TFT 40 may be replaced with a varistor or a piezoelectric relay. If a varistor is used, the off resistance of the varistor is preferably established such that a variation in a voltage applied to the actuator 14 due to a discharge owing to the off resistance in an unselected period is kept within 5%, and the on resistance of the varistor is preferably established such that a voltage applied to the actuator 14 increases to 95% in an effective selected period.

The display apparatus with actuators 14 having shape holding layers has low electric energy consumption and higher raster luminance, and allows wires or interconnections to be formed with ease.

49 Claims, 36 Drawing Sheets

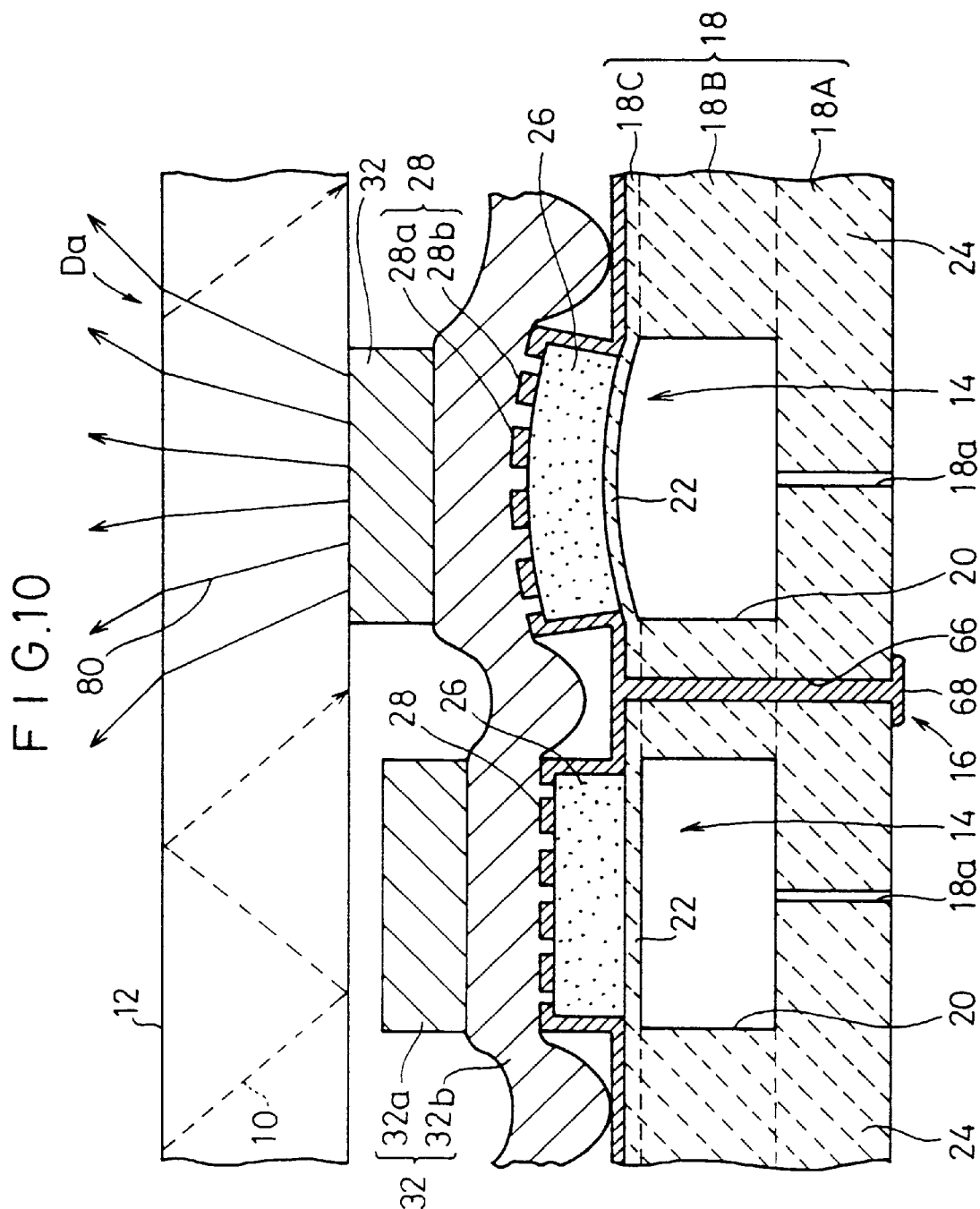

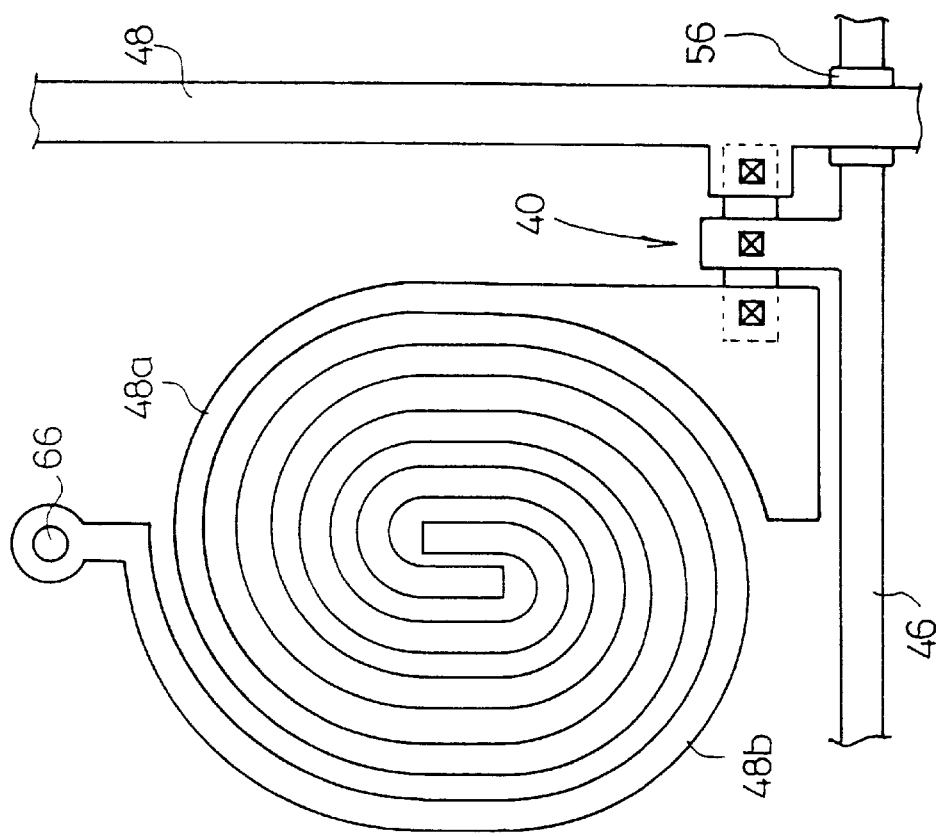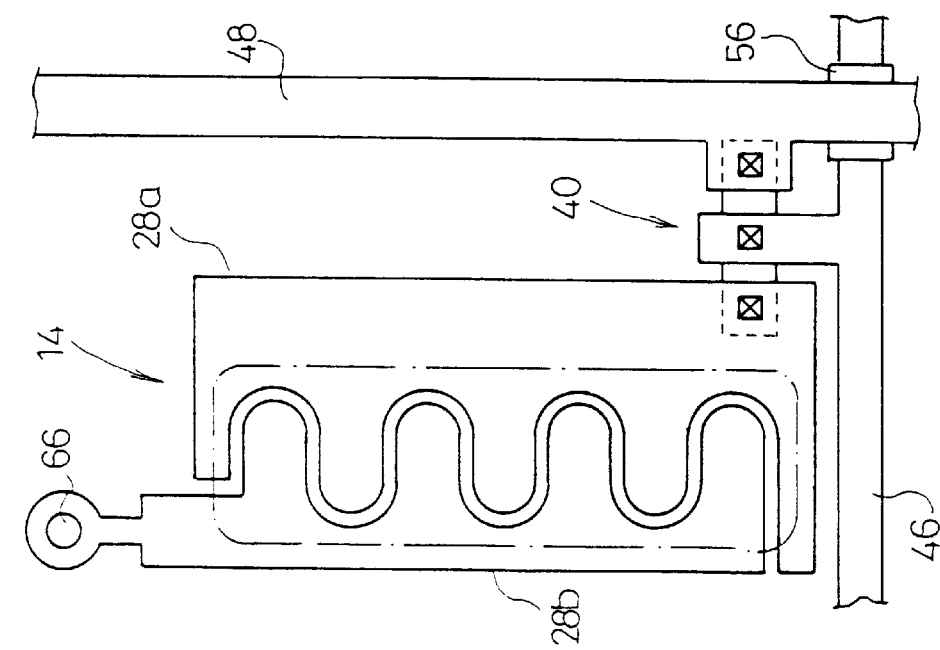

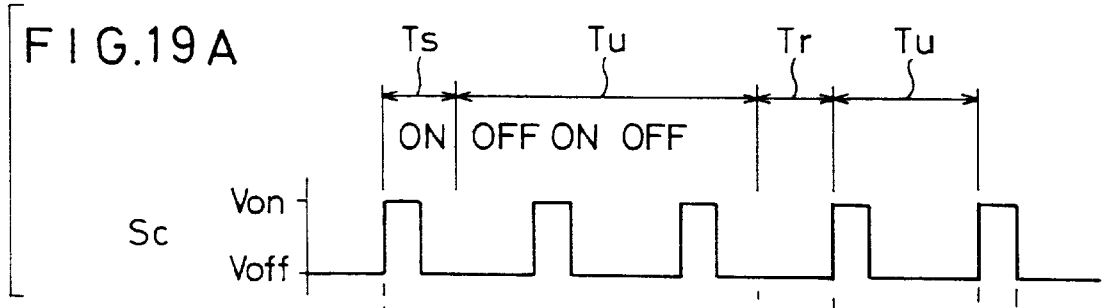
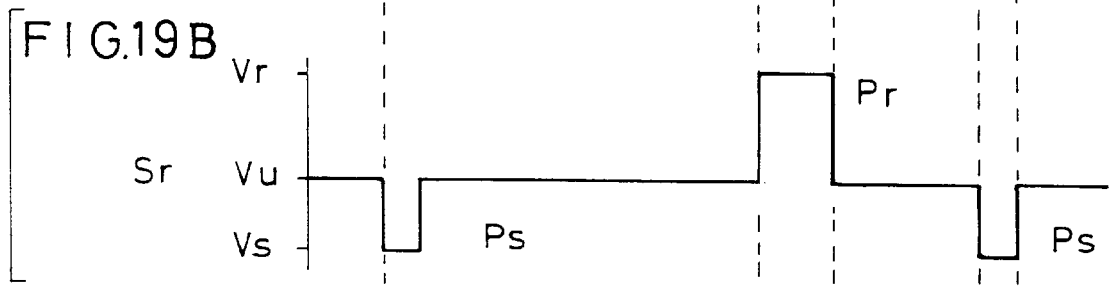

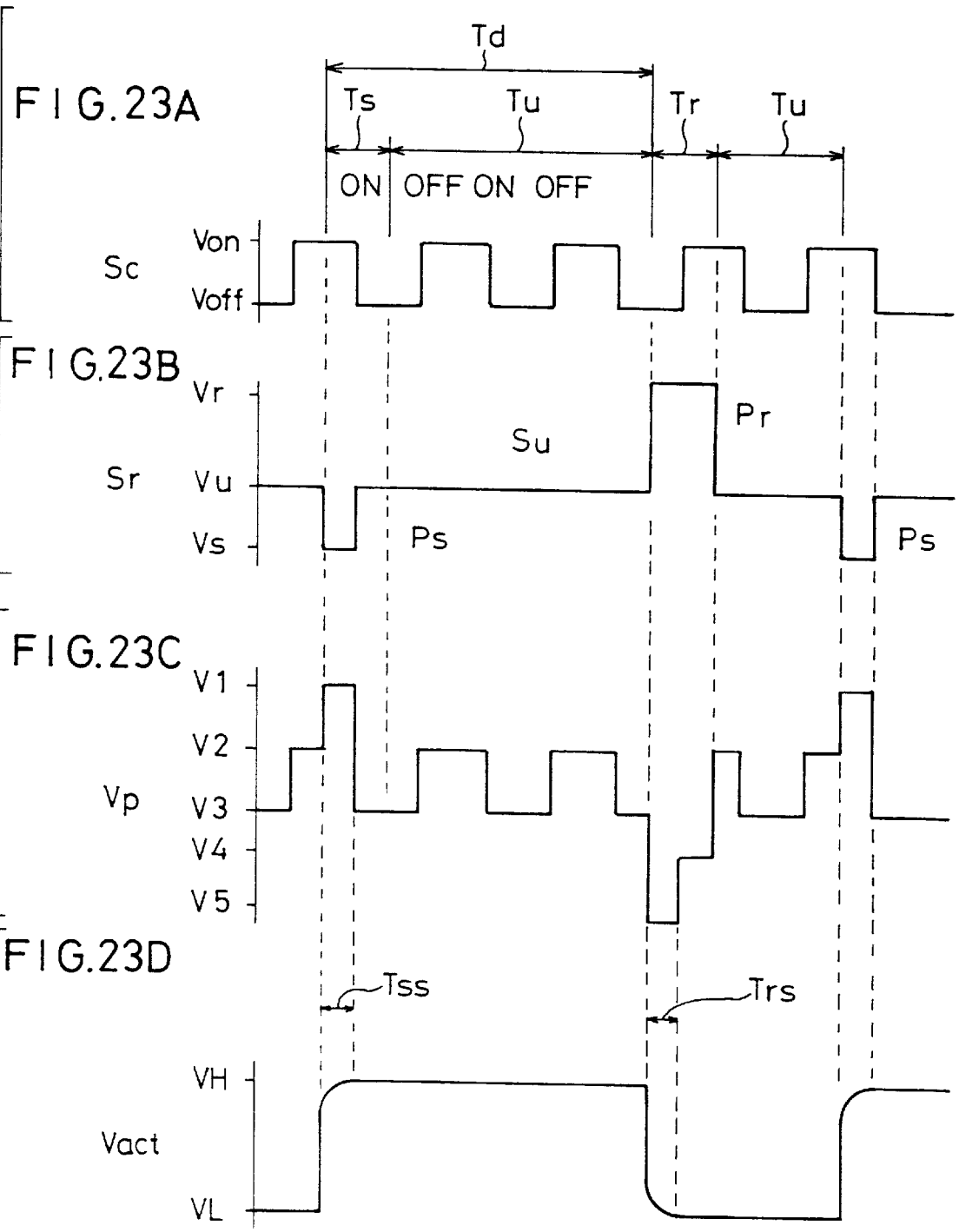

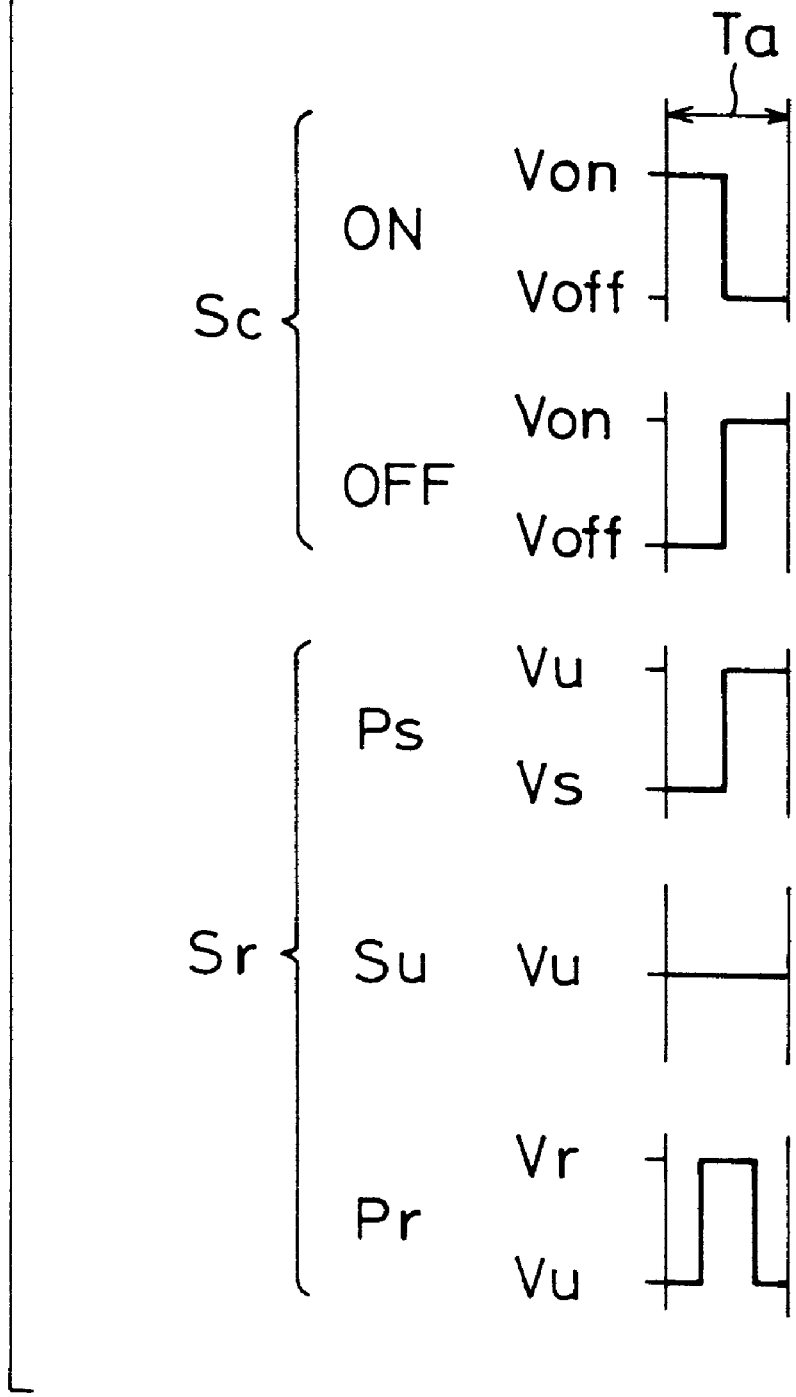

ies is lowered at peripheral edges of
DISPLAY

TECHNICAL FIELD

The present invention relates to a display apparatus of small electric energy consumption and high raster luminance, and more particularly to a display apparatus which controls the displacement of actuators in directions into and out of contact with a light guide plate depending on an attribute of an image signal that is inputted, to control leakage light in given areas of the light guide plate for thereby displaying an image depending on the image signal on the light guide plate.

BACKGROUND ART

There have heretofore been known display apparatus including cathode-ray tubes (CRT), liquid crystal display panels, plasma display panels, etc.

Cathode-ray tubes include ordinary television receivers and monitors for use with computers. While the cathode-ray tubes can produce bright rasters, they consume large electric energy and have a depth that increases in proportion to the raster size. The cathode-ray tubes are also disadvantageous in that the resolution is lowered at peripheral edges of displayed images, resulting in distortions of displayed images or figures, there is no storage capability, and no large-size display is available.

The reasons for these shortcomings are that since the electron beam radiated from the electron gun is largely deflected, the beam spot is spread in areas where the electron beam arrives obliquely at the phosphor surface of the cathode-ray tube, displaying an image obliquely and distorting the displayed image, and that there is a limitation on efforts to keep the large space in a vacuum within the cathode-ray tube.

Liquid crystal display panels can be reduced in overall size and consume small electric energy, but are low in raster luminance and provide a limited angle of view. The liquid crystal display panels also suffer difficulty in that their drive circuit is very complex because image gradations are expressed by way of voltage levels.

For example, in the case where digital data lines are employed, the drive circuit therefor comprises a latch circuit for holding component RGB data (each of 8 bits) for a given period of time, a voltage selector, a multiplexer for switching between as many voltage levels as the number of gradations, and an output circuit for applying output data from the multiplexer to the digital data lines. As the number of gradations increases, the multiplexer needs to switch between many voltage levels and hence requires a complex circuit arrangement.

In the case where analog data lines are employed, the drive circuit therefor comprises a shift register for arraying successively inputted component RGB data (each of 8 bits) in a horizontal direction, a latch circuit for holding parallel data from the shift register for a given period of time, a level shifter for regulating a voltage level, a D/A converter for converting output data from the level shifter to an analog signal, and an output circuit for applying an output signal from the D/A converter to the analog data lines. The D/A converter comprises an operational amplifier to produce voltages depending on gradations. If the range of gradations increases, then the D/A converter needs to employ an operational amplifier capable of outputting highly accurate voltages, and hence is complex in arrangement and highly costly.

As with the liquid crystal display panels, plasma display panels can be reduced in size because the display unit itself does not take up a volume, and can easily be viewed because the display surface is flat. Particularly, AC plasma display panels are advantageous in that they require no refresh memory on account of the storage capability of cells.

In order to give a storage capability to the cells of the plasma display panels, it is necessary to alternately switch the polarity of the applied voltage to sustain an electric discharge. To meet this requirement, the drive circuit needs to have a first pulse generator for generating sustaining pulses in an X-direction and a second pulse generator for generating sustaining pulses in a Y-direction. Accordingly, the drive circuit is necessarily complex in arrangement.

The applicant of the present application has proposed a novel display apparatus in efforts to solve the problems of the CRTs, the liquid crystal display panels, and the plasma display panels (see, for example, Japanese laid-open patent publication No. 7-287176). As shown in FIG. 39 of the accompanying drawings, the proposed display apparatus has actuators 200 arrayed in association with respective pixels. Each of the actuators 200 has an actuator unit 208 comprising a piezoelectric/electrostrictive layer 202 and upper and lower electrodes 204, 206 disposed respectively on upper and lower surfaces of the piezoelectric/electrostrictive layer 202, and a base 214 comprising a vibrator 210 disposed underneath the actuator unit 208 and a mount member 212. The lower electrode 206 of the actuator unit 208 is held in contact with the vibrator 210, which supports the actuator unit 208.

The base 214, which comprises an integral combination of the vibrator 210 and the mount member 212, is made of ceramics. The base 214 has a cavity 216 where the vibrator 210 is of a reduced thickness.

To the upper electrode 204 of the actuator unit 208, there is connected a displacement transfer member 220 for allowing the actuator 200 to contact a light guide plate 218 through an area of a predetermined size. In the example shown in FIG. 39, the displacement transfer member 220 is disposed closely to the light guide plate 218 when the actuator 200 is stationary, and contacts the light guide plate 218 at a distance which is equal to or shorter than the wavelength of light when the actuator 200 is energized.

Light 222 is introduced into the light guide plate 218 from an end thereof, for example. With the refractive index of the light guide plate 218 being adjusted, the light 222 is totally reflected in its entirety without passing through front and rear surfaces of the light guide plate 218. Then, a voltage signal depending on an attribute of an image signal is applied to the actuators 200 through the upper and lower electrodes 204, 206 to keep the actuators 200 stationary in a normal state and displace the actuators 200 in an energized state for thereby controlling the actuators 200 to move into and out of contact with the light guide plate 218. Diffused light (leakage light) 224 in given areas of the light guide plate 218 is thus controlled to display an image depending on the image signal on the light guide plate 218.

The display apparatus offers advantageous in that (1) the electric energy consumption can be reduced, (2) the raster luminance can be increased, and (3) the number of pixels for displaying color images does not need to be increased as compared with the number of pixels for displaying black-and-white images.

A peripheral circuit for the above display apparatus comprises, as shown in FIG. 40 of the accompanying drawings, a display area 230 composed of a matrix of pixels, a vertical shifting circuit 234 from which extend as many vertical selection lines 232 as the number of rows, each vertical selection line 232 being common to a number of pixels (a group of pixels) of one row, and a horizontal shifting circuit 238 from which extend as many horizontal selection lines 236 as the number of columns, each horizontal selection line 236 being common to a number of pixels (a group of pixels) of one column.

Display information (output voltage) outputted from the horizontal shifting circuit 238 to the group of pixels of a selected row is also applied to the groups of pixels of unselected rows, thus necessarily energizing unnecessary pixels (actuators). Therefore, unwanted electric energy is consumed, posing disadvantages in relation to efforts to design the display apparatus for lower electric energy consumption.

In order to select all rows in a vertical scanning period, the pixels can emit light only in a period of time represented by (the vertical scanning period/the number of necessary selected rows), resulting in a limitation on efforts to make the display apparatus more luminous.

One attempt to eliminate the above drawbacks is to provide switching elements in the form of an IC. However, such a scheme needs a number of wires between a drive circuit having as many switching elements as the number of pixels and a board (actuator board) on which the actuators are mounted. It is difficult to form a wiring pattern on the actuator board.

Another solution is to provide horizontal shifting circuits 238 associated with respective rows, as shown in FIG. 41 of the accompanying drawings. However, such an arrangement results in a very complex circuit arrangement.

The present invention has been made in view of the above problems. It is an object of the present invention to provide a display apparatus of the proposed kind which has low electric energy consumption and higher raster luminance, and allows wires or interconnections to be formed with ease.

DISCLOSURE OF THE INVENTION

A display apparatus according to the present invention has a light guide plate for introducing light therein and a driver disposed in confronting relation to a surface of the light guide plate and having an array of as many actuators as the number of pixels, the actuators being controlled for displacement into and out of contact with the light guide plate depending on an attribute of an inputted image signal to control leakage light from the light guide plate in predetermined areas for thereby displaying an image depending on the image signal on the light guide plate, the driver having switching elements which correspond respectively to the actuators and can be turned on and off to control the displacement of the actuators.

In response to the input of an image signal, a row of actuators is selected, and display information (voltage signal) relative to the selected row is supplied. Ordinarily, the voltage signal would be supplied to actuators of an unselected row that is not related to the selected row. In the display apparatus according to the present invention, switching elements associated with the actuators of the unselected row are turned off to prevent the display information from being supplied to the unselected row. Consequently, the pixels (actuators) of the unselected row do not need to be driven, effectively resulting in a reduction in the electric energy consumption.

Since the CR time constant due to the electrostatic capacitance and wiring resistance of the actuator and the on resistance of the switching element is small, the actuators of the selected row are rapidly charged when the switching element is turned on. Thereafter, when the switching element is turned off, the junctions between a supply line (signal line) for the display information and the actuators pose a very high impedance, and are substantially open. This means that the resistance is very high, and hence the CR time constant is also very high.

Consequently, even when the switching elements are turned off, since the display information is continuously supplied, i.e., the voltage signal is continuously applied, to the actuators, the actuators remain displaced beyond a certain level, keeping the pixels in the on state.

Inasmuch as the actuators of an unselected row remain charged and open, keeping their displacement produced when the row was selected for a certain period of time with no signal being applied, the pixels can emit light in the unselected periods. Accordingly, the display apparatus can achieve high raster luminance.

According to the present invention, furthermore, since each of the switching elements is disposed on the driver (either on a principal surface or a rear surface thereof), it is not necessary to provide a large-scale wiring pattern on the driver, and the wiring in the display apparatus can be simplified.

Unlike liquid crystal display panels (TFT-LCD), the switching elements can be installed in a space (location) not related to a light path, and can be disposed on the rear surface of the driver. Consequently, the aperture ratio of the pixels can be increased for increased luminance.

The driver has a board made of ceramics, and the actuators are disposed on said board at positions aligned respectively with the pixels, said switching elements being disposed on said board.

In the above arrangement, each of said actuators comprises a shape holding layer, an operating unit disposed on said shape holding layer and having at least a pair of electrodes, a vibrator supporting said operating unit, and a mount member by which said vibrator is vibratingly supported. It is preferable to further comprise a displacement transfer unit for transferring the displacement of said actuator which is produced in response to the application of a voltage to said electrodes, to said light guide plate. An actuator with a shape holding layer is an actuator which has at least two or more displaced states at the same voltage level.

With the refractive index of the light guide plate being adjusted, light which is introduced into the light guide plate from an end thereof, for example, is totally reflected in its entirety within the light guide plate without passing through front and rear surfaces of the light guide plate (off state). When the displacement transfer unit is brought into contact with the rear surface, for example, of the light guide plate at a distance which is equal to or shorter than the wavelength of light, the light which has been totally reflected passes to the surface of the displacement transfer unit which is held in contact with the rear surface of the light guide plate. The light which has reached the surface of the displacement transfer unit is reflected as diffused light by the surface of the displacement transfer unit. While some of the diffused light is reflected again in the light guide plate, most of the diffused light is not reflected by the light guide plate, but passes through the front surface of the light guide plate (on state).

Therefore, it is possible to control the emission (leakage) of light from the front surface of the light guide plate based on whether the displacement transfer unit contacts the rear surface of the light guide plate. One unit in which the displacement transfer unit is displaced into and out of contact with the light guide plate is considered to be a pixel, and a number of such pixels are arranged in a matrix. Controlling the displacement of the displacement transfer unit in each of the pixels depending on an attribute of an inputted image signal can display an image (characters, figures, etc.) on the front surface of the light guide plate depending on the image signal, as with cathode-ray tubes, liquid crystal display panels, and plasma display panels.

The actuator which has the shape holding layer has the following features:

(1) Since the threshold characteristics from the off state to the on state is steeper than would be if the shape holding layer were not present, the amplitude of the voltage can be reduced, and the burden on the circuit can be lowered.

(2) The difference between the off state and the on state is clearer, resulting in an increase in contrast.

(3) The threshold suffers reduced variations, giving a margin to the range of voltages.

In view of the ease of control, the actuator should preferably be of such a nature which is displaceable upwardly (spaced from the light guide plate under no voltage load and brought into contact with the light guide plate when the voltage is applied). Particularly, the actuator should preferably be of a structure having a pair of electrodes on its surfaces. The shape holding layer preferably comprises a piezoelectric/electrostrictive layer, antiferrodielectric layer, or the like.

Each of the switching elements may comprise a transistor, a varistor, or a piezoelectric relay.

According to the present invention, the display apparatus further comprises a first drive circuit for selecting at least a row of said switching elements, a second drive circuit for outputting display information to the selected row of switching elements, and a signal control circuit for controlling said first drive circuit and said second drive circuit, wherein said signal control circuit controls said first drive circuit and said second drive circuit to control gradations according to at least a time modulation process.

The signal control circuit controls the first drive circuit to select at least a row of switching elements and also controls the second drive circuit to output display information to the pixels of the selected row. The signal control circuit controls said first drive circuit and said second drive circuit to control the gradations of displayed pixels according to at least the time modulation process.

If the gradations are controlled according to the time modulation process, for example, then even when the range of displayed gradations of pixels is increased, it is not necessary to effect complex voltage switching and voltage selection, and the number of voltage settings to be used may be minimized. Specific operation details will be described later on.

The gradations may be controlled by a voltage control process as well as the time modulation process, and a combination of the voltage control process and the time modulation process.

The first and second drive circuits should preferably have the following features:

(1) The actuators are a capacitive load. In view of driving the capacitive load, the ratio of a voltage applied to the capacitive load when the application of a voltage (operating voltage) for flexurally displacing the actuators is finished should preferably be 50% or higher.

(2) In order to displace the actuators sufficiently to express on and off states of the pixels, it is preferable to be able to output a voltage of 20 V or higher.

(3) The fact that an output current is bidirectional should be taken into account.

(4) It is preferable be able to drive a load having a two-electrode structure in row and column directions.

For controlling gradations according to the time modulation process, the display period of one image is regarded as one field, and one field is divided into a plurality of subfields. Each of said subfields has a selected period and an unselected period, and each of said subfields is set to a time length depending on a unit gradation level assigned to the subfield. The lengths of the subfields are not limited to any particular sequence.

If one field is divided into equal subfields, then (1) the peak value of the current can be suppressed, lessening the burden on the circuit, (2) forces that are generated instantaneously are reduced, lowering a load on the actuator for increased stability over a long period of time, and (3) variations in the response time of pixels are absorbed, reducing luminance variations. The luminance is increased because the subfields are variable depending on the unit gradation level.

The first drive circuit is controlled for timing by said signal control circuit to finish the selection of all rows in each of said subfields, and the second drive circuit is controlled for timing by said signal control circuit to output data signals, which are produced by assigning display times depending on gradation levels of the pixels of the selected row to the subfields, to the pixels of the selected row in the selecting period of each of said subfields.

Upon the start of one field, the first drive circuit selects the pixels of a first row, and the second drive circuit supplies data signals to the pixels of the first row. The data signals supplied respectively to the pixels are data signals (e.g., the operating voltage or the resetting voltage) generated by assigning the display times depending on the gradation levels to the subfields. With respect to one pixel, the display time depending on the gradation level of the pixel is divided into time durations assigned to the subfields. At this time, the display time may be divided into time durations assigned to all the subfields, or may be divided into time durations assigned to some of the subfields.

If one field is divided into four subfields (fist through fourth subfields), for example, then the time of the first subfield may be "4", the time of the second subfield may be "8", and the times of the third and fourth subfields may be "16", "32", respectively.

Therefore, if the gradation level of the pixel is 60, for example, then all the subfields are selected. If the gradation level of the pixel is 44, then the first, second, and fourth subfields are selected.

The data signal may be outputted to the pixel in such a form that a high-level signal is outputted with respect to selected subfields and a low-level signal is outputted with respect to unselected subfields.

Each of the first and second drive circuits should preferably comprise a single drive circuit, and hence only two drive circuits should preferably be employed. Since each of the actuators two (a pair of) electrode and has a shape holding function, only two drive circuits may be employed.

One field may be composed of a series of selected periods and unselected periods, rather than being divided into a plurality of subfields. In this case, gradations may also be controlled according to a voltage control process.

In the display apparatus, at least a reset period for substantially eliminating displayed luminance may be provided between said effective display period in a subfield and said effective display period in a next subfield. Since displayed luminance is eliminated in the reset period, the display apparatus can easily be arranged to display moving images. In the reset period, the switching elements are turned on, and a resetting voltage is applied to the actuators.

Alternatively, a reset period and an unselected period for substantially eliminating displayed luminance are provided between said effective display period in a subfield and said effective display period in a next subfield.

Because displayed luminance is eliminated in the reset period, when the actuator is to be flexurally displaced in the effective display period in the next subfield, the response speed of the actuator may be reduced depending on the position to which the actuator is returned in the reset period.

According to the present invention, however, since the unselected period is established after the reset period, the level of a voltage applied to the actuator may be set closely to an on/off threshold in the range in which the pixel is turned off, so that the response speed of the actuator with respect to the flexural displacement in the next effective display period can be improved. Specifically, the unselected period after the reset period may be used as a preparatory bootstrap period for the flexural displacement of the actuator. In this case, in the unselected period, the switching element is turned on to apply a voltage to give the flexural displacement to the actuator. Preferably, the voltage applied in the unselected period may be inputted from at least one of the first drive circuit and the second drive circuit. In view of this, the unselected period can be defined as a period other than the selected period and the reset period.

In the above arrangement, a preparatory period for stabilizing the operation of the actuators should preferably be provided immediately before or in said selected period. The preparatory period is a period for making a voltage level constant immediately before a selecting pulse is applied. The preparatory period may double as an auxiliary period in the unselected period, or may be provided after elapse of an auxiliary period.

Preferably, the first drive circuit is capable of establishing at least three voltage levels, and said second drive circuit is capable of establishing at least two voltage levels.

The first drive circuit outputs a selecting pulse signal in said selected period, outputs an unselecting signal in said unselected period, and outputs a resetting pulse signal in said reset period, and said second drive circuit outputs an on signal in the selected periods in effective display periods in assigned subfields of said subfields, and outputs an off signal in the selected periods in effective display periods in other subfields.

With respect to one pixel, in a subfield selected by dividing the gradation level into time durations assigned, a positively highest voltage, for example, is applied to the pixel in the selected period in the subfield. Therefore, the actuator of the pixel is flexurally displaced in one direction (a direction toward the light guide plate) by the applied voltage, inducing leakage light (light emission) from the light guide plate. The flexural displacement is stored until a voltage is applied (a resetting pulse signal is supplied) to the actuator in an opposite direction.

In the unselected period after the selected period, the unselecting signal is outputted. In this case, the unselecting signal may be a signal of a fixed voltage lower than the voltage in the selected period, or a signal whose voltage fluctuates alternately.

In a next reset period, a resetting pulse signal is supplied to the actuator. The resetting pulse signal is a signal having a negatively highest voltage. Therefore, the actuator is displaced in another direction (a direction away from the light guide plate), bringing a lowest-luminance state (light extinction).

The above series of operation is carried out in only selected subfields. In subfields which are not selected, an off signal is supplied to the pixel in the selected period. Thus, the light is extincted in the periods of the subfields which are not selected.

A voltage sufficient to flexurally displace the actuator of a pixel to be controlled is applied to said actuator in a period in which said on signal is outputted, and a voltage sufficient to return said actuator from the displacement is applied to said actuator in a period in which said resetting pulse signal is outputted. The actuator which is supplied with the on signal in the selected period is flexurally displaced in the period in which said on signal is outputted, causing the pixel associated with the actuator to emit light. This state is maintained over the unselected period. When a resetting pulse signal is outputted in a next reset period, the actuator is returned to the original state (off state), extincting light from the pixel.

The absolute value (B) of the difference between the maximum value of a voltage applied to said actuator of each pixel in said unselected period and the maximum value of a voltage applied to said actuator of each pixel by an off signal in said selected period is 100% or less of the absolute value (A) of the difference between the maximum value of a voltage applied to said actuator of each pixel by an on signal in said selected period and the maximum value of a voltage applied to said actuator of each pixel by an off signal in said selected period (B≦A). Preferably, B≦0.5 A, and more preferably, the absolute value (B) should be 30% or less of the absolute value (A).

The absolute value (B) should preferably be smaller than the absolute value (A) of the difference between the on and off signals. This is because the range of voltages for displacing the actuator a large distance in the on state and displacing the actuator a small distance in the off state can be used in the unselected period.

The absolute value (A) should preferably be set to 10 V or higher, and more preferably be set to 20 V or higher.

The first drive circuit may output a selecting window pulse to apply the voltage sufficient to flexurally displace said actuator of a pixel to be controlled to said actuator in combination with said on signal in said selected period. The first drive circuit may output a resetting window pulse to apply the voltage sufficient to return said actuator of a pixel to be controlled from the displacement, to said actuator in said reset period. The first drive circuit may output an unselecting window pulse to reduce the difference between average voltages applied in the unselected period to the actuators of the pixels, in said unselected period.

In the above arrangement, phase information should preferably be added to at least said on signal to reduce the difference between average voltages applied in the unselected period to the switching elements and the actuators of the pixels.

In the unselected periods, because the actuator needs to remain flexurally displaced, it is preferable ideally to apply a fixed potential to the extent that does not affect the flexural displacement of the actuator.

However, inasmuch as the selection of all rows is finished in each subfield, data signals (on and off signals) with respect to another row successively appear in the unselected period in each subfield. With respect to one pixel, the voltage waveform in the unselected period of the pixel is determined by a pattern of data signals (a pattern in which on and off signals appear) with respect to a row other than the row to which belongs the pixel in the column to which belongs the pixel.

For example, if an on signal is outputted to all rows other than the row including the pixel, then an average voltage in the unselected period for the pixel is fixed to a voltage level produced by subtracting a reference level from the voltage level of the on signal (referred to as "high-voltage level"), if an off signal is outputted to all rows other than the row including the pixel, then the average voltage is fixed to a voltage level produced by subtracting the reference level from the voltage level of the off signal (referred to as "low-voltage level"), and if an on signal and an off signal are alternately outputted to all rows other than the row including the pixel, then the average voltage is an intermediate voltage between the high-voltage level and the low-voltage level.

As a result, the on/off state of the switching element and the flexural displacement of the actuator in the unselected period are slightly varied by the voltage change (the voltage change depending on the pattern of on and off signals). Particularly if a number of rows output on signals or off signals, since a drop of the average voltage is large, the displayed states (luminance and gradation) of the pixel in the unselected period may possibly become unstable.

Furthermore, if the on signal and the off signal appear alternately, then since the pulse durations of the on signal and the off signal are the same as the selected period, the average voltage is not fixed to the intermediate voltage, but fluctuates with a certain offset.

To solve the above problems, according to the present invention, phase information is added to said selecting pulse signal and said on signal and/or said off signal. In addition, phase information is added to said resetting signal.

Specifically, said on signal and said off signal have a pulse duration smaller than an addressing time in said first drive circuit and are out of phase with each other by a predetermined angle. Furthermore, the resetting pulse signal is out of phase with the on signal or the off signal by a predetermined angle.

Thus, each of the on signal and the off signal comprises a pulse signal having a high level and a low level in a period corresponding to the selected period.

With respect to one pixel, if an on signal is outputted to all rows, if an off signal is outputted to all rows, and if on and off signals are alternately outputted to respective rows, successive pulse signals having a small pulse duration and an amplitude of (high-voltage level—low-voltage level) appear in the unselected period for the pixel. As a result, the average voltage in the unselected period does not depend on the pattern of on and off signals, but is of a substantially constant level. Therefore, the displayed states (luminance and gradation) in the unselected period are stabilized. Since the pulse duration of the pulse signals appearing in the unselecting period is sufficiently shorter than a period corresponding to the selected period, and in view of the fact that the response speed of light emission at each pixel is somewhat low, the pulse duration can provide a low-pass filter effect, so that the displayed state (emitted state) in the selected period is maintained as it is in the unselected period, thus essentially eliminating the above unstable displayed states.

Inasmuch as the resetting pulse signal is held out of phase with the on signal or the off signal by a predetermined angle, a negatively highest voltage is necessarily applied to each pixel in the reset period. Thus, the switching element of each pixel is reliably turned on, bringing the actuator reliably into a lowest-luminance state (light extinction).

At least either one of said on signal and said off signal may have a pulse period which is 1/n (n is a real number ranging from 1 to 5) of said addressing time (the invention according to claim 23). Preferably, n ranges from 1 to 3. The reason for this is that a greater number of pulses are better for the low-pass filter effect, but a reduced number of pulses or voltage switching times are effective for reducing the electric energy consumption.

If each of the switching elements comprises a varistor, then the varistor should preferably have an off resistance established such that a variation in a voltage applied to said actuator due to a discharge in the unselected period is kept within 5%, and should preferably have an on resistance established such that a voltage applied to said actuator increases to 95% in an effective selected period.

If the off resistance were too small, then electric energy charged in the actuator in the selected period would be discharged, losing the memory function. Therefore, a variation in the voltage applied to the actuator in the unselected period may be represented by the sum of a variation (5%) due to a divided voltage by the electrostatic capacitance of the varistor and a variation due to the discharged leakage current.

With the off resistance being thus established, the CR time constant in the unselected period is increased, providing a low-pass filter effect to smooth the voltage applied to the actuator in the unselected period and hence maintain the voltage applied to the actuator at a substantially constant level. As a consequence, the actuator can keep its displacement in the selected period or the reset period.

With the on resistance of the varistor being thus established, the CR time constant in the effective selected period is reduced, increasing the response to the rise of the applied voltage. Thus, the voltage applied to the actuator when an on signal is supplied thereto in the selected period sharply increases in the effective selected period, and instantaneously reaches 95% of a predetermined voltage. Therefore, the actuator is instantaneously flexurally displaced in one direction in the effective selected period.

BRIEF DESCRIPTION OF THE DRAWINGS

FIG. 10 is a fragmentary cross-sectional view of another example of the display apparatus according to the first embodiment;

FIG. 11A is a plan view of an arrangement having a pair of interdigitating electrodes disposed on a shape holding layer in the actuator of the display apparatus according to the first embodiment;

FIG. 11B is a plan view of another arrangement having a pair of spiral electrodes on the shape holding layer;

FIG. 19A is a diagram showing the waveform of a column signal (first column) in the second driving process;

FIG. 19B is a diagram showing the waveform of a row signal (first row) in the second driving process;

FIG. 19C is a diagram showing the waveform of a voltage applied between an electrode of a varistor and a lower electrode of a particular pixel (in a first row and a first column);

FIG. 19D is a diagram showing the waveform of a voltage applied to an actuator of a particular pixel (in a first row and a first column);

FIG. 23A is a diagram showing the waveform of a column signal (first column) in the fourth driving process;

FIG. 23B is a diagram showing the waveform of a row signal (first row) in the fourth driving process;

FIG. 23C is a diagram showing the waveform of a voltage applied between an electrode of a varistor and a lower electrode of a particular pixel (in a first row and a first column);

FIG. 23D is a diagram showing the waveform of a voltage applied to an actuator of a particular pixel (in a first row and a first column);

FIG. 24 is a diagram showing the forms of column and row signals according to a fifth driving process in the display apparatus according to the second embodiment;

BEST MODE FOR CARRYING OUT THE INVENTION

Embodiments of display apparatus according to the present invention will hereinafter be described with reference to FIGS. 1 through 41.

Figure 1:
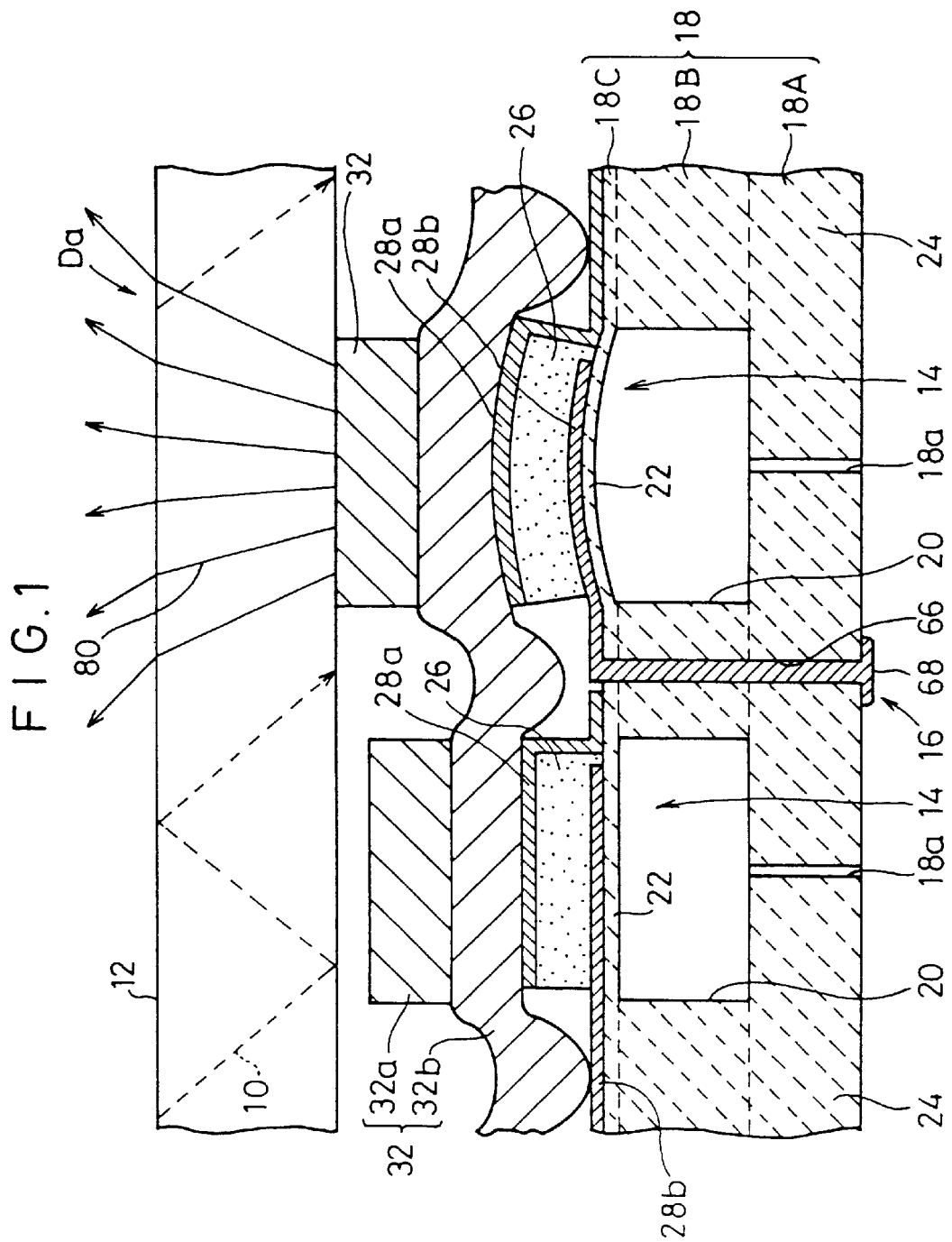
FIG. 1 is a fragmentary cross-sectional view of a display apparatus according to a first embodiment of the present invention.

As shown in FIG. 1, a display apparatus Da according to a first embodiment comprises a light guide plate 12, a driver 16 disposed in confronting relation to a rear surface of the light guide plate 12 and having an array of actuators 14 aligned with respective pixels, and a displacement transfer unit 32 connected to upper surfaces of the actuators 14 and having areas of contact with the light guide plate 12 which can be increased to those corresponding to the pixels.

The driver 16 has a board 18 made of ceramics, for example, and the actuators 14 are disposed in respective positions in the board 18 which are aligned with the respective pixels. The board 18 will hereinafter be referred to as an actuator board 18. The actuator board 18 has a principal surface confronting the rear surface of the light guide plate 12, the principal surface being continuous (flush). The actuator board 18 has cavities 20 defined therein at the positions aligned with the respective pixels, for forming vibrators (described later on). The cavities 20 communicate with the exterior through through holes 18a of small diameter which are defined in a rear surface of the actuator board 18.

The actuator board 18 has a smaller thickness in those regions where the cavities 20 are present and a greater thickness in the other regions thereof. The thinner regions are of a structure easily vibratable under external stresses and serve as vibrators 22. The regions other than the cavities 20 are thicker and serve as mount regions 24 which support the vibrators 22.

The actuator board 18 is a laminated body comprising a lowermost substrate layer 18A, an intermediate spacer layer 18B, and an uppermost thin layer 18C, and can be recognized as an integral structural body with the cavities 20 defined in the positions aligned with the respective pixels. The substrate layer 18A serves as a reinforcing board and also as a wiring board. The actuator board 18 may be integrally sintered or subsequently attached.

Each of the actuators 14 has, in addition to the vibrator 22 and the mount region 24, a shape holding layer 26 as a piezoelectric/electrostrictive layer, antiferrodielectric layer, or the like disposed on the vibrator 22, an upper electrode 28a disposed on an upper surface of the shape holding layer 26, and a lower electrode 28b disposed on a lower surface of the shape holding layer 26.

Figure 4:
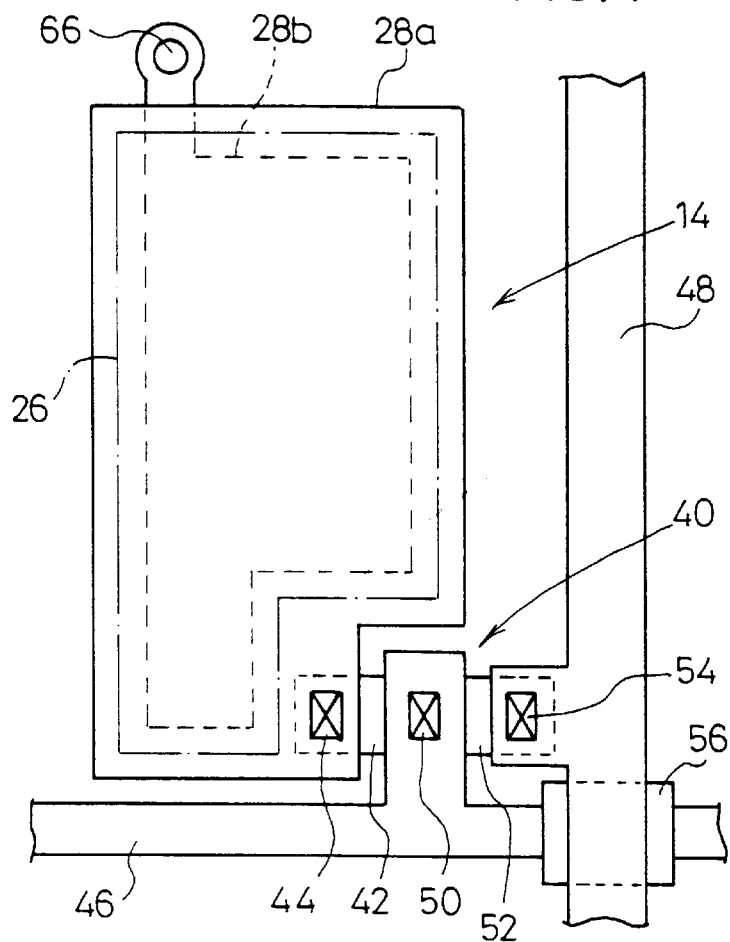
FIG. 4 is a plan view of an actuator of the display apparatus according to the first embodiment.

As shown in FIG. 4, each of a planar shape (see the solid lines) of the upper electrode 28a, a planar shape (see the dot-and-dash lines) of the shape holding layer 26, and an outer peripheral shape (see the broken lines) of the lower electrode 28b is a rectangular shape. The upper electrode 28a is of the greatest size, the planar shape of the shape holding layer 26 is the second greatest size, and the planar shape of the lower electrode 28b is the smallest size.

The display apparatus Da according to the first embodiment has, as shown in FIG. 4, a switching TFT (thin-film transistor) 40 disposed near each of the actuators 14 of the actuator board 18 (see FIG. 1). The upper electrode 28a of each of the actuators 14 is electrically connected through a contact 44 to a source/drain region 42 of the corresponding TFT 40.

Figure 3:
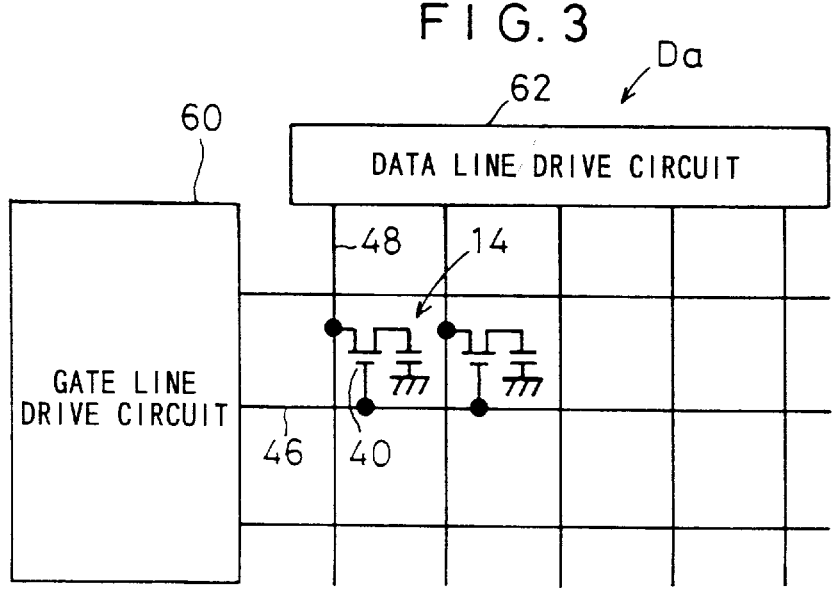
FIG. 3 is a diagram showing an equivalent circuit of each pixel disposed in a driver of the display apparatus according to the first embodiment.

As shown in FIG. 3, wires connected to the upper and lower electrodes 28a, 28b have as many gate lines 46 as the number of rows of pixels (actuators) 14 and as many data lines 48 as the number of columns of pixels. As shown in FIG. 4, each of the gate lines 46 is electrically connected through a contact 50 to a gate electrode of the TFT 40 which is associated with one of the pixels (actuators 14), and each of the data lines 48 is electrically connected through a contact 54 to a source/drain region 52 of the TFT 40 which is associated with one of the pixels 14.

An insulating film 56 such as a silicon oxide film, a glass film, a resin film, or the like is interposed between each of the gate lines 46 and each of the data lines 48 where they extend across each other.

Figure 2:
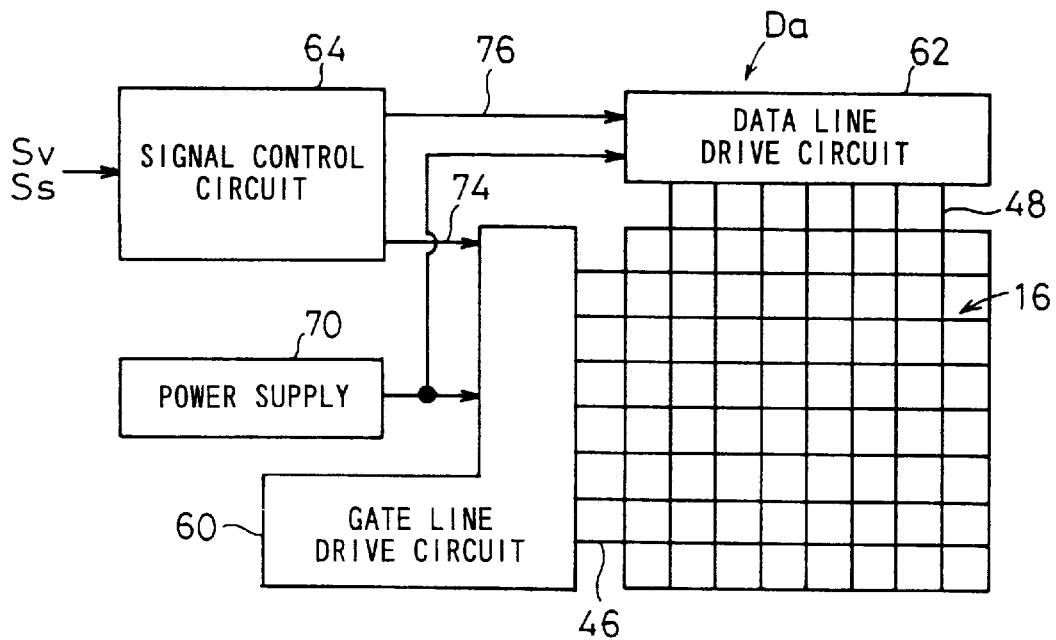
FIG. 2 is a block diagram of a peripheral circuit of the display apparatus according to the first embodiment.

As shown in FIG. 2, a peripheral circuit of the display apparatus Da according to the first embodiment comprises a gate line drive circuit 60 for selectively supplying drive signals to the gate lines 46 of the driver 16 in which the actuators 14 are arranged in a matrix or staggered pattern, to successively select rows of the actuators 14, a data line drive circuit 62 for outputting parallel data signals to the data lines 46 of the driver 16 to supply the data signals to the respective source/drain regions 52 (see FIG. 4) of the TFTs 40 of the rows selected by the gate line drive circuit 60, and a signal control circuit 64 for controlling the gate line drive circuit 60 and the data line drive circuit 62 based on a video signal Sv and a synchronizing signal Ss which are supplied.

The lower electrode 28b of each of the actuators 14 extends to the rear surface of the actuator board 18 through a through hole 66 (see FIG. 4) defined in the actuator board 18, and is electrically connected to a ground line 68 (see FIG. 1) disposed on the rear surface of the actuator board 18.

When one row is selected by the gate line drive circuit 60, all the TFTs 40 connected to the selected row are turned on, supplying data signals from the data line drive circuit 62 through channel regions of the TFTs 40 to the upper electrodes 28a of the actuators 14.

The gate line drive circuit 60 is supplied with a logic power supply voltage for logic operations in an internal logic circuit thereof and two gate line power supply voltages from a power supply 70, and the data line drive circuit 62 is supplied with the logic power supply voltage and two data line power supply voltages from the power supply 70.

The two gate line power supply voltages are a voltage for turning on the TFTs 40 (hereinafter referred to as "on voltage") and a voltage for turning off the TFTs 40

(hereinafter referred to as "off voltage"), and the two data line power supply voltages are a voltage sufficient to flexurally displacing the actuators 14 (hereinafter referred to as "operating voltage") and a voltage sufficient to return the actuators 14 to their original state (hereinafter referred to as "resetting voltage"). There may be employed another power supply voltage for applying a bootstrap voltage to the actuators 14 in an unselected period after they are reset.

Figure 5A:
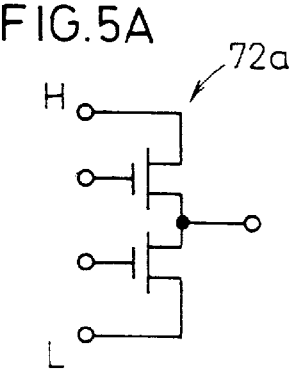
FIG. 5A is a circuit diagram of a push-pull circuit as a constituent unit for a gate line drive circuit and a data line drive circuit.
Figure 5B:
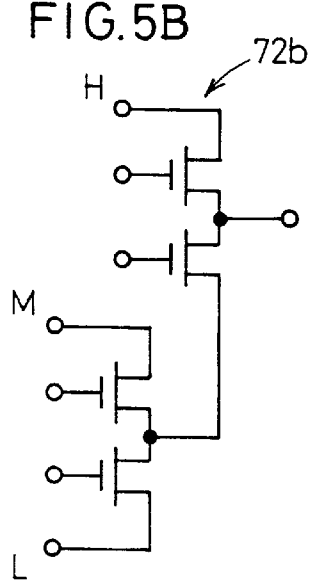
FIG. 5B is a circuit diagram of a combination of push-pull circuits.

Therefore, each of the gate line drive circuit 60 and the data line drive circuit 62 may be a simple circuit for switching between two voltage levels ("H" and "L"), such as a push-pull circuit 72a comprising two MOSFETs connected in series with each other, for example, as shown in FIG. 5A, or a serial-to-parallel converter comprising as many circuits 72b, each comprising a combination of push-pull circuits 72a, as the number of channels, for example, as shown in FIG. 5B. A complex data line drive circuit which is used with liquid crystal display panels is thus not required.

The signal control circuit 64 has therein a timing controller, a frame memory, and an I/O buffer. The signal control circuit 64 controls gradations according to a time modulation process on the gate line drive circuit 60 and the data line drive circuit 62 through a control line 74 connected to the gate line drive circuit 60 and a control line 76 connected to the data line drive circuit 62.

The gate line drive circuit 60 and the data line drive circuit 62 should preferably have the following features:

(1) The actuators 14 are a capacitive load. In view of driving the capacitive load, the ratio of a voltage applied to the capacitive load when the application of a voltage (operating voltage) for flexurally displacing the actuators 14 is finished should preferably be 50% or higher.

(2) In order to displace the actuators 14 sufficiently to express ON and off states of the pixels, the gate line drive circuit 60 and the data line drive circuit 62 should preferably be able to output a voltage of 20 V or higher.

(3) The fact that an output current is bidirectional should be taken into account.

(4) The gate line drive circuit 60 and the data line drive circuit 62 should preferably be able to drive a load having a two-electrode structure in row and column directions.

If the shape holding layer 26 comprises a piezoelectric/electrostrictive layer, then the piezoelectric/electrostrictive layer may be made of lead zirconate, lead magnesium niobate, lead nickel niobate, lead zinc niobate, lead manganese niobate, lead magnesium tantalate, lead nickel tantalate, lead antimony tinate, lead titanium, barium titanate, lead magnesium tungstate, lead cobalt niobate, or the like, or ceramics containing a combination of these compounds. These compounds may be contained as a primary component having 50 weight % or more. Of the above ceramics, the ceramics containing lead zirconate is used most frequently as a constituent material for the piezoelectric/electrostrictive layer.

If the piezoelectric/electrostrictive layer is made of ceramics, then an oxide of lanthanum, calcium, strontium, molybdenum, tungsten, barium, niobium, zinc, nickel, manganese, or the like, or a combination thereof, or another compound may be added to the ceramics. For example, it is preferably to employ ceramics having a primary component which comprises lead magnesium niobate, lead zirconate, and lead titanate, and including lanthanum and strontium.

The piezoelectric/electrostrictive layer may be dense or porous. If the piezoelectric/electrostrictive layer is porous, then its porosity should preferably be 40% or less.

If the shape holding layer 26 comprises an antiferrodielectric layer, then the antiferrodielectric layer should preferably be made of a material comprising a primary component of lead zirconate, a material comprising a primary component of lead zirconate and lead tinate, a material comprising lead zirconate with lanthanum oxide added thereto, or a material comprising a component of lead zirconate and lead tinate with lead zirconate and lead niobate added thereto.

An antiferrodielectric film including a component comprising lead zirconate and lead tinate of the composition shown below is particularly preferable because it can be driven with a relatively low voltage.

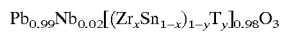

where $0.5<x<0.6$, $0.05<y<0.063$, $0.01<Nb<0.03$.

The antiferrodielectric layer may be porous. If the antiferrodielectric layer is porous, then its porosity should preferably be 30% or less.

Operation of the display apparatus Da of the above structure will briefly be described below with reference to FIG. 1. First, light 10 is introduced into the light guide plate 12 from an end thereof, for example. With the refractive index of the light guide plate 12 being adjusted, the light 10 is totally reflected in its entirety within the light guide plate 12 without passing through front and rear surfaces of the light guide plate 12. When a certain actuator 14 is selected to bring the displacement transfer unit 32 associated with the selected actuator 14 into contact with the rear surface of the light guide plate 12 at a distance which is equal to or shorter than the wavelength of light, the light 10 which has been totally reflected passes to the surface of the displacement transfer unit 32 which is held in contact with the rear surface of the light guide plate 12.

The light 10 which has reached the surface of the displacement transfer unit 32 is reflected as diffused light 80 by the surface of the displacement transfer unit 32. While some of the diffused light 80 is reflected again in the light guide plate 12, most of the diffused light 80 is not reflected by the light guide plate 12, but passes through the front surface of the light guide plate 12.

Therefore, it is possible to control the emission (leakage) of light from the front surface of the light guide plate 12 based on whether the displacement transfer unit 32 contacts the rear surface of the light guide plate 12. In the display apparatus Da according to the first embodiment, one unit in which the displacement transfer unit 32 is displaced into and out of contact with the light guide plate 12 is a pixel, and a number of such pixels are arranged in a matrix or in a staggered pattern with respect to each of the rows. Therefore, controlling the displacement of the displacement transfer unit 32 in each of the pixels depending on an attribute of an inputted image signal can display an image (characters, figures, etc.) on the front surface of the light guide plate 12 depending on the image signal, as with cathode-ray tubes, liquid crystal display panels, and plasma display panels.

Figure 6:
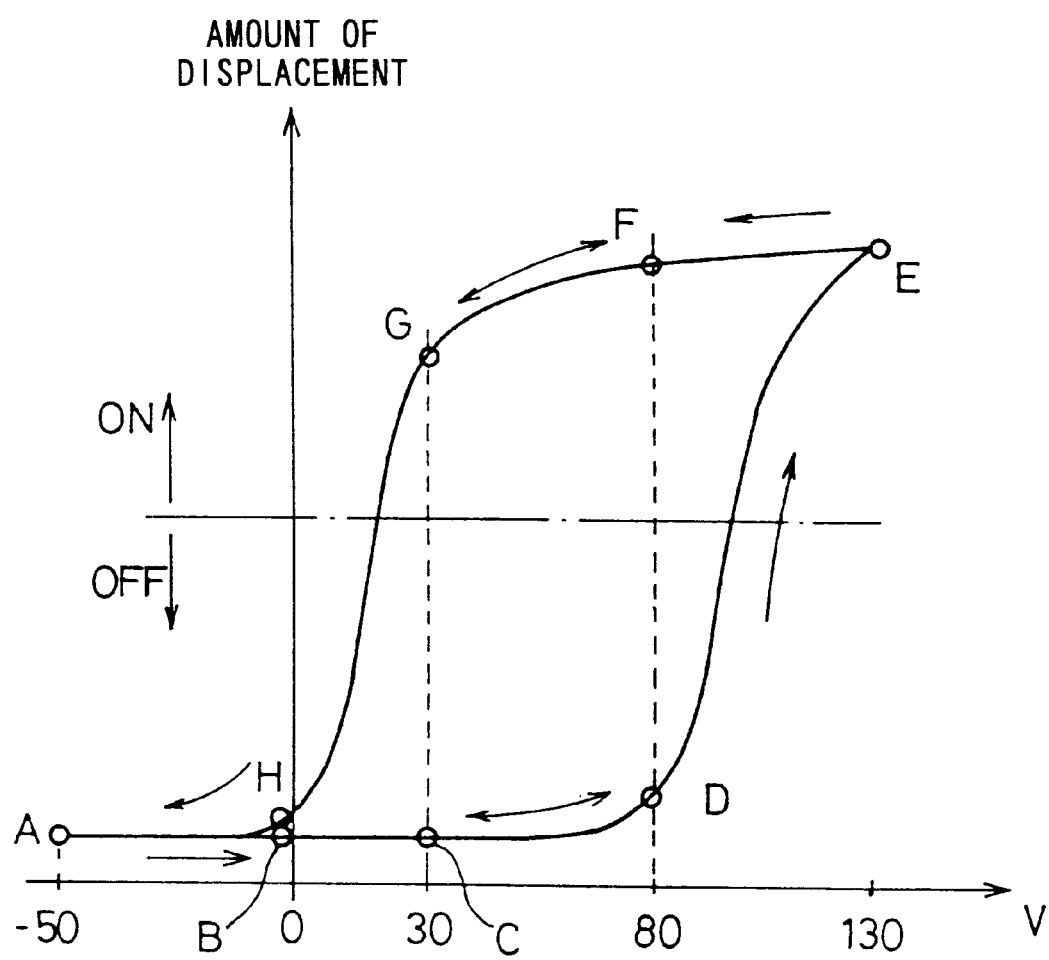
FIG. 6 is a diagram illustrative of flexural displacement characteristics of the actuator of the display apparatus according to the first embodiment.

The principles of operation of each of the actuators 14 where a piezoelectric layer is used as the shape holding layer 26 will be described below with reference to FIG. 6 which shows flexural displacement characteristics of the actuator 14. The flexural displacement characteristics shown in FIG. 6 is plotted when a polarizing voltage is applied between the upper and lower electrodes 28a, 28b of the actuator 14 to polarize the shape holding layer 26 and thereafter a voltage applied to the actuator 14 is continuously varied. In the example shown, the direction in which actuator 14 is flexurally displaced (toward the light guide plate 12) as shown in FIG. 1 is regarded as a positive direction.

A specific example of measurement of the flexural displacement characteristics will be described below. When a voltage is applied between the upper and lower electrodes 28a, 28b to polarize the shape holding layer 26, an electric field is generated in a positive direction in a principal surface of the shape holding layer 26.

When a voltage in excess of a voltage range (Vr–Vh) which is used by the actuator 14 is applied between the upper and lower electrodes 28a, 28b for 7 hours, for example, at a suitable temperature, the shape holding layer 26 is polarized in the same direction as the generated electric field.

Thereafter, the application of the voltage between the upper and lower electrodes 28a, 28b is stopped, leaving the actuator 14 under no voltage load. When a measuring process is started, a sine wave having a frequency of 1 kHz, a positive peak voltage of Vh, and a negative peak voltage of Vr is applied between the upper and lower electrodes 28a, 28b of the actuator 14, and displacements of the actuator 14 at respective points (points A–H) are successively measured by a laser displacement sensor. The measured displacements are plotted in a field vs. flexural displacement graph, thus producing the flexural displacement characteristics shown in FIG. 6. As indicated by the arrows in FIG. 6, the flexural displacement is continuously varied with a certain amount of hysteresis as the applied voltage increases and decreases continuously.

Specifically, if the measurement starts from a no voltage load state (the applied voltage=0 V) at the point B, then since only a uniform electric field is being generated by the polarization of the shape holding layer 26 at the point B, the shape holding layer 26 is not elongated, and the displacement transfer unit 32 and the light guide plate 12 remain spaced from each other, i.e., the pixel corresponding to the actuator 14 is in an off state.

When the positive peak voltage (Vh) is applied between the upper and lower electrodes 28a, 28b of the actuator 14, the actuator 14 is flexurally displaced in one direction (toward the light guide plate 12) as indicated by the point E. This convex deformation of the actuator 14 displaces the displacement transfer unit 32 toward the light guide plate 12 until it contacts the light guide plate 12.

The displacement transfer unit 32 is brought into contact with the light guide plate 12 in response to the flexural displacement of the actuator 14. When the displacement transfer unit 32 contacts the rear surface of the light guide plate 12, the light 10 which has been totally reflected in the light guide plate 12 passes through the rear surface of the light guide plate 12 to the front surface of the light guide plate 12, and is reflected by the front surface of the light guide plate 12. Therefore, the pixel corresponding to the actuator 14 is in an on state. The displacement transfer unit 32 is provided to reflect the light which has passed through the rear surface of the light guide plate 12 and also to increase the area of contact with the light guide plate 12 beyond a certain size. Thus, the area of contact between the displacement transfer unit 32 and the light guide plate 12 defines an area of light emission.

With the display apparatus Da, the displacement transfer unit 32 has a plate member 32a for substantially defining an area of light emission and a displacement transfer member 32 for transferring the displacement of the actuator 14 to the plate member 32a.

The contact between the displacement transfer unit 32 and the light guide plate 12 means that the displacement transfer unit 32 and the light guide plate 12 are positioned at a distance which is equal to or smaller than the wavelength of the light 10 (the light 10 which is introduced into the light guide plate 12) from each other.

Then, when the application of the voltage between the upper and lower electrodes 28a, 28b of the actuator 14 is stopped, leaving the actuator 14 under no voltage load, the actuator 14 tends to return from the convex state to the original state (at the point B). However, because of the hysteresis of the actuator 14, the actuator 14 does not fully return to the state at the point B, but returns to a state (at the point H) that is slightly displaced in one direction from the state at the point B. In this state, the displacement transfer unit 32 and the light guide plate 12 are spaced from each other, i.e., the pixel corresponding to the actuator 14 is in an off state.

Then, when the negative peak voltage (Vr) is applied between the upper and lower electrodes 28a, 28b of the actuator 14, the slight displacement of the actuator 14 under no voltage load is canceled out, allowing the actuator 14 to return fully to its original state.

Therefore, as can be understood from the flexural displacement characteristics shown in FIG. 6, the positive peak voltage Vh can be defined as the operating voltage and the negative peak voltage Vr as the resetting voltage. The description which follows is based on this definition.

The actuator 14 which has the shape holding layer 26 has the following features:

(1) Since the threshold characteristics from the off state to the on state is steeper than would be if the shape holding layer 26 were not present, the amplitude of the voltage can be reduced, and the burden on the circuit can be lowered.

(2) The difference between the off state and the on state is clearer, resulting in an increase in contrast.

(3) The threshold suffers reduced variations, giving a margin to the range of voltages.

In view of the ease of control, the actuator 14 should preferably be of such a nature which is displaceable upwardly (spaced from the light guide plate 12 under no voltage load and brought into contact with the light guide plate 12 when the voltage is applied).

Figure 7:
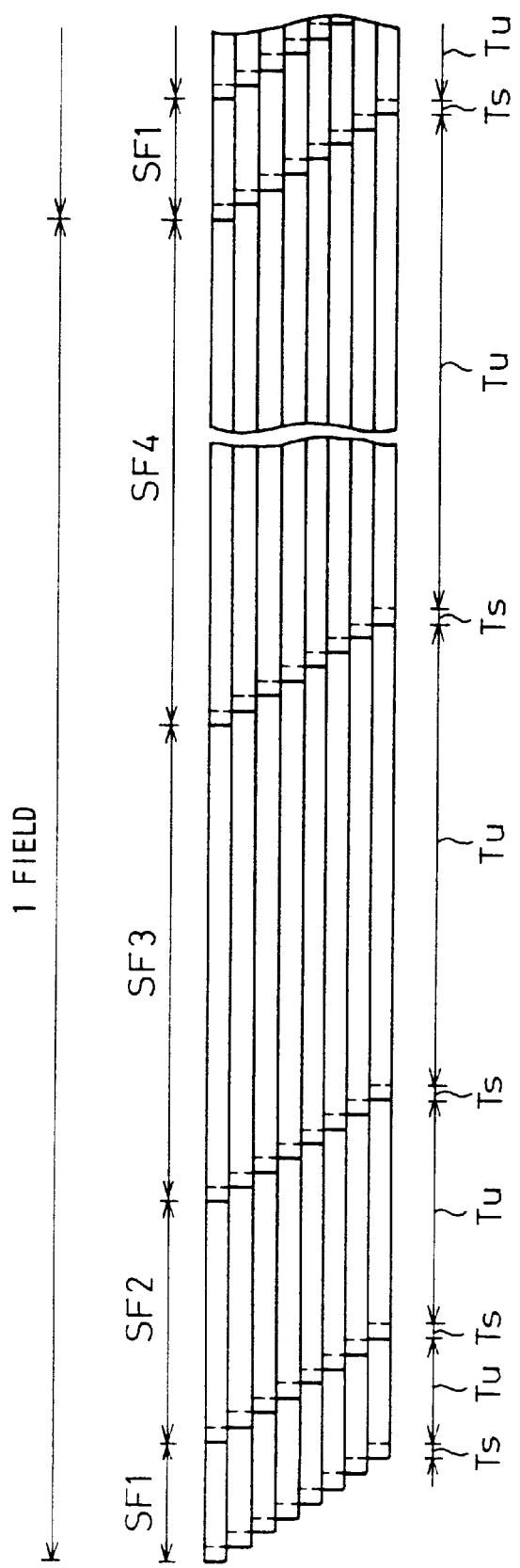
FIG. 7 is a timing chart illustrative of the controlling of gradations according to a time modulation process in the display apparatus according to the first embodiment.

The controlling of gradations according to the time modulation process will be described below with reference to FIGS. 7 through 9B. As shown in FIG. 7, if one image is displayed in the period of one field, the field is divided into four subfields, for example. The times of the subfields are established such that the time of the first subfield SF1 is shortest and the times of the other subfields are twice longer successively. The lengths of the subfields are not limited to any particular sequence.

If the time lengths of the subfields are represented by magnitudes of data with the time length of the first subfield SF1 being "4,", then the time length of the second subfield SF2 is "8", the time length of the third subfield SF3 is "16", and the time length of the fourth subfield SF4 is "32".

Figure 8:
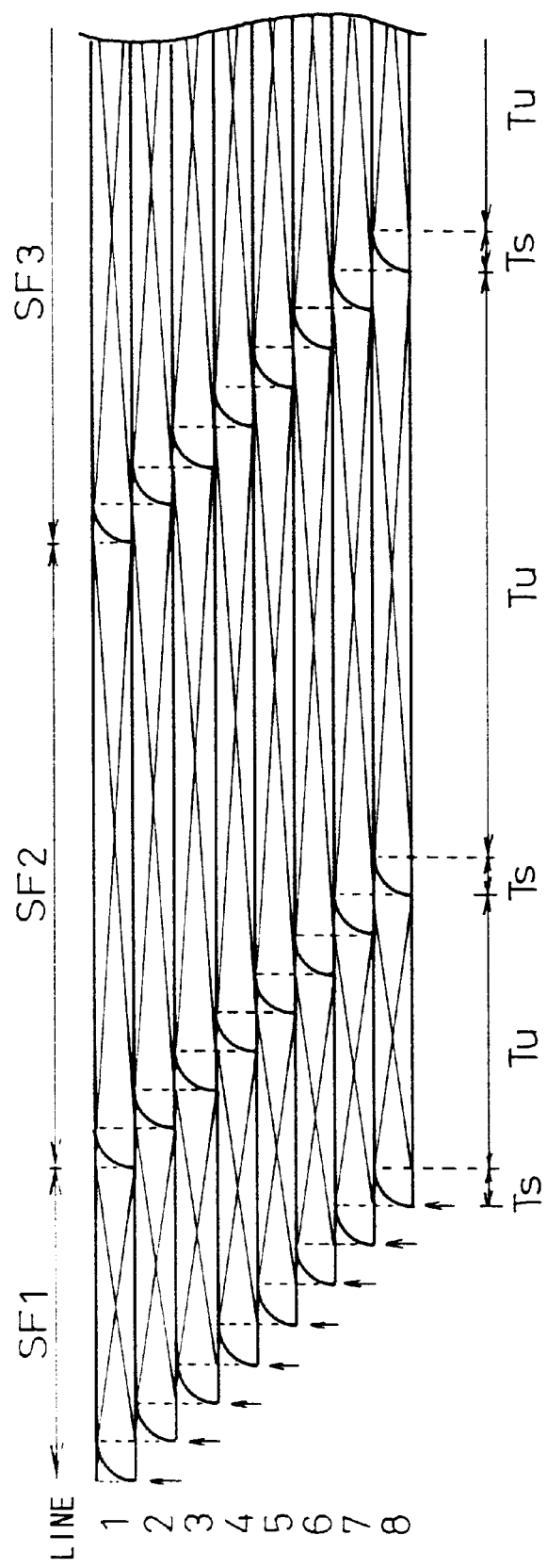
FIG. 8 is a diagram showing at an enlarged scale a portion of the timing chart shown in FIG. 7.

The gate line drive circuit 60 is controlled for its timing by the signal control circuit 64 to finish the selection of all rows within each of the subfields SF1–SF4. Therefore, the time in which to select one row with the gate line drive circuit 60 is defined by a time duration produced by dividing the time length of one subfield by the number of rows of the driver 16. The time duration thus determined or a time shorter than this time duration is selected. In the display apparatus Da according to the first embodiment, as shown in FIGS. 7 and 8, each of the subfields is divided into a selected period Ts and an unselected period Tu.

With respect to one gate line, the selected period Ts in each subfield is a period in which the gate line drive circuit 60 applies an ON voltage to the gate line, turning on the TFTs 40 of the actuators 14 connected to the selected row, and the unselected period Tu in each subfield is a period in which the gate line drive circuit 60 applies an OFF voltage to the gate line, turning off the TFTs 40 of the actuators 14 connected to the selected row.

In the display apparatus Da according to the first embodiment, furthermore, the signal control circuit 64 assigns display times depending on gradation levels for the pixels of the selected row to the subfields SF1–SF4, generating data signals, and outputs the generated data signals through the data line drive circuit 62 in the selected periods Ts in the subfields SF1–SF4.

Therefore, upon the start of one field, the gate line drive circuit 60 selects the pixels of a first row, and the data line drive circuit 62 supplies data signals to the pixels of the first row. The data signals supplied respectively to the pixels are data signals (e.g., the operating voltage or the resetting voltage) generated by assigning the display times depending on the gradation levels to the subfields SF1–SF4. With respect to one pixel, the display time depending on the gradation level of the pixel is divided into time durations assigned to the subfields. At this time, the display time may be divided into time durations assigned to all the subfields, or may be divided into time durations assigned to some of the subfields.

For example, if the gradation level of the pixel is 60, then all the subfields SF1–SF4 are selected. If the gradation level of the pixel is 44, then the first, second, and fourth subfields SF1, SF2, SF4 are selected.

The data signal is outputted to the pixel in such a form that the operating voltage Vh is outputted with respect to selected subfields and the resetting voltage Vr is outputted with respect to unselected subfields.

Specifically, a process of driving the display apparatus Da according to the first embodiment will be described below. It is assumed that a horizontal striped pattern is displayed, i.e., odd-numbered rows emit light and even-numbered rows extincts light.

The gate line drive circuit 60 outputs an ON voltage to a certain gate line in the selected period Ts in each subfield, and outputs an OFF voltage to the gate line in the unselected period Tu in each subfield. The data line drive circuit 62 outputs the operating voltage Vh in the selected periods Ts of assigned subfields of the subfields, and outputs the resetting voltage Vr in the selected periods Ts of other subfields. In this example, the data line drive circuit 62 outputs the operating voltage Vh in the selected periods Ts corresponding to odd-numbered rows, and outputs the resetting voltage Vr in the selected periods Ts corresponding to even-numbered rows.

At each of the pixels of a certain odd-numbered row selected by the gate line drive circuit 60, the operating voltage Vh is applied to the upper electrode 28a through the TFT 40 in the selected period Ts in each subfield, and a ground voltage Vss is applied to the lower electrode 28b. Therefore, the voltage applied between the upper and lower electrodes 28a, 28b of the pixel is equivalent to the operating voltage Vh. Because of the flexural displacement characteristics shown in FIG. 6, the pixels are brought into an on state, emitting light.

Figure 9A:
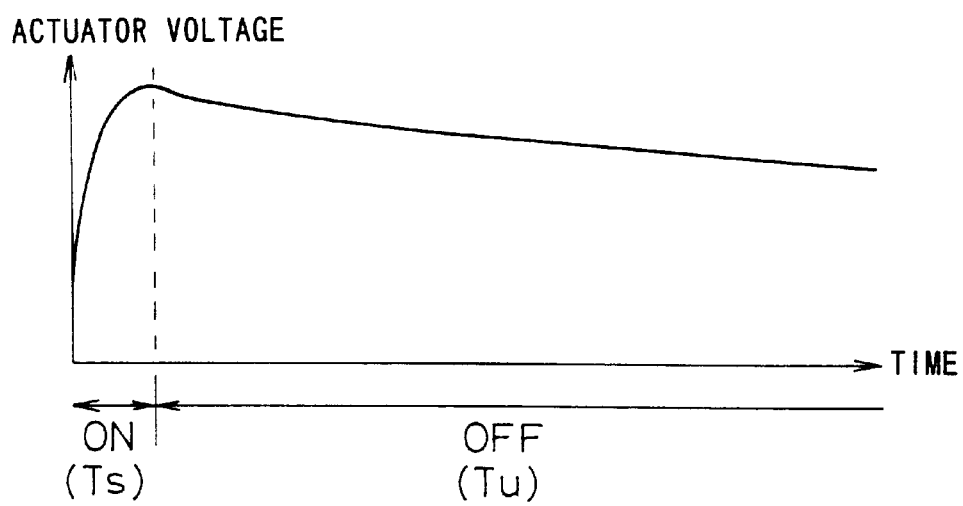
FIG. 9A is a diagram showing the manner in which a voltage applied to the actuator varies when a TFT is turned on and off.
Figure 9B:
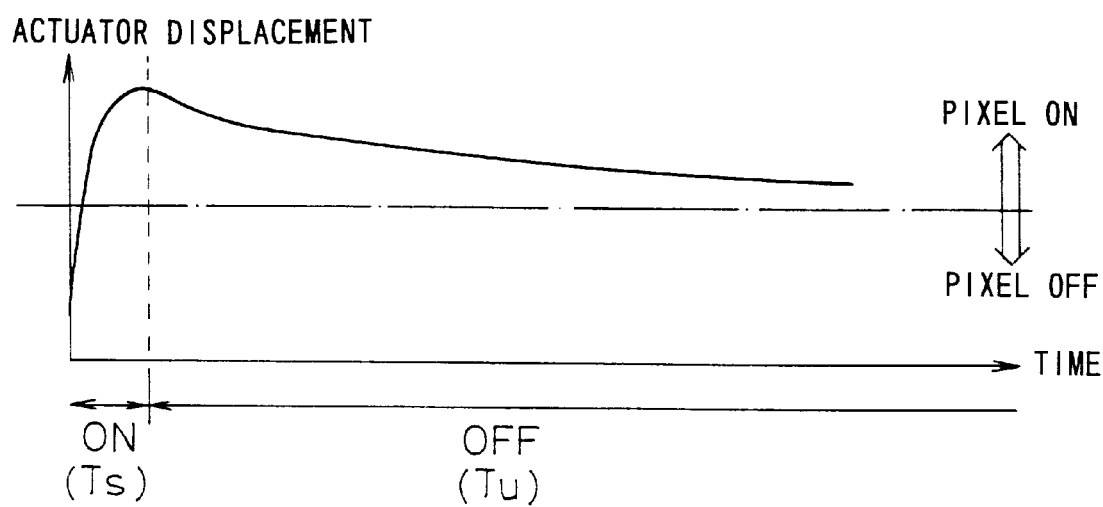
FIG. 9B is a diagram showing the manner in which the actuator is displaced when the TFT is turned on and off.

As shown in FIGS. 9A and 9B, in the selected period Ts in each subfield, inasmuch as the CR time constant due to the electrostatic capacitance of the actuator 14 and the on resistance of the TFT 40 is small, the actuators 14 of the selected row are rapidly charged when the TFT 40 is turned on.

In the unselected period Tu in each subfield, since the TFTs 40 of the odd-numbered row are turned off, the junctions between the data line and the actuators 14 pose a very high impedance, and are substantially open. This means that the resistance is very high, and hence the CR time constant is also very high. Consequently, even when the TFTs 40 of the odd-numbered row are turned off, since the data signals are continuously supplied, i.e., the operating voltage Vh is continuously applied, to the actuators 14, the actuators 14 remain displaced beyond a certain level, keeping the pixels in the on state.

At each of the pixels of a certain even-numbered row selected by the gate line drive circuit 60, the resetting voltage Vr is applied to the upper electrode 28a through the TFT 40 in the selected period Ts in each subfield, and the ground voltage Vss is applied to the lower electrode 28b. Therefore, the voltage applied between the upper and lower electrodes 28a, 28b of the pixel is equivalent to the resetting voltage Vr. Because of the flexural displacement characteristics shown in FIG. 6, the actuators 14 return to their original state and are turned off, and the pixels of the selected row extinct light. Even when the TFTs 40 of the selected row (even-numbered row) are turned off, since the data signals are continuously supplied, i.e., the resetting voltage Vr is continuously applied, to the actuators 14, the actuators 14 remain returned to the original state, keeping the pixels in the off state.

In the display apparatus Da according to the first embodiment, as described above, since the TFTs 40 as switching elements for turning on and off the application of a voltage to the actuators 14 are associated respectively with the actuators 14, when the TFTs 40 associated with the actuators 40 of an unselected row are turned off, data signals (the operating voltage Vh and the resetting voltage Vr) are prevented from being supplied to the unselected row. Therefore, the pixels (actuators) 14 of the unselected row are not required to be driven, so that the electric energy consumption by the display apparatus can effectively be reduced.

Even when the TFTs 40 are turned off, because the data signals are continuously supplied, i.e., the operating voltage Vh or the resetting voltage Vr is continuously applied, to the actuators 14, the actuators 14 remain displaced beyond a certain level, keeping the corresponding pixels in the on state or the off state.

Inasmuch as the actuators 14 of an unselected row remain charged and open, keeping their displacement produced when the row was selected for a certain period of time with no signal being applied, the pixels can emit light in the unselected periods. Accordingly, the display apparatus can achieve high raster luminance.

In the display apparatus Da according to the first embodiment, the TFTs 40 are disposed closely to the respective actuators 14 on the actuator board 18. Thus, it is not necessary to provide a large-scale wiring pattern on the actuator board 18, and the wiring in the display apparatus can be simplified.

In the display apparatus Da according to the first embodiment, the actuators 14, the TFTs 40, the gate lines 46, and the data lines 48 are disposed on the actuator board 18, and the ground lines 68 are disposed on the rear surface of the actuator board 18. However, the actuators 14 and the ground lines 68 may be disposed on the actuator board 18, and the TFTs 40, the gate lines 46, and the data lines 48 may be disposed on the rear surface of the actuator board 18.

In the display apparatus Da according to the first embodiment, the upper and lower electrodes 28a, 28b are disposed on the upper and lower surfaces of the shape holding layer 26. However, as shown in FIG. 10, the shape holding layer 26 may be disposed directly on the vibrator 22, and the pair of electrodes 28 (the electrode 28a connected to the data line and the electrode 28b connected to ground) may be disposed on the upper surface of the shape holding layer 26.

Figure 12:
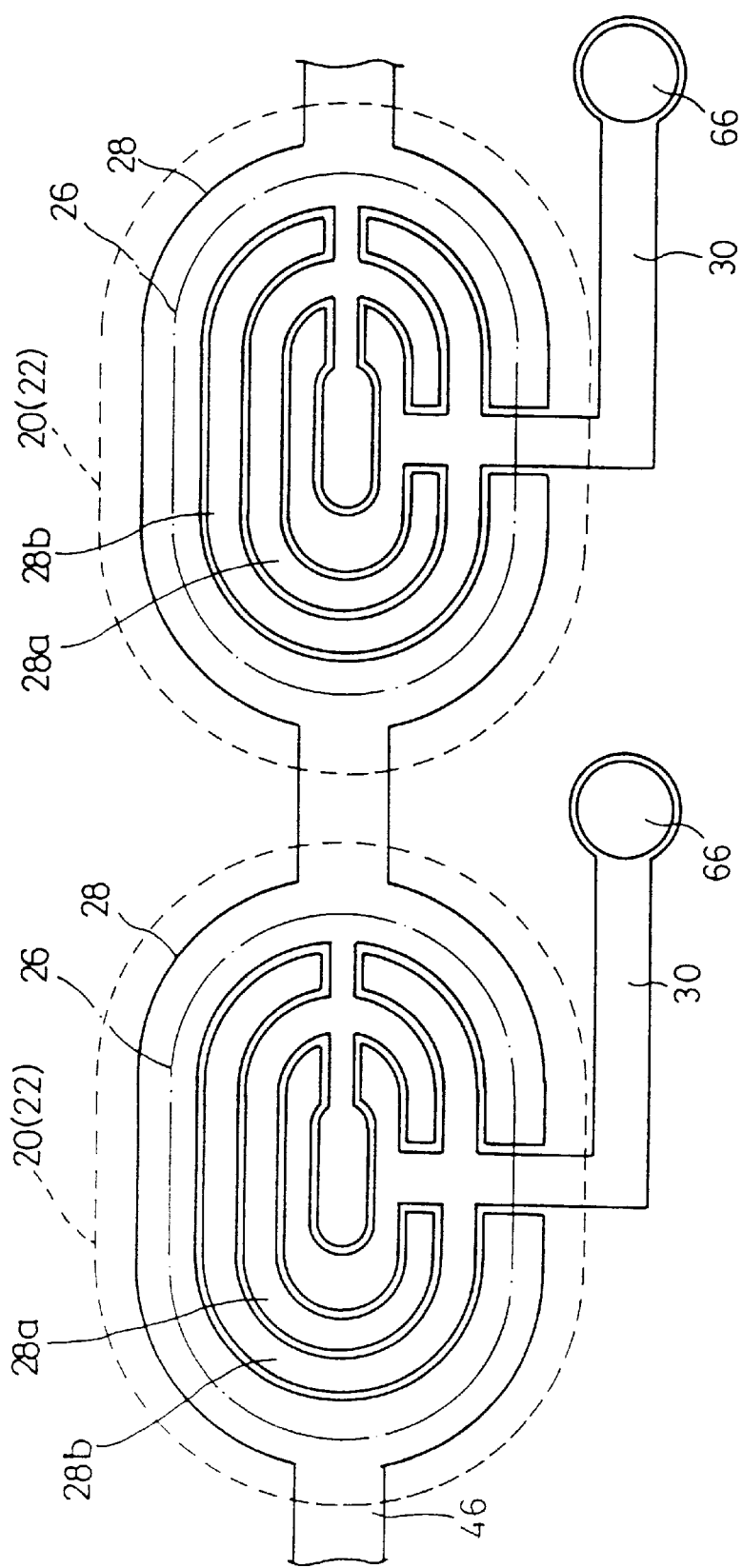
FIG. 12 is a plan view of still another arrangement having a pair of multi-branch electrodes disposed on the shape holding layer in the actuator of the display apparatus according to the first embodiment.

The pair of electrodes 28a, 28b may be in an interdigitating pattern in which the electrodes 28a, 28b are alternately positioned, as shown in FIG. 11A, or may be in a spiral pattern in which the electrodes 28a, 28b are parallel to each other and spaced from each other, as shown in FIG. 11B. Alternatively, as shown in FIG. 12, the pair of electrodes 28 may be in a pattern (multi-branch pattern) in which the electrodes 28a, 28b are spaced from each other and complementary to each other. In FIG. 12, a switching element (not shown) is disposed on the reverse surface of the actuator board 18 (see FIG. 10), and one of the electrodes 28a is electrically connected to the switching element through a relay conductor 30 and a through hole 66.

A display apparatus Db according to a second embodiment of the present invention will be described below with reference to FIGS. 13 through 29. Those parts of the display apparatus Db according to the second embodiment which correspond to those of the display apparatus Da according to the first embodiment are denoted by identical reference characters.

Figure 13:
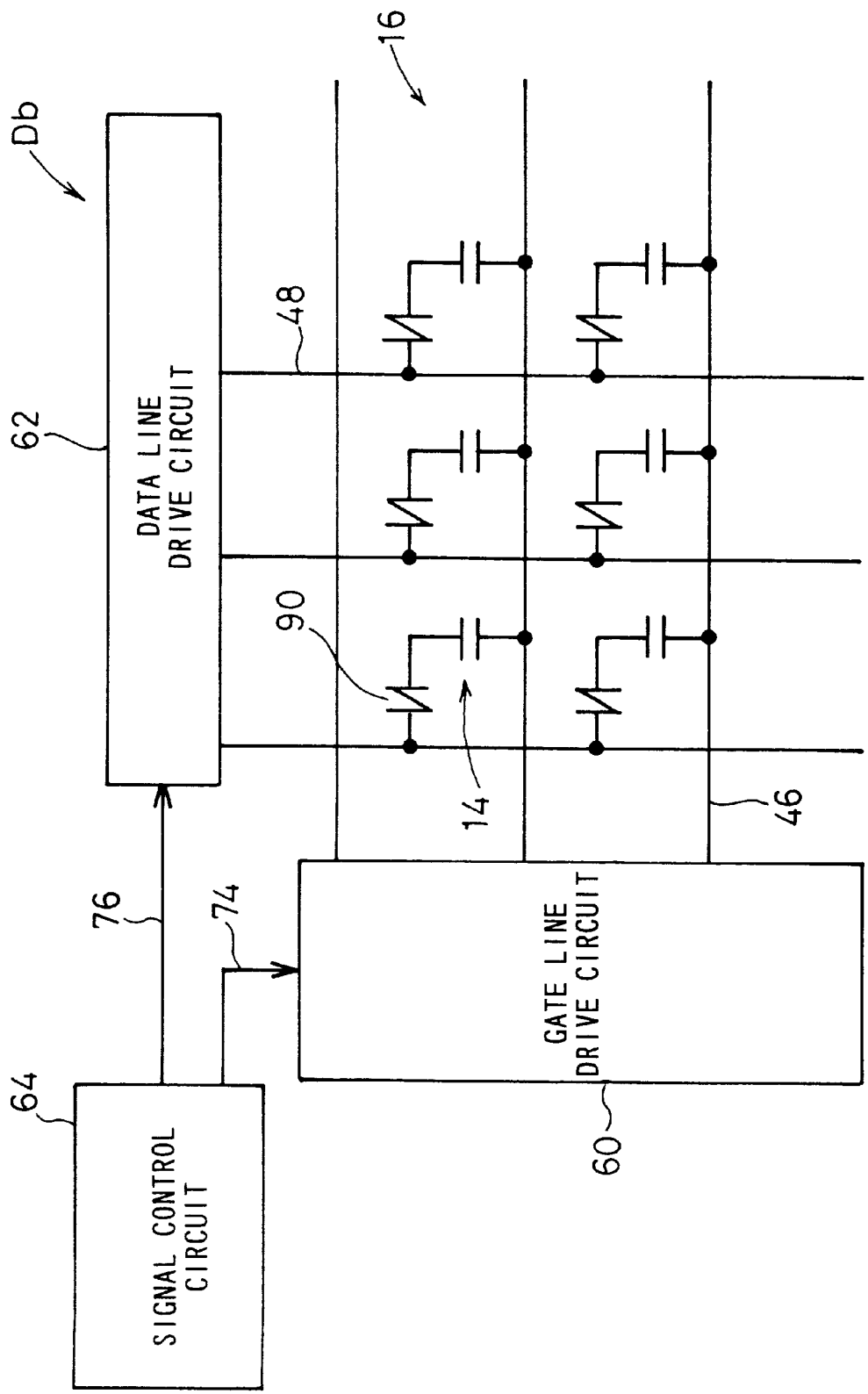
FIG. 13 is a diagram showing an equivalent circuit of each pixel disposed in a driver of a display apparatus according to a second embodiment of the present invention.
Figure 14:
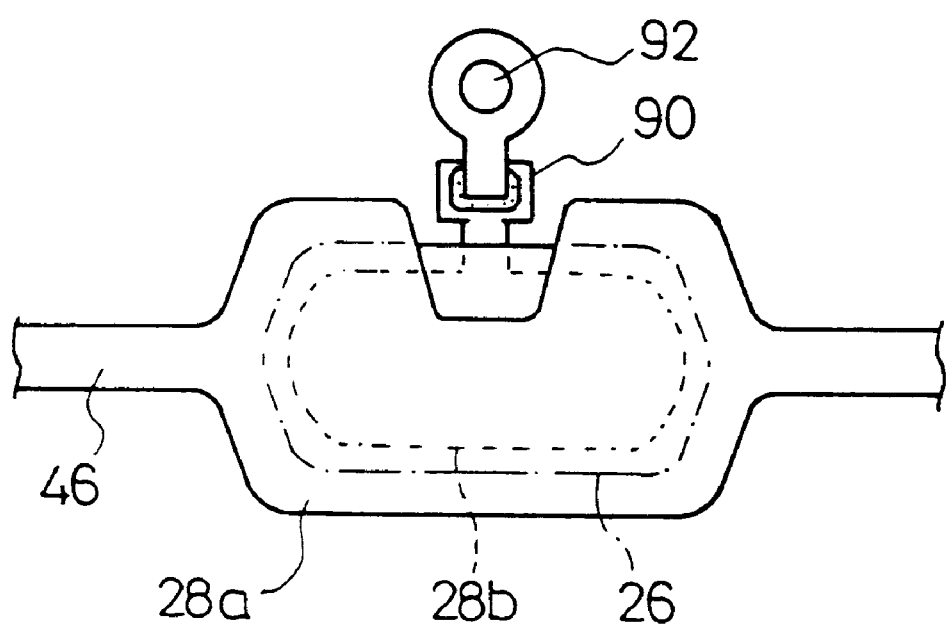
FIG. 14 is a plan view of an actuator of the display apparatus according to the second embodiment.

As shown in FIGS. 13 and 14, the display apparatus Db according to the second embodiment is of a structure which is substantially the same as the display apparatus Da (see FIG. 3) according to the first embodiment. However, the display apparatus Db according to the second embodiment differs from the display apparatus Da according to the first embodiment in that varistors 90 are connected between the lower electrodes 28b of the actuators 14 and the data lines 48, a common gate line 46 is connected to each row of pixels, and data lines 48 are disposed on the rear surface of the actuator board 18.

As shown in FIG. 14, each gate line 46 extends from the upper electrode 28a of a pixel of a preceding column and is connected to the upper electrode 28a of the pixel. The gate line 46 is connected in series with respect to one row. The lower electrode 28b and the data line 48 are electrically connected to each other through a through hole 92 defined in the actuator board 18.

Each of the varistors 90 is a resistive element whose resistance varies nonlinearly as a voltage applied thereto varies. The varistor 90 comprises an SiC varistor, a pnp varistor of Si, or a varistor made mainly of ZnO, and has such negative resistance characteristics that the resistance thereof decreases as the voltage applied thereacross increases.

Figure 15:
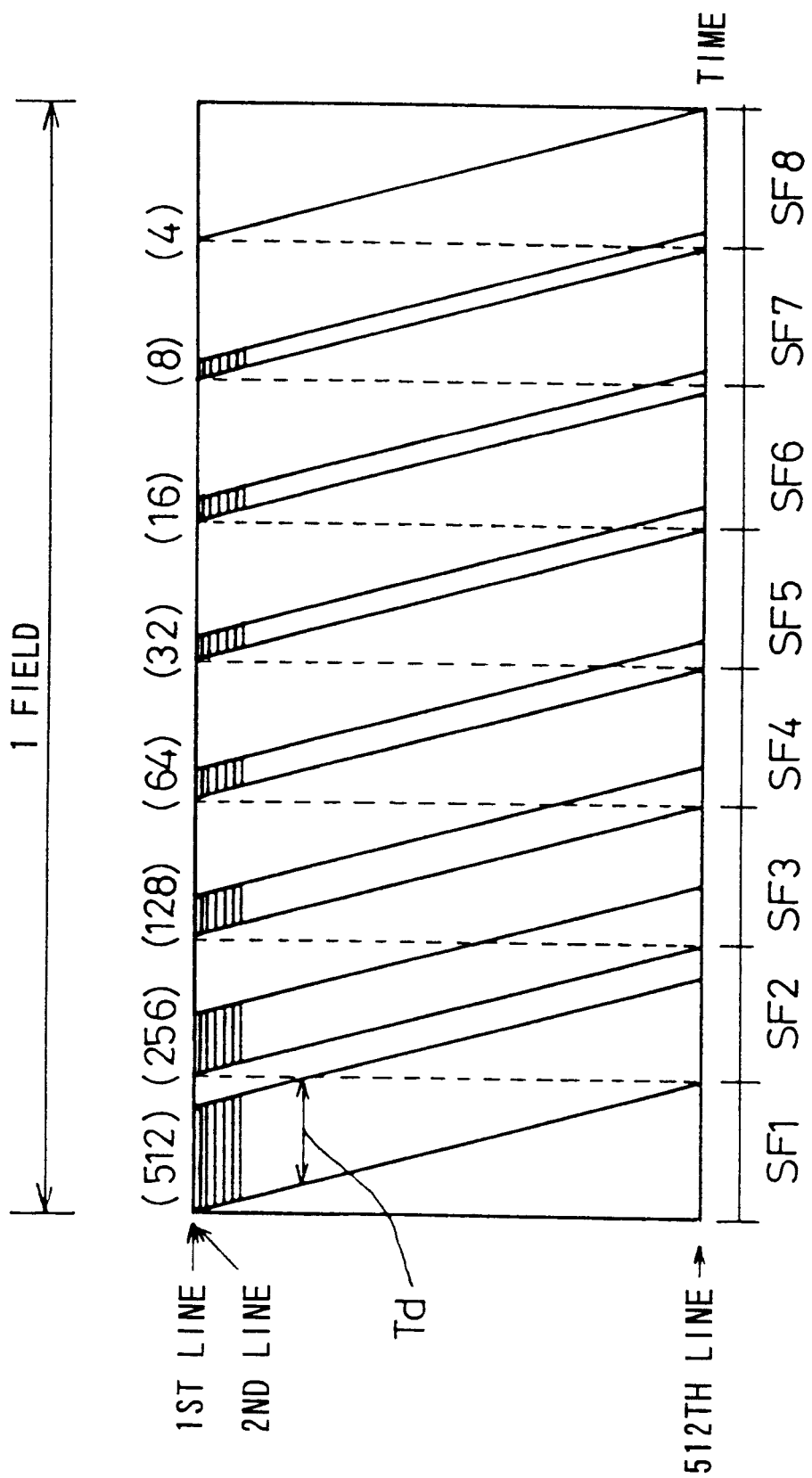
FIG. 15 is a diagram illustrative of the controlling of gradations according to a time modulation process, showing one field divided into eight subfields.
Figure 16:
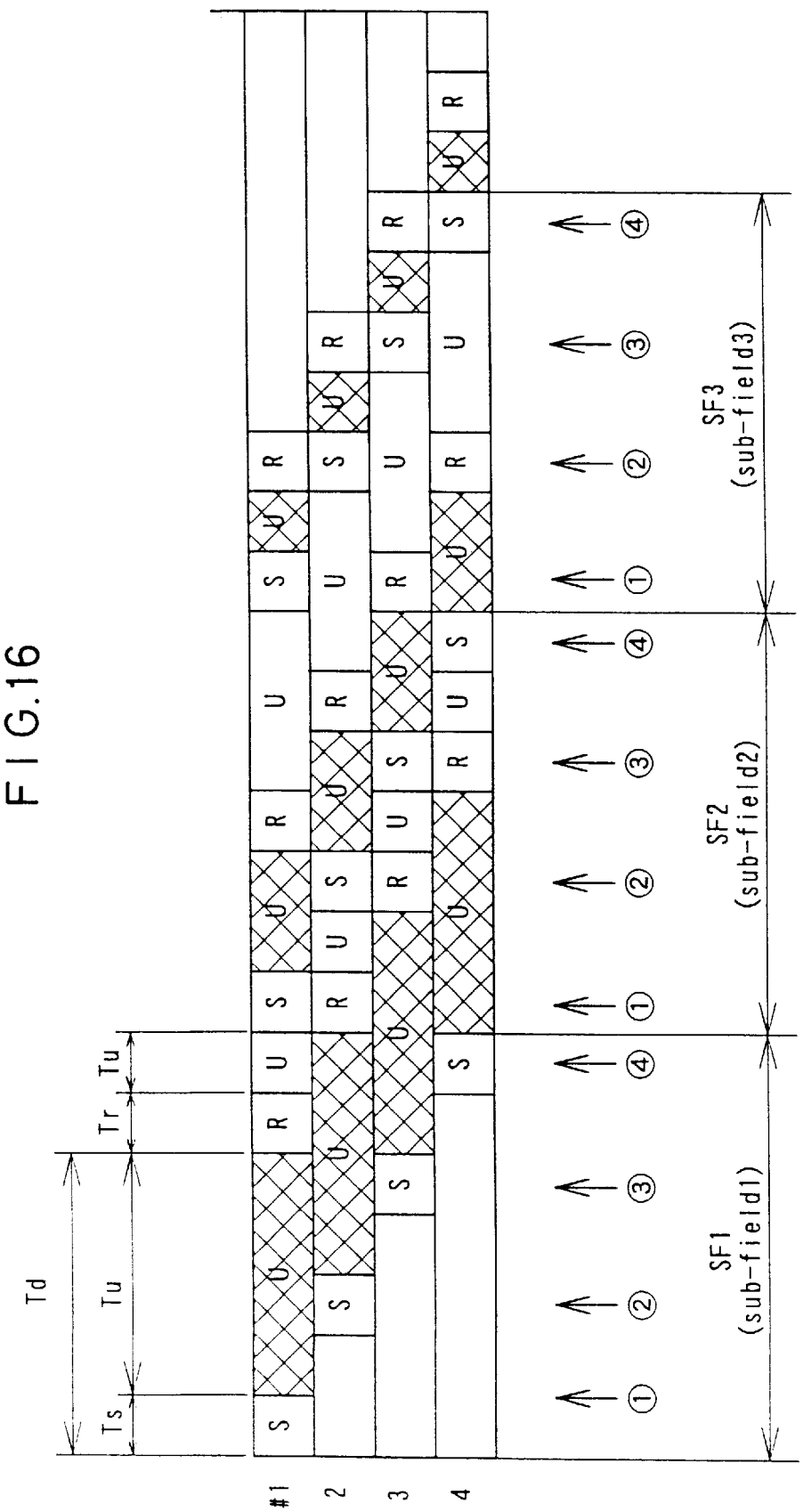
FIG. 16 is a timing chart of a time modulation process in the display apparatus according to the second embodiment.

In the display apparatus Db according to the second embodiment, as shown in FIGS. 15 and 16, the effective display periods Td of subfields are established such that the effective display period Td of the first subfield SF1 is longest, and the effective display periods of the other subfields are half shorter successively.

If the effective display periods Td are represented by magnitudes of data with the effective display period of the first subfield SF1 being "512", then the effective display period of the second subfield SF2 is "256", the effective display period of the third subfield SF3 is "128", the effective display period of the fourth subfield SF4 is "64", the effective display period of the fifth subfield SF5 is "32, the effective display period of the sixth subfield SF6 is "16", the effective display period of the seventh subfield SF7 is "8", and the effective display period of the eighth subfield SF8 is "4".

The gate line drive circuit 60 is controlled for its timing by the signal control circuit 64 to finish the selection of all rows within each of the subfields SF1–SF8. Therefore, the time in which to select one row with the gate line drive circuit 60 is defined by a time duration produced by dividing the time duration of one subfield by the number of rows of the driver 16. The time duration thus determined or a time shorter than this time duration is selected. Preferably, 1/n (n is a real number ranging from 1 to 5, preferably a real number ranging from 1 to 3) of the time duration is selected. Since the time in which to select a row with the gate line drive circuit 60 corresponds to a time to switch addresses in the driver 16, the time can be defined as an addressing time Ta.

In the display apparatus Db according to the second embodiment, the addressing time Ta is set to 1/n of the time duration described above, and, as shown in FIG. 16, each of the effective display periods Td is divided into a selected period Ts and an unselected period Tu. A reset period Tr and an unselected period Tu are provided between the effective display period Td of a certain subfield and the effective display period Td of a next subfield. FIG. 16 shows, for the sake of brevity, a simplified format in which one field is divided into three subfields SF1–SF3, with the number of lines being "4".

In the second embodiment, the selected period Ts and the reset period Tr are set to a time which is the same as the addressing time Ta. In each of the subfields SF1–SF8, the period excluding the selected period Ts and the reset period Tr, i.e., the period remaining when two addressing times are removed from the subfield period, is the unselected period Tu. In order to fully reset the actuator 14 from its displacement, i.e., to return the actuator 14 fully to its original position, the reset period Tr may be longer than the addressing time Ta.

In the second embodiment, furthermore, with respect to the pixels of a selected row, display times depending on the gradation levels of the pixels are assigned to the effective display periods Td in the subfields SF1–SF8 to generate data signals, and the data signals thus generated are outputted through the data line drive circuit 62 in the selected periods Ts in the subfields SF1–SF8.

Therefore, upon the start of one field, the gate line drive circuit 60 selects the pixels of a first row, and the data line drive circuit 62 supplies data signals to the pixels of the first row. The data signals supplied respectively to the pixels are data signals (e.g., on and off signals) generated by assigning the display times depending on the gradation levels to the each effective display periods Td of the subfields SF1–SF8. With respect to one pixel, the display time depending on the gradation level of the pixel is divided into time durations assigned to the subfields. At this time, the display time may be divided into time durations assigned to all the subfields, or may be divided into time durations assigned to some of the subfields.

For example, if the gradation level of the pixel is 1020, then all the subfields SF1–SF8 are selected. If the gradation level of the pixel is 656, then the first, third, and sixth subfields SF1, SF3, SF6 are selected.

The data signal is outputted to the pixel in such a form that the on signal is outputted with respect to selected subfields and the off signal is outputted with respect to unselected subfields.

In the unselected periods Tu, because the actuator 14 needs to remain flexurally displaced, it is preferable ideally to apply a fixed potential to the extent that does not affect the flexural displacement of the actuator 14.

However, inasmuch as the selection of all rows is finished in each subfield, data signals (on and off signals) with respect to another row successively appear in the unselected period Tu in each subfield. With respect to one pixel, the voltage waveform in the unselected period Tu of the pixel is determined by a pattern of data signals (a pattern in which on and off signals appear) with respect to a row other than the row to which belongs the pixel in the column to which belongs the pixel.

Specifically, the flexural displacement of the actuator 14 in the unselected period Tu is slightly varied by the voltage change (the voltage change depending on the pattern of on and off signals). Particularly if a number of rows output on signals or off signals, since a drop of the average voltage is large, the displayed states (luminance and gradation) of the pixel in the unselected period Tu may possibly become unstable.

Various driving processes, described below, for the display apparatus Db according to the second embodiment employ processes for solving the above problem. For example, as shown in FIGS. 17A through 17D, phase information is added to an on signal, an off signal, or the like.

Figure 17A:
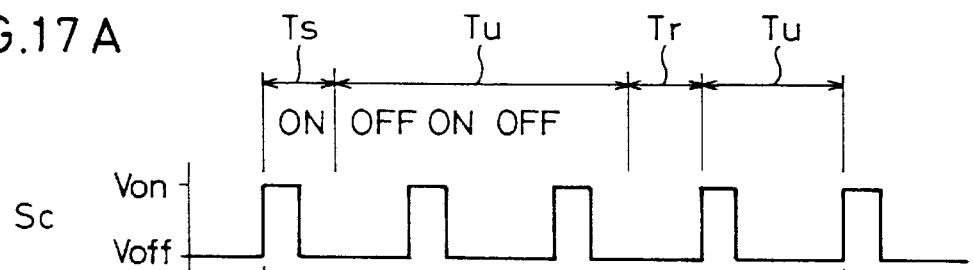
FIG. 17A is a diagram showing the waveform of a column signal (first column) in a first driving process.
Figure 17B:
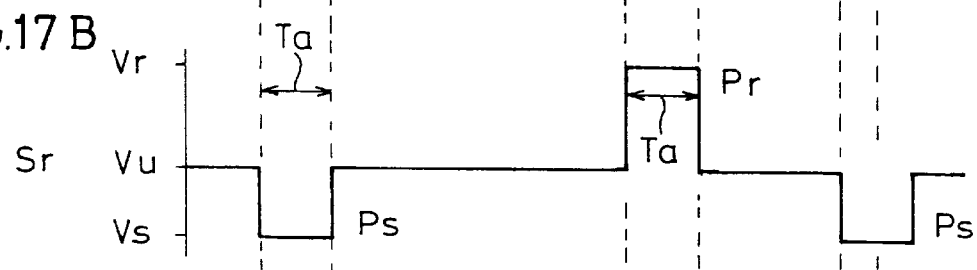
FIG. 17B is a diagram showing the waveform of a row signal (first row) in the first driving process.
Figure 17C:
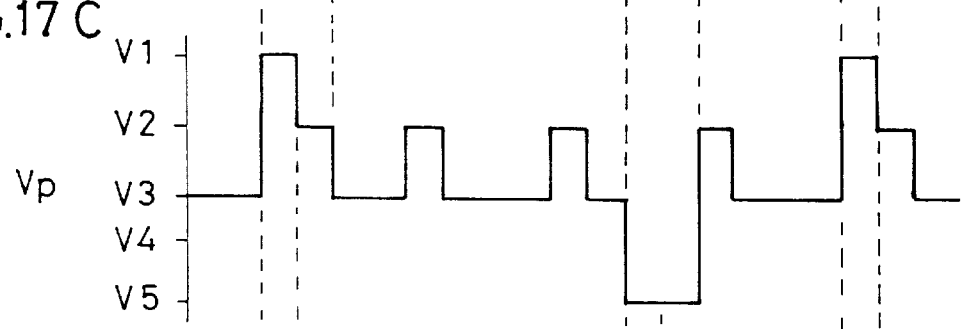
FIG. 17C is a diagram showing the waveform of a voltage applied between an electrode of a varistor and a lower electrode of a particular pixel (in a first row and a first column)

A first driving process for the display apparatus Db according to the second embodiment will specifically be described below with respect to timing charts shown in FIGS. 17A through 17C. In this example, only a display pattern of a first column of pixels across 8 rows will be described below for the sake of brevity. In FIGS. 17A–17C, it is assumed that a horizontal striped pattern is displayed, i.e., odd-numbered rows emit light and even-numbered rows extinct light. FIGS. 17A–17C show the respective waveforms of a column signal Sc for the first column, a row signal Sr for the first row, and a voltage Vp applied to a pixel in a first row and a first column.

According to the first driving process, the gate line drive circuit 60 outputs a selecting pulse signal Ps in a selected period Ts (addressing period Ta) in an effective display period Td, outputs an unselecting signal Su in an unselected period Tu in the effective display period Td and an unselected period Tu after a reset period Tr, and outputs a resetting pulse signal Pr in the reset period Tr.

The data line drive circuit 62 outputs an on signal in a selected period Ts in an effective display period Td of assigned subfields of the subfields, and outputs an off signal in a selected period Ts in an effective display period Td of other subfields. In the example shown in FIGS. 17A through 17C, an on signal (on voltage Von) is outputted in output periods corresponding to odd-numbered rows, and an off signal (off voltage Voff) is outputted in output periods corresponding to even-numbered rows.

According to the first driving process, as shown in FIG. 17A, phase information is added to only an on signal. The on signal is of such a waveform that it rises simultaneously when a selected period Ts starts, and has a pulse duration which is ½ of the addressing time Ta. The off signal is set to a constant off voltage Voff.

As shown in FIG. 17B, the selecting pulse signal Ps has such a pulse waveform that it has a pulse duration which is substantially the same as the selected period Ts (addressing time Ta) and has a peak voltage of Vs. The unselecting signal Su has such a pulse waveform that it has a pulse duration which is substantially the same as the reset period Tr (addressing time Ta) and has a peak voltage of Vr. As shown in FIG. 17A, therefore, the on signal comprises a pulse signal having a high level and a low level in one addressing time Ta.

At the pixel in a first row and a first column, in the selected period Ts, the on signal (on voltage Von) is applied to one of the electrodes (the electrode connected to the data line 48) of the varistor 90, and the selecting pulse signal Ps (selecting voltage Vs) is applied to the lower electrode 28b. Therefore, as shown in FIG. 17C, the voltage Vp applied between one of the electrodes of the varistor 90 and the lower electrode 28b has a highest level of V1.

Figure 17D:
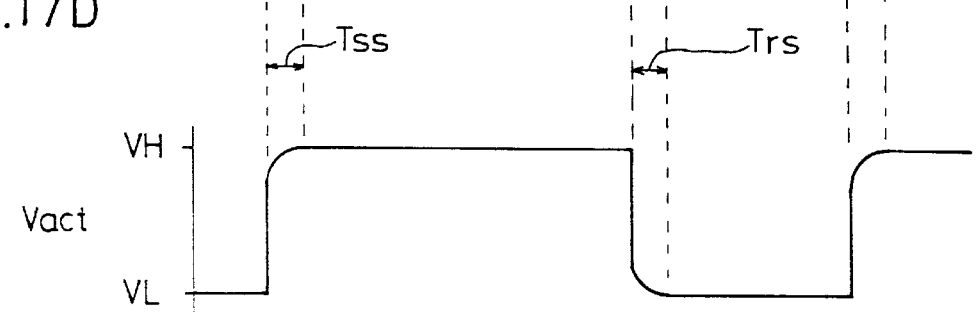
FIG. 17D is a diagram showing the waveform of a voltage applied to an actuator of a particular pixel (in a first row and a first column)

In this case, the varistor 90 is in an on state, and its resistance at this time is very small (the resistance of the varistor 90 when it is in the on state will be referred to as "on resistance"). The time constant due to the on resistance and the electrostatic capacitance of the varistor 90 is also small, allowing for a quick response to a change in the applied voltage Vp. As shown in FIG. 17D, therefore, a voltage Vact applied to the actuator 14 sharply increases to a predetermined voltage VH (e.g., 130 V). Because of the flexural displacement characteristics shown in FIG. 6, the pixel is brought into an on state, emitting light.

In the unselected period Tu after the selected period Ts, an on signal and an off signal are alternately applied to one of the electrodes of the varistor 90. Therefore, as shown in FIG. 17C, a voltage V3 which is the difference between the =off signal (off voltage Voff) and an unselecting signal (reference level Vu), and a voltage V2 which is the difference between the on signal (on voltage Von) and the reference level Vu are alternately applied between one of the electrodes of the varistor 90 and the lower electrode 28b.

In the unselected period Tu, the varistor 90 is in an off state, and its resistance at this time is very large (the resistance of the varistor 90 when it is in the off state will be referred to as "off resistance"). The time constant due to the on resistance and the electrostatic capacitance of the varistor 90 is also large, resulting in a slow response to a change in the applied voltage Vp. As shown in FIG. 17D, therefore, the voltage Vact applied to the actuator 14 is of a substantially constant level VH which results from the integration of alternately applied voltages. The emission of light from the pixel is maintained though the displacement of the actuator varies in a certain range.

In the reset period Tr, an off signal (off voltage Voff) is applied to one of the electrodes of the varistor 90, and a resetting pulse signal Pr (resetting voltage Vr) is applied to the lower electrode 28b. Therefore, as shown in FIG. 17C, the voltage Vp applied between one of the electrodes of the varistor 90 and the lower electrode 28b has a lowest level of V5.

In this case, the varistor 90 is brought back into an on state again, and its on resistance at this time is very small. Thus, as shown in FIG. 17D, the voltage Vact applied to the actuator 14 sharply drops to a predetermined voltage VL (e.g., −50 V). Because of the flexural displacement characteristics shown in FIG. 6, the pixel is brought into an off state, extincting light.

In the unselected period Tu after the reset period Tr, as with the unselected period Tu after the selected period Ts, an on signal and an off signal are alternately applied to one of the electrodes of the varistor 90, so that the voltages V2, V3 are alternately applied between one of the electrodes of the varistor 90 and the lower electrode 28b. Consequently, as shown in FIG. 17D, the voltage Vact applied to the actuator 14 is of a substantially constant level VL which results from the integration of alternately applied voltages. The extinction of light at the pixel is maintained though the displacement of the actuator varies in a certain range.

At another pixel, e.g., a pixel at two rows and one column, in the selected period Ts, an of signal (off voltage Voff) is supplied. Therefore, a voltage V2 which is the difference between the voltage of the off signal (Voff) and the voltage (Vs) of the selecting pulse signal Ps is applied between one of the electrodes of the varistor 90 and the lower electrode 28*b*. Since the actuator 14 at this pixel has returned to its original state in the preceding reset period Tr, the voltage Vact applied to the actuator 14 maintains the low level VL, and the extinction of light at the pixel is maintained.

The above operation is repeated successively to display an image on the screen of the display apparatus.

According to the first driving process, with respect to one pixel, in the cases where an on signal and an off signal are alternately outputted for respective rows and an on signal is outputted for all other rows, as shown in FIG. 17A, every other pulse signal or successive pulse signals, whose amplitude is (high level (V2)–low level (V3)), appear in the unselected period Tu of the pixel, as shown in FIG. 17C. If an off signal is outputted for all other rows, then no pulse waveform is produced in the unselected period Tu of the pixel, but a constant voltage (V3) appears therein.

Therefore, according to the first driving process, the difference between average voltages in the unselected period Tu can be reduced, so that changes in the resistance of the varistor 90 in the unselected period Tu are stabilized and hence the displayed states (luminance and gradation) in the driver 16 are also stabilized.

When the pixel is turned on, within an output period (the selected period Ts) of the selecting pulse signal Ps, an on signal whose polarity is different from the selecting pulse signal Ps is applied to one of the electrodes of the varistor 90. Consequently, the voltage (V1) sufficient to displace the actuator 14 in one direction for a time which is ½ of the addressing time Ta from the start of the selected period Ps is applied between one of the electrodes of the varistor 90 and the lower electrode 28*b*.

If an off signal is supplied in the selected period Ts, then since the voltage V2 is applied between one of the electrodes of the varistor 90 and the lower electrode 28*b* over the selected period Ts, the extinction of light in the reset period Tr is maintained with respect to the pixel to which the off signal is supplied.

According to the first driving process, the pulse duration of the resetting pulse signal Pr is substantially the same as the addressing time Ta. Thus, within the reset period Tr of the pixel, the voltage (V5) sufficient to return the actuator 14 to the original position is necessarily applied between one of the electrodes of the varistor 90 and the lower electrode 28*b*.

Specifically, while the resetting pulse signal Pr is being applied to the pixel, if an on signal is applied in another row, then the voltage V5 is applied in a period, excluding the pulse duration of the on signal, within the reset period Tr, and if an off signal is applied in another row, the voltage V5 is applied in the entire reset period Tr.

Consequently, it is possible to fully return the actuator 14 to extinct light in the reset period Tr, so that the luminance and gradation in subsequent display cycles will be free from any trouble, and any resetting voltage large enough to compensate for a difference between the patterns of the on and off signals will not be required.

Figure 18:
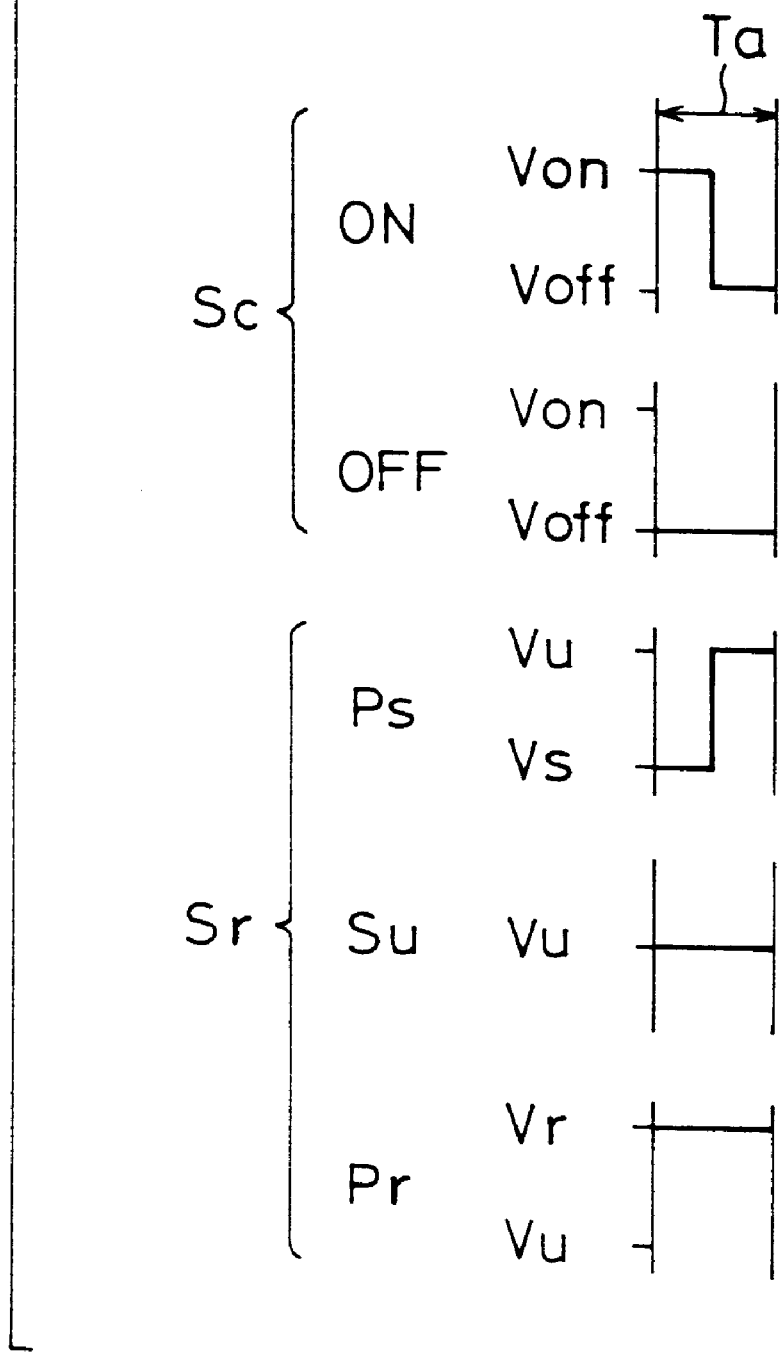
FIG. 18 is a diagram showing the forms of column and row signals according to a second driving process in the display apparatus according to the second embodiment.

A second driving process for the display apparatus Db according to the second embodiment will be described below. According to the second embodiment, as shown in FIG. 18, phase information is added to each of an on signal and a selecting pulse signal Ps. The on signal is of such a waveform that it rises simultaneously when a selected period Ts starts, and has a pulse duration which is ½ of the addressing time Ta. The selecting pulse signal Ps is of opposite phase to the on signal. An off signal is of a constant voltage (Voff). As shown in FIG. 19B, an unselecting signal Su and a resetting pulse signal Pr are outputted with the same timing as with the first driving process (see FIG. 17B).

Thus, each of the on signal and the selecting pulse signal Ps comprises a pulse signal having a high level and a low level in one addressing time Ta.

With respect to one pixel, in the cases where an on signal and an off signal are alternately outputted for respective rows and an on signal is outputted for all other rows, as shown in FIG. 19A, every other pulse signal or successive pulse signals, whose amplitude is (high level V2–low level V3), appear in the unselected period Tu of the pixel, as shown in FIG. 19C. If an off signal is outputted for all other rows, then no pulse waveform is produced in the unselected period Tu of the pixel, but a constant voltage (V3) appears therein.

According to the second driving process, as with the first driving process, therefore, the difference between average voltages in the unselected period Tu can be reduced, so that changes in the resistance of the varistor 90 in the unselected period Tu are stabilized and hence the displayed states (luminance and gradation) in the driver 16 are also stabilized.

For turning on the pixel, in the selected period Ts therefor, an on signal which is of opposite polarity to the selecting pulse signal Ps is applied to one of the electrodes of the varistor 90. Consequently, the voltage (V1) sufficient to displace the actuator 14 in one direction for a time which is ½ of the addressing time Ta from the start of the selected period Ps is applied between one of the electrodes of the varistor 90 and the lower electrode 28*b*.

If an off signal is supplied in the selected period Ts, then since the voltage V3 is applied between one of the electrodes of the varistor 90 and the lower electrode 28*b* over the selected period Ts, the extinction of light in the reset period Tr is maintained with respect to the pixel to which the off signal is supplied.

According to the second driving process, as with the first driving process, within the reset period Tr of the pixel, the voltage (V5) sufficient to return the actuator 14 to the original position is necessarily applied between one of the electrodes of the varistor 90 and the lower electrode 28*b*. Thus, the actuator 14 is fully returned for extincting light in the reset period Tr.

In this example, the waveform of the selecting pulse signal Ps is of opposite phase to the waveform of the on signal. However, the selecting pulse signal Ps may have a pulse waveform narrower or wider than the pulse duration of the on signal, i.e., may be in the form of a window pulse.

Figure 20:
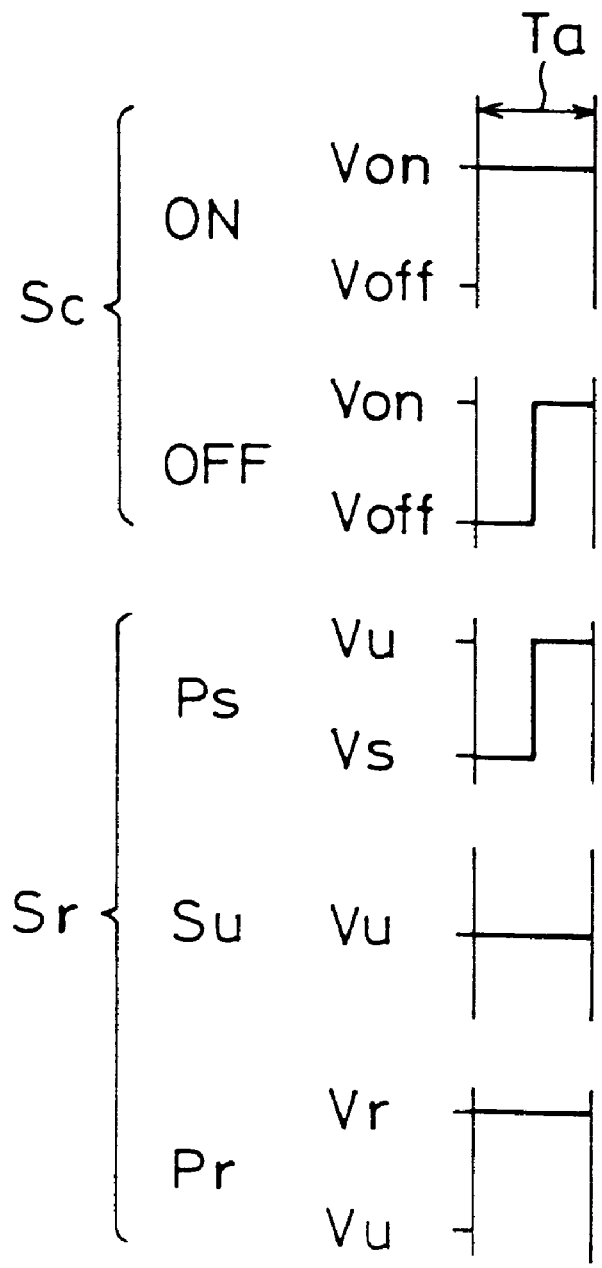
FIG. 20 is a diagram showing the forms of column and row signals according to a third driving process in the display apparatus according to the second embodiment.

A third driving process for the display apparatus Db according to the second embodiment will be described below. In the third driving process, as shown in FIG. 20, phase information is added to each of an off signal and a selecting pulse signal Ps. The off signal is of such a waveform that it rises at an intermediate time of a selected period Ts, and has a pulse duration which is ½ of the addressing time Ta. The selecting pulse signal Ps is in phase with the off signal. An on signal is of a constant voltage (Von). As shown in FIG. 21B, an unselecting signal Su and a resetting pulse signal Pr are outputted with the same timing as with the first driving process (see FIG. 17B).

Thus, each of the off signal and the selecting pulse signal Ps comprises a pulse signal having a high level and a low level in one addressing time Ta.

Figure 21A:
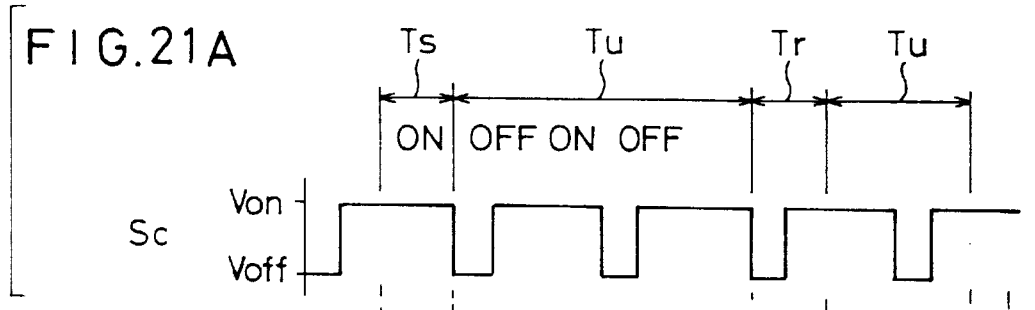
FIG. 21A is a diagram showing the waveform of a column signal (first column) in the third driving process.
Figure 21B:
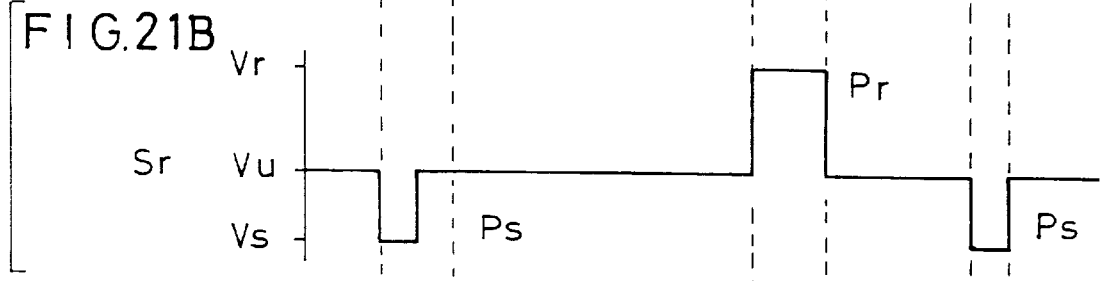
FIG. 21B is a diagram showing the waveform of a row signal (first row) in the third driving process.
Figure 21C:
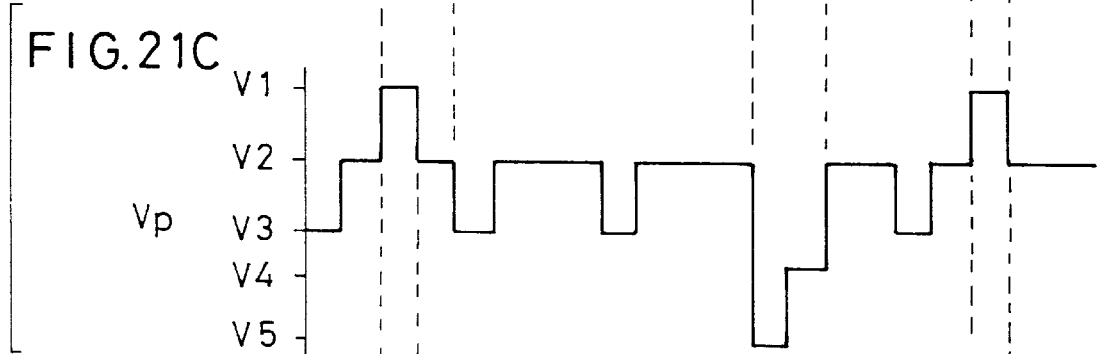
FIG. 21C is a diagram showing the waveform of a voltage applied between an electrode of a varistor and a lower electrode of a particular pixel (in a first row and a first column)
Figure 21D:
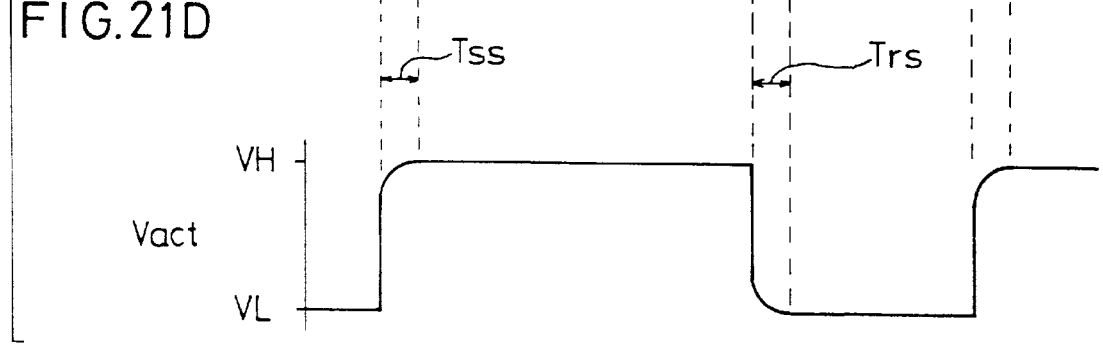
FIG. 21D is a diagram showing the waveform of a voltage applied to an actuator of a particular pixel (in a first row and a first column)

With respect to one pixel, in the cases where an on signal and an off signal are alternately outputted for respective rows and an off signal is outputted for all other rows, as shown in FIG. 21A, every other pulse signal or successive pulse signals, whose amplitude is (high level V2–low level V3), appear in the unselected period Tu of the pixel, as shown in FIG. 21C. If an on signal is outputted for all other rows, then no pulse waveform is produced in the unselected period Tu of the pixel, but a constant voltage (V2) appears therein. Thus, the selecting pulse signal Ps serves as a window pulse with respect to the on signal.

According to the third driving process, as with the first driving process, therefore, the difference between average voltages in the unselected period Tu can be reduced, so that changes in the resistance of the varistor 90 in the unselected period Tu are stabilized and hence the displayed states (luminance and gradation) in the driver 16 are also stabilized.

For turning on the pixel, in the selected period Ts therefor, the voltage (V1) sufficient to displace the actuator 14 in one direction for a period in which the selecting pulse signal Ps is outputted is applied between one of the electrodes of the varistor 90 and the lower electrode 28b. If an off signal is supplied in the selected period Ts, then since a voltage from the voltage V2 to the voltage V3 is applied between one of the electrodes of the varistor 90 and the lower electrode 28b over the selected period Ts, the extinction of light in the reset period Tr is maintained with respect to the pixel to which the off signal is supplied.

Figure 22:
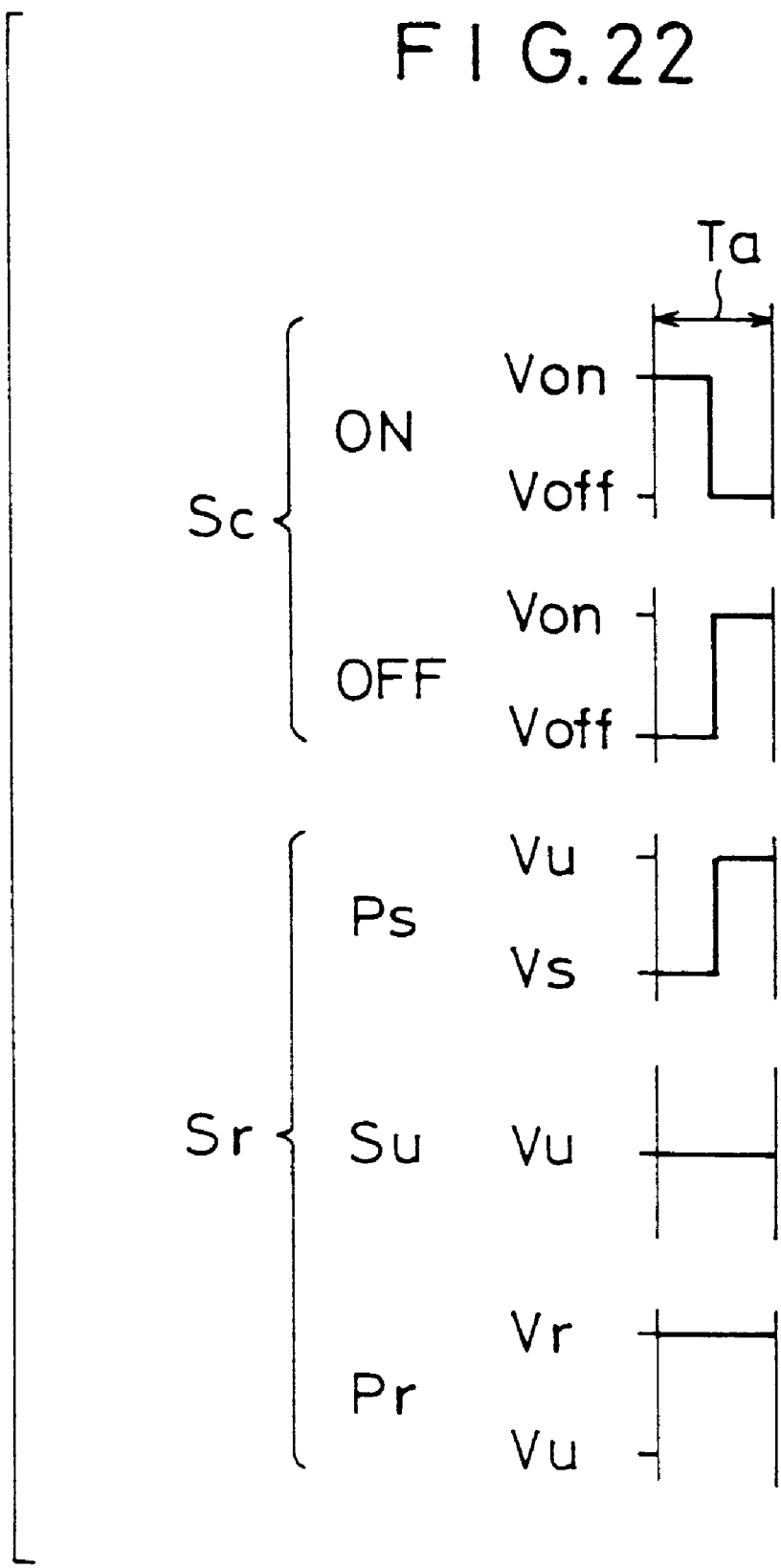
FIG. 22 is a diagram showing the forms of column and row signals according to a fourth driving process in the display apparatus according to the second embodiment.

A fourth driving process for the display apparatus Db according to the second embodiment will be described below. In the fourth driving process, as shown in FIG. 22, phase information is added to each of an on signal, an off signal, and a selecting pulse signal Ps. The on signal is of such a waveform that it rises simultaneously when a selected period Ts starts, and has a pulse duration which is ½ of the addressing time Ta. The off signal is of opposite polarity to the on signal. The selecting pulse signal Ps is in phase with the off signal. As shown in FIG. 23B, an unselecting signal Su and a resetting pulse signal Pr are outputted with the same timing as with the first driving process (see FIG. 17B).

Thus, each of the on signal, the off signal, and the selecting pulse signal Ps comprises a pulse signal having a high level and a low level in one addressing time Ta.

With respect to one pixel, in the cases where an on signal and an off signal are alternately outputted for respective rows, an on signal is outputted for all other rows, and an off signal is outputted for all other rows, as shown in FIG. 23A, successive pulse signals, whose amplitude is (high level V2–low level V3), appear in the unselected period Tu of the pixel, as shown in FIG. 23C.

According to the fourth driving process, since pulse signals successively appear in the unselected period Tu, the average voltage in the unselected period Tu does not depend on the pattern of on and off signals, but is of a substantially constant level. Therefore, changes in the resistance of the varistor 90 in the unselected period Tu are stabilized and hence the displayed states (luminance and gradation) in the driver 16 are also stabilized.

The pulse duration of the successive pulse signals differs depending on the pattern of on and off signals. In the illustrated example, the pulse duration of the successive pulse signals may be substantially the same as ½ of the addressing time Ta or the addressing time Ta. In view of the fact that the response speed of light emission at each pixel is somewhat low, the pulse duration can provide a low-pass filter effect, so that the displayed state (emitted state) in the selected period Ts is maintained as it is in the unselected period Tu, thus essentially eliminating the above unstable displayed states.

Inasmuch as the selecting pulse signal Ps and the on signal are of opposite phase to each other, the voltage (V1) sufficient to displace the actuator 14 in one direction for a time which is ½ of the addressing time Ta from the start of the selected period Ts is applied between one of the electrodes of the varistor 90 and the lower electrode 28b. If an off signal is supplied in the selected period Ts, then since the voltage V2 is applied between one of the electrodes of the varistor 90 and the lower electrode 28b over at least the selected period Ts, the extinction of light in the reset period Tr is maintained with respect to the pixel to which the off signal is supplied.

According to the fourth driving process, as with the first driving process, within the reset period Tr of the pixel, the voltage (V5) sufficient to return the actuator 14 to the original position is necessarily applied between one of the electrodes of the varistor 90 and the lower electrode 28b. Thus, the actuator 14 is fully returned for extincting light in the reset period Tr.

In this example, the waveform of the selecting pulse signal Ps is of opposite phase to the waveform of the on signal. However, the selecting pulse signal Ps may have a pulse waveform narrower or wider than the pulse duration of the on signal, i.e., may be in the form of a window pulse.

A fifth driving process for the display apparatus Db according to the second embodiment will be described below. In the fifth driving process, as shown in FIG. 24, phase information is added to each of an on signal, an off signal, a selecting pulse signal Ps, and a resetting pulse Pr. The on signal, the off signal, and the selecting pulse signal Ps are of the same pulse waveforms as with the fourth driving process. The resetting pulse signal Pr is of such a waveform that it rises simultaneously within the reset period Tr and falls within the reset period Tr, i.e., has a pulse duration narrower than the reset period Tr (addressing period Ta).

Thus, each of the on signal, the off signal, the selecting pulse signal Ps, and the resetting pulse Pr comprises a pulse signal having a high level and a low level in one addressing time Ta. As shown in FIG. 25B, an unselecting signal Su is outputted with the same timing as with the first driving process.

Figure 25A:
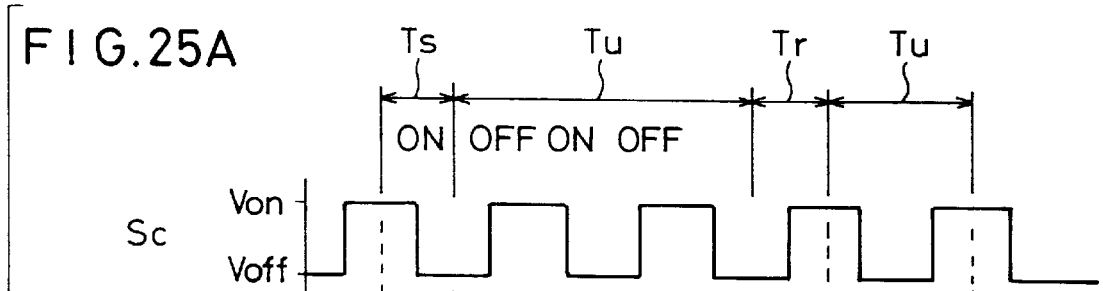
FIG. 25A is a diagram showing the waveform of a column signal (first column) in the fifth driving process.
Figure 25B:
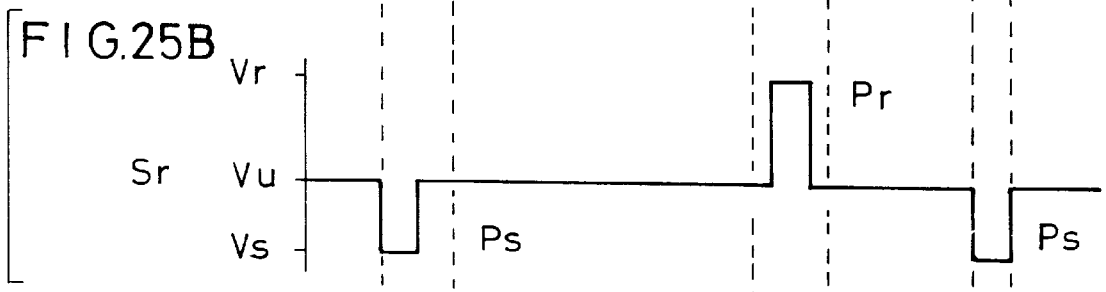
FIG. 25B is a diagram showing the waveform of a row signal (first row) in the fifth driving process.
Figure 25C:
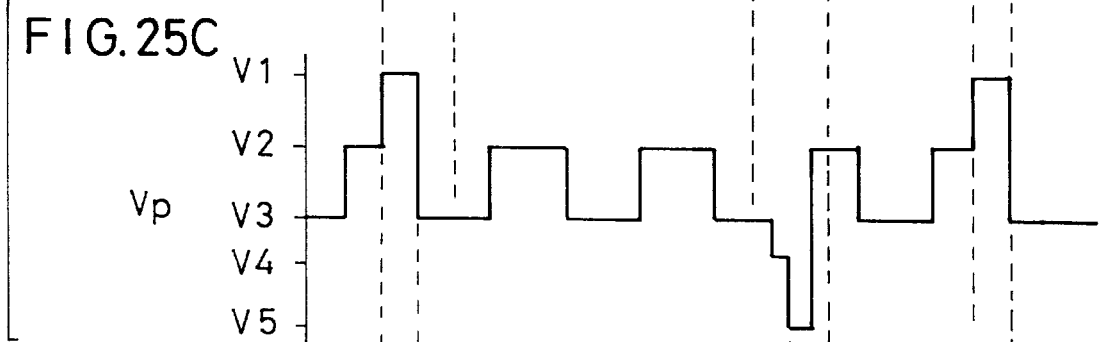
FIG. 25C is a diagram showing the waveform of a voltage applied between an electrode of a varistor and a lower electrode of a particular pixel (in a first row and a first column)
Figure 25D:
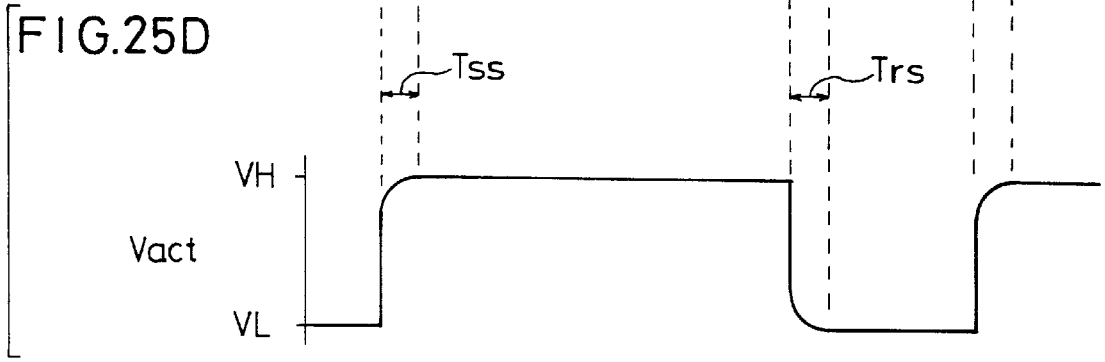
FIG. 25D is a diagram showing the waveform of a voltage applied to an actuator of a particular pixel (in a first row and a first column)

With respect to one pixel, in the cases where an on signal and an off signal are alternately outputted for respective rows, an on signal is outputted for all other rows, and an off signal is outputted for all other rows, as shown in FIG. 25A, successive pulse signals, whose amplitude is (high level V2–low level V3), appear in the unselected period Tu of the pixel, as shown in FIG. 25C.

According to the fifth driving process, since pulse signals successively appear in the unselected period Tu, the average voltage in the unselected period Tu does not depend on the pattern of on and off signals, but is of a substantially constant level. Therefore, changes in the resistance of the varistor 90 in the unselected period Tu are stabilized and hence the displayed states (luminance and gradation) in the driver 16 are also stabilized.

Inasmuch as the selecting pulse signal Ps and the on signal are of opposite phase to each other, the voltage (V1) sufficient to displace the actuator 14 in one direction in the selected period Ts is applied between one of the electrodes of the varistor 90 and the lower electrode 28b. If an off signal is supplied in the selected period Ts, then the extinction of light in the reset period Tr is maintained.

In the fifth driving process, in the reset period Tr, the resetting pulse signal Pr whose pulse duration is narrower than the reset period Tr and includes edges of on and off signals is outputted. Therefore, within the reset period Tr of the pixel, the voltage (V5) sufficient to return the actuator 14 to the original position is necessarily applied.

In the first through fifth driving processes, edges of the on signal, the off signal, and the selecting pulse signal are set to the position at ½ of the addressing period. However, they are not limited to the position at ½ of the addressing period, but may be set to any desired position in one addressing period Ta, insofar as the following conditions are satisfied:

(1) When the turning-on of the pixel is selected, the voltage (V1) sufficient to displace the actuator 14 in one direction is applied within the selected period Ts.

(2) When the turning-off of the pixel is selected, the voltage (V2–V3) for keeping the actuator 14 displaced at the time it is reset is applied within the selected period Ts.

(3) When the pixel is reset, the voltage (V5) sufficient to return the actuator 14 to the original position thereof is applied within the reset period Tr.

Preferred characteristics of the varistor 90 will be described below. The off resistance of the varistor 90 is established such that a variation in the voltage Vact applied to the actuator 14 due to a leakage current (discharge) owing to the off resistance in the unselected period Tu is kept within 5%. If the off resistance were too small, then electric energy charged in the actuator 14 in the selected period Ts would be discharged, losing the memory function.

Therefore, a variation in the voltage Vact applied to the actuator 14 in the unselected period Tu may be represented by the sum of a variation (5%) due to a divided voltage by the electrostatic capacitance of the varistor 90 and a variation due to the discharged leakage current.

With the off resistance being thus established, the CR time constant in the unselected period Tu is increased, providing a low-pass filter effect to smooth the voltage Vact applied to the actuator 14 in the unselected period Tu and hence maintain the voltage Vact applied to the actuator 14 at a substantially constant level. As a consequence, the actuator 14 can keep its displacement in the selected period Ts or the reset period Tr.

The on resistance of the varistor 90 is set to such a value that the voltage Vact applied to the actuator 14 increases to 95% of the predetermined voltage VH, in an effective selected period Tss (in the examples shown in FIGS. 17A–17D and 19A–19D, a period from the start of the selected period Ts to ½ of the addressing time). In the examples shown in FIGS. 17D and 19D, the on resistance of the varistor 90 is set to such a value that the voltage Vact applied to the actuator 14 increases to 95% of the predetermined voltage (high level VH), in the effective selected period Tss.

This holds true for an effective reset period Trs (in the examples shown in FIGS. 17A–17D and 19A–19D, a period from the start of the reset period Tr to ½ of the addressing time). The on resistance of the varistor 90 is set to such a value that the voltage Vact applied to the actuator 14 decreases to 95% of the predetermined voltage VL, in the effective reset period Trs.

With the above setting, the CR time constant in the effective selected period Tss is reduced, increasing the response to the rise of the applied voltage Vp. Thus, when an on signal is supplied to one of the electrodes of the varistor 90 in the selected period Ts, the voltage Vact applied to the actuator 14 sharply increases in the effective selected period Tss, and instantaneously reaches 95% of the predetermined voltage VH. Therefore, the actuator 14 is instantaneously flexurally displaced in one direction in the effective selected period Tss.

The above principle also holds true in the reset period Tr. With the above conditions satisfied, the CR time constant in the effective reset period Trs is reduced, increasing the response to the rise of the applied voltage Vp. Thus, when the voltage Vp applied between one of the electrodes of the varistor 90 and the lower electrode becomes the voltage Vt in the reset period Tr, the voltage Vact applied to the actuator 14 sharply decreases in the effective reset period Trs, and instantaneously reaches 95% of the predetermined voltage VL. Therefore, the actuator 14 instantaneously returns to its original state in the effective reset period Trs.

Specific numerical values as they are applied will be considered below. If the number of rows in the driver 16 is 16 and 32 gradations (5 subfields) are assumed, then the memory period for the longest subfield is a selected period for the other 15 rows. Therefore, a variation in the voltage Vact applied to the actuator 14, which is allowed in a $\frac{1}{15}$ memory period, is calculated as $5\% \times \frac{1}{15} = 0.34\%$ (0.0034).

If the actuator 14 has an electrostatic capacitance of 500 pF and the varistor 90 has an electrostatic capacitance of 50 pF, then when the off resistance is 1 GΩ and the on resistance is 10 Ω, a variation in the voltage Vact applied to the actuator 14 in a $\frac{1}{15}$ memory period is 4.548 V with respect to Vact=90 V as a result of a simulation, so that 4.548/90=0.05. When the off resistance is 20 MΩ and the on resistance is 10 Ω, a variation in the voltage Vact applied to the actuator 14 in a $\frac{1}{15}$ memory period is 4.82/90=0.0535 ($\approx 5\% + 0.34\%$) as a result of a simulation.

It has been confirmed by way of a simulation that when the on resistance is set to 50 kΩ or lower, the voltage Vact applied to the actuator 14 increases to 95% of the predetermined voltage VH in the effective selected period Tss.

Therefore, the varistor 90 should preferably satisfy the following characteristics:

Off resistance >20 MΩ,

On resistance <50 kΩ,

Electrostatic capacitance <50 pF.

Voltage settings for various signals in the display apparatus Dp according to the second embodiment will be described below. These voltage settings are settings in the case where the absolute values of the on and off signals are not equal to each other.

It is assumed that the voltage applied to the varistor 90 (hereinafter referred to as "varistor applied voltage") is represented by Vval, the characteristic voltage of the varistor 90 (varistor voltage) by ±VB, and the voltage applied to the actuator 14 (hereinafter referred to as "actuator applied voltage") by Vact. Voltages Vrow of various signals Sr for rows include the voltage Vs of the selecting pulse signal Ps, the voltage Vu of the unselecting signal Su, and the voltage Vr of the resetting pulse signal Pr, and voltages Vcol of various signals Sc for columns include the voltage Von of the on signal and the voltage Voff of the off signal. The selecting voltage Vs is Vs<0.

[1] One setting condition is that the voltage Vact applied to the actuator 14 in the unselected period Ts does not depend on the voltages Vcol of various signals Sc for columns.

(A) If an on signal is outputted in the selected period Ts:

(a) the actuator applied voltage Vact:

$$\text{Vact} = \text{Von} - \text{Vs} - \text{VB} \tag{1}$$

(b) the varistor applied voltage Vval if an on signal is outputted in the unselected period:

$$\text{Vval} = (\text{Vs} - \text{Vu}) + \text{VB} \tag{2}$$

(c) the varistor applied voltage Vval if an off signal is outputted in the unselected period:

$$Vval=(Vs-Vu)+(Voff-Von)+VB \quad (3)$$

(B) If an off signal is outputted in the selected period:
(a) the actuator applied voltage Vact:

$$Vact=Voff-Vs-VB \quad (4)$$

(b) the varistor applied voltage Vval if an on signal is outputted in the unselected period:

$$Vval=(Vs-Vu)+(Von-Voff)+VB \quad (5)$$

(c) the varistor applied voltage Vval if an of f signal is outputted in the unselected period:

$$Vval=(Vs-Vu)+VB \quad (6)$$

Since Vval<0 in the equation (2),
Vval≧-VB
∴Vs-Vu≧-2VB
Since Vval<0 in the equation (3),
Vval≧-VB
∴(Vs-Vu)+(Voff-Von)≧-2VB
Since Vval>0 in the equation (5),
Vval≦VB
∴(Vs-Vu)+(Von-Voff)≦0
Since Vval<0 in the equation (6),
Vval≧-VB
∴(Vs-Vu)≧-2VB
Hence, $$Vs-Vu≧-2VB, Von-Voff≦Vu-Vs \quad (7)$$

$$Von-Voff≦(Vs-Vu)+2VB \quad (8)$$

Figure 26A:
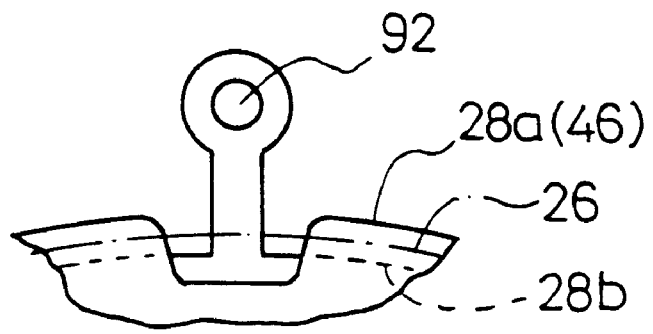
FIG. 26A is a view showing an example in which an actuator and a gate line are disposed on a board.
Figure 26B:
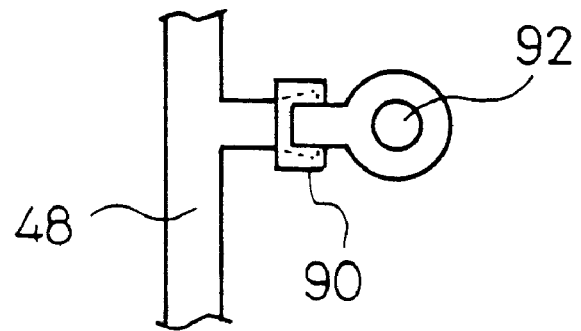
FIG. 26B is a view showing an example in which a varistor and a data line are disposed on the rear surface of a board.

[2] Then, the difference between the on and off voltages is established as a miaximum value.
Other than the equations (7), (8).
(A) if an off signal is outputted in the selected period,
Von≧Vs+VB
(B) if an off signal is outputted in the selected period,
Voff≧Vs+VB
[3] If an off signal is outputted in the reset period,
Vr≧VB+Voff
It is preferable to satisfy the above voltage settings [1], [2], [3]. Examples of the settings are:
Vrow:
Vs=-161 V, Vu=0 V, Vr=161 V, VB=120 V;
Vcol:
Von=82 V, Voff=0 V.
In the display apparatus Db according to the second embodiment, the actuators 14, the varistors 90, and the gate lines 46 are disposed on the actuator board 18, and the data lines 48 are disposed on the rear surface of the actuator board 18. However, as shown in FIGS. 26A and 26B, the actuators 14 and the gate lines 46 may be disposed on the actuator board 18, and the varistors 90 and the data lines 48 may be disposed on the rear surface of the actuator board 18.

Figure 27:
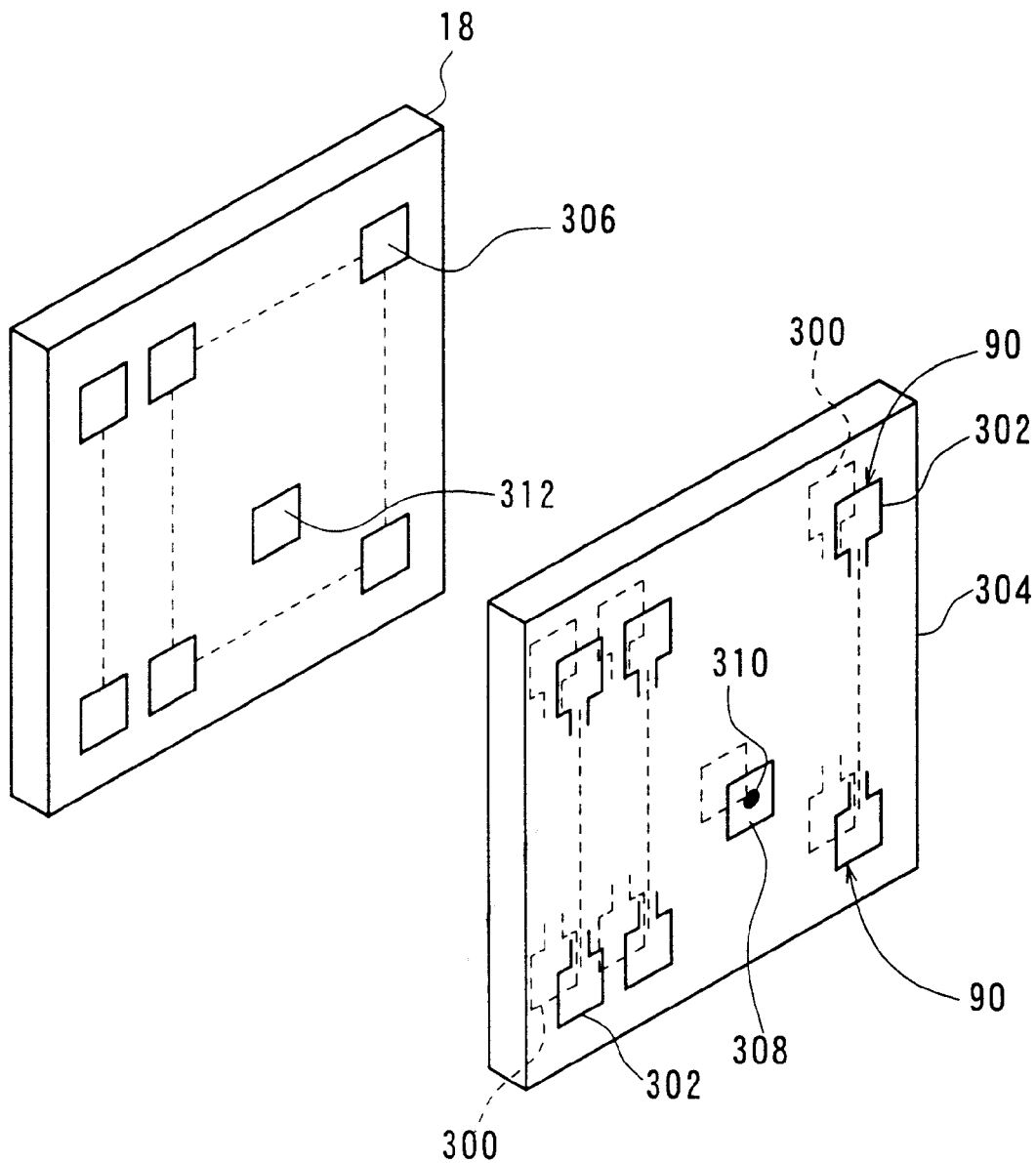
FIG. 27 is a view showing an example in which a varistor board is bonded to an actuator board.

In this case, as shown in FIG. 27, a varistor board 304 with electrodes 300, 302 disposed on both surfaces thereof is prepared in addition to the actuator board 18 with a number of actuators 14 (not shown) disposed on a principal surface thereof. The actuator board 18 has through holes 66 (see FIG. 1) defined therein from one principal surface to the other in alignment with the respective actuators 14, and electrode pads 306 are disposed on the other principal surface of the actuator board 18 at the respective through holes 66. The electrode pads 306 are disposed in positions corresponding to the actuators 14 on one principal surface of the actuator board 18.

As shown in FIG. 27, the electrodes 300, 302 on the varistor board 304 are positioned so as to be aligned with the respective actuators 14 (more precisely, the electrode pads 306) when the varistor board 304 is bonded to the reverse surface of the actuator board 18. The electrodes 300, 302 on both surfaces of the varistor board 304 and the board material present between the electrodes 300, 302 function as the varistors 90 aligned with the actuators 14.

The electrodes 302, 302 disposed on the reverse surface of the varistor 304 (remote from the actuator board 18) are interconnected to provide the data lines 48. Electrodes 308 which require no varistor function, e.g., electrodes connected to the gate lines 46, are electrically connected to electrode pads 312 connected to the gate lines, which are disposed on the other principal surface of the actuator board 18, through through holes 310, for example.

The actuator board 18 and the varistor board 304 are bonded to each other as follows: The other principal surface of the actuator board 18, on which the electrode pads 306 are disposed, and one principal surface of the varistor board 304 are held against each other, and the electrode pads 306 on the actuator board 18 and the electrodes 300 on the varistor board 304 are bonded to each other by solder or electrically conductive resin. With the electrode pads 306 and the electrodes 300 thus bonded to each other, electrodes of the actuators 14, e.g., the upper electrodes 28a, and the data lines 48 are electrically connected to each other by the varistors 90.

The thickness of the varistor board 304 is determined by the varistor voltage VB which is required, and the electrode area of the varistors 90 is determined by the electrostatic capacitance and current capacity which are required.

Leakage currents between closely positioned electrodes 300, 300 on one principal surface of the varistor board and between closely positioned electrodes 302, 302 on the one principal surface of the varistor board can be reduced, and the freedom of the layout of these electrodes 300, 302 can be increased, by the following two processes:

(1) Grooves are defined between those closely positioned electrodes 300, 300 and also between those closely positioned electrodes 302, 302. The distances between the electrodes 300, 300 and between the electrodes 302, 302 are thus substantially increased, increasing the varistor voltage VB.

(2) The particle diameter of the material of the varistor board 304 is increased, and the thickness of the varistor board 304 is reduced. This is effective in increasing the varistor voltage VB between the closely positioned electrodes 300, 300 and between the closely positioned electrodes 302, 302 while maintaining the varistor voltage VB between the confronting electrodes 300, 302.

Because the varistor board 304 for providing the varistors 90 is prepared in addition to the actuator board 18 and bonded to the actuator board 18, a wiring structure for connecting the varistors 90 between the actuators 14 and the data lines 48 is highly simplified, thus reducing the size of the display apparatus Db, increasing the yield of display apparatus Db, and reducing the cost of the display apparatus Db.

In the display apparatus Db according to the second embodiment, the upper and lower electrodes 28a, 28b are disposed on the upper and lower surfaces of the shape holding layer 26. Alternatively, the shape holding layer 26 may be disposed directly on the vibrator 22, and the pair of electrodes 28 (the electrode 28a connected to the gate line and the electrode 28b connected to the data line) may be disposed on the upper surface of the shape holding layer 26.

Figure 28A:
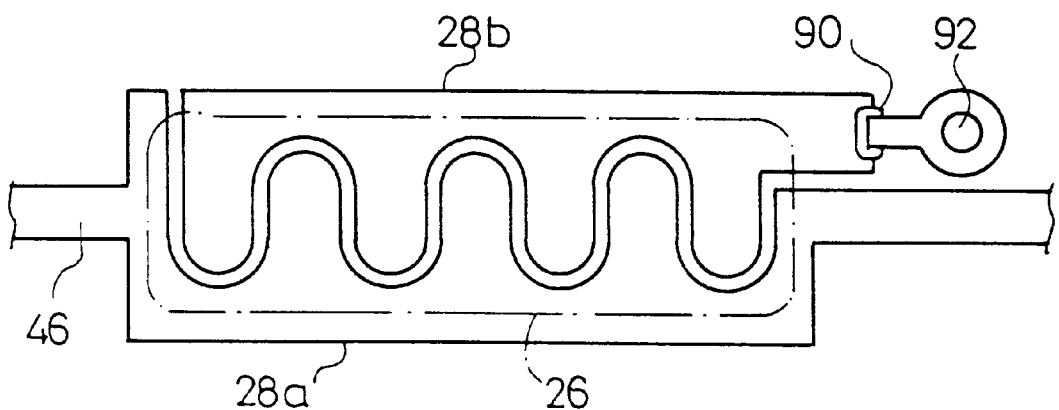
FIG. 28A is a plan view of an arrangement having a pair of interdigitating electrodes disposed on a shape holding layer in the actuator of the display apparatus according to the second embodiment.
Figure 28B:
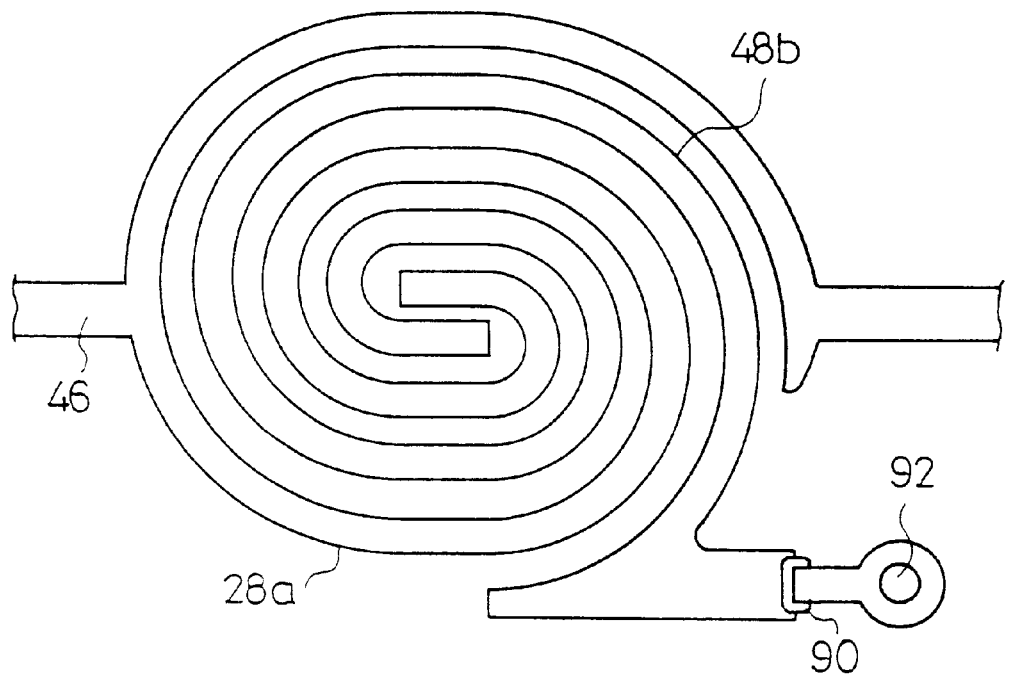
FIG. 28B is a plan view of another arrangement having a pair of spiral electrodes on the shape holding layer.

The pair of electrodes 28a, 28b may be in an interdigitating pattern in which the electrodes 28a, 28b are alternately positioned, as shown in FIG. 28A, or may be in a spiral pattern in which the electrodes 28a, 28b are parallel to each other and spaced from each other, as shown in FIG. 28B. Alternatively, as shown in FIG. 12, the pair of electrodes 28a, 28b may be in a multi-branch pattern. In this case, as with the display apparatus Da according to the first embodiment, the varistors 90 may be disposed on one principal surface and reverse surface of the actuator board 18 (see FIG. 10). In the structure shown in FIG. 12, varistors (not shown) are disposed on the reverse surface of the actuator board 18, and the electrodes 28a are electrically connected to the varistors through the relay conductors 30 and the through holes 66.

Figure 29:
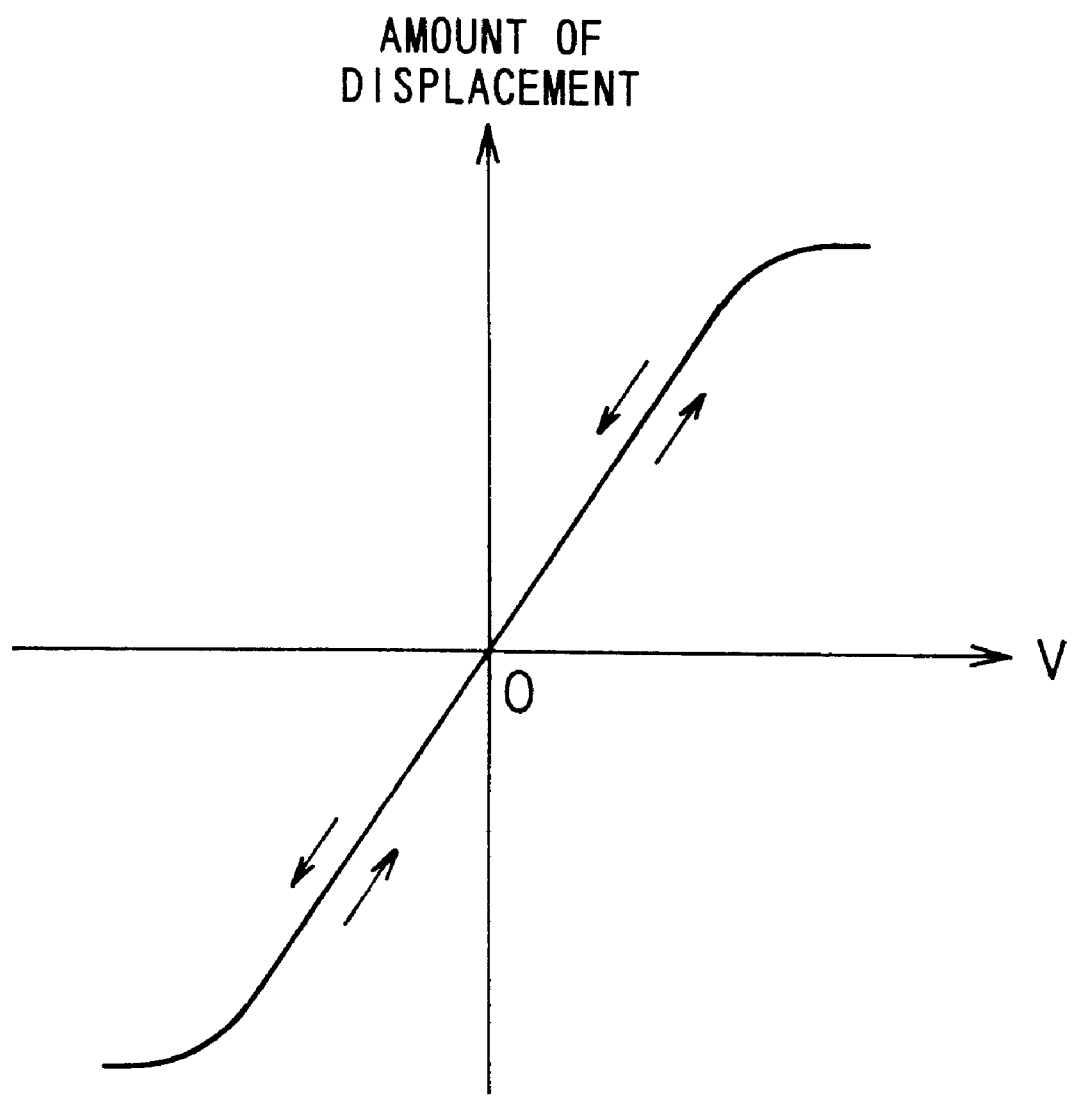
FIG. 29 is a diagram showing the flexural displacement characteristics of a material with no hysteresis.

In the display apparatus Db which employs the varistors 90 according to the second embodiment, since each of the varistors 90 has a memory capability for the voltage Vact applied to the actuator 14, the shape holding layer 26 of the actuator 14 may be made of a material which exhibits no hysteresis in the flexural displacement characteristics as shown in FIG. 29. Accordingly, a wider choice of materials is available for the shape holding layer 26.

A display apparatus Dc according to a third embodiment of the present invention will be described below with reference to FIGS. 30 through 38. Those parts of the display apparatus Dc according to the third embodiment which correspond to those of the display apparatus Da according to the first embodiment are denoted by identical reference characters, and will not be described below.

Figure 30:
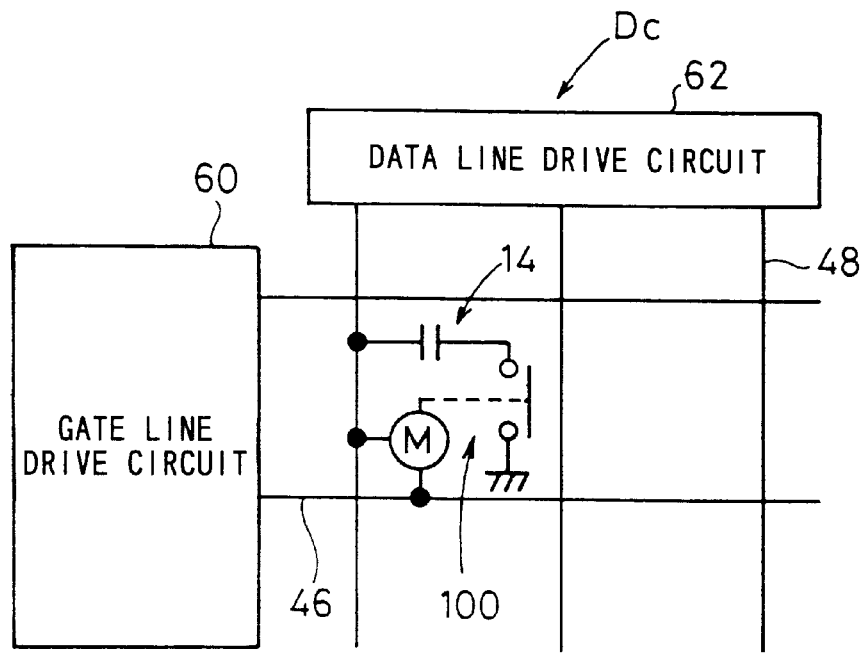
FIG. 30 is a diagram showing an equivalent circuit of each pixel disposed in a driver of the display apparatus according to the third embodiment.

As shown in FIG. 30, the display apparatus Dc according to the third embodiment is of a structure which is substantially the same as the display apparatus Da according to the first embodiment. However, the display apparatus Dc according to the third embodiment differs from the display apparatus Da according to the first embodiment in that a piezoelectric relay 100 is connected between the upper electrode 28a and the ground line 68 of each of the actuators 14. The display apparatus Dc according to the third embodiment structurally differs from the display apparatus Da according to the first embodiment because of the provision of the piezoelectric relay 100.

Figure 31:
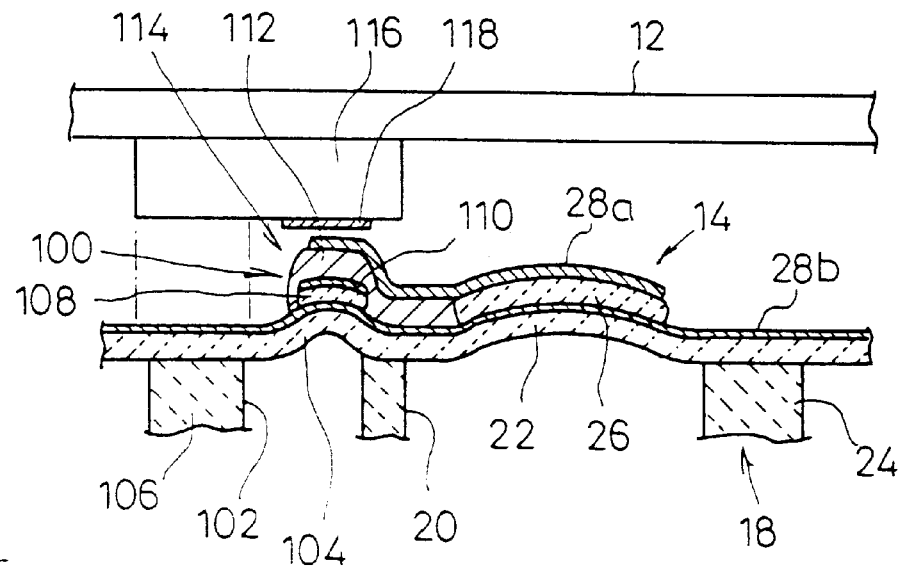
FIG. 31 is a fragmentary cross-sectional view of an actuator and a piezoelectric relay in the display apparatus according to the third embodiment.
Figure 32:
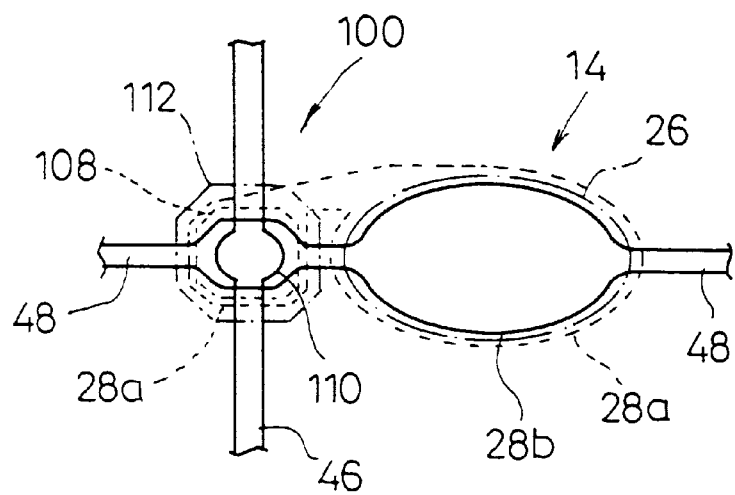
FIG. 32 is a plan view of the actuator and the piezoelectric relay in the display apparatus according to the third embodiment.

Specifically, as shown in FIGS. 31 and 32, the piezoelectric relay 100 is disposed in a position adjacent to each of the actuators 14 on the actuator board 18. The actuator board 18 has a cavity 102 defined therein for providing the piezoelectric relay 100 as well as a cavity 20 defined therein for providing the actuator 14. The cavity 102 communicates with the exterior through a through hole (not shown) of small diameter which is defined in a rear surface of the actuator board 18.

The actuator board 18 has a smaller thickness in those regions where the cavities 102 are present and a greater thickness in the other regions thereof. The thinner regions are of a structure easily vibratable under external stresses and each serve as a vibrator 104 for the piezoelectric relay. The regions other than the cavities 102 are thicker and each serve as a mount region 106 for the piezoelectric relay, which supports the vibrator 104.

Each piezoelectric relay 100 comprises, in addition to the vibrator 104 and the mount region 106, a relay assembly 114 which comprises a shape holding layer 108 as a piezoelectric/electrostrictive layer, antiferrodielectric layer, or the like disposed on the vibrator 104, a lower electrode 28b disposed on a lower surface of the shape holding layer 108, an intermediate electrode 110 (an electrode connected to a gate line 46) disposed on an upper surface of the shape holding layer 108, an insulating layer 112 disposed on the intermediate electrode 110, and an upper electrode 28a disposed on the insulating layer 112, a black matrix layer 116 disposed on a surface of a light guide plate 12 which faces a driver, at a position aligned with the piezoelectric relay 100, and a ground electrode 118 disposed on a surface of the black matrix layer 116 which faces the piezoelectric relay 100. The black matrix layer 116 should preferably comprise a metal film of Cr, Al, Ni, Ag, or the like because it can suppress attenuation and scattering of light propagated in the light guide plate 12 since the metal film absorbs less light. Though the black matrix layer 116 is employed in the illustrated embodiment, no black matrix layer 116 may be employed, and a transparent electrode may be employed as the ground electrode 118.

Of the above various electrodes, the lower electrode 28b is shared by the lower electrode (the electrode connected to the data line 48) 28b of the actuator 14, and the upper electrode 28a is shared by the upper electrode 28a of the actuator 14.

In the display apparatus Dc according to the third embodiment, a gate line 46 is selected when a selecting signal, e.g., a positive high-level potential, is applied to the gate line 46. At this time, an unselecting signal, e.g., a ground potential, is applied to gate lines of unselected rows. In the controlling of gradations according to the time modulation process, a selecting signal (positive high-level potential) is supplied to a gate line 46 in the selected period Ts in one subfield, and an unselecting signal (ground potential) is supplied in the unselected period Tu.

A driving process for the display apparatus Dc according to the third embodiment to display a horizontal striped pattern will be described below.

The gate line drive circuit 60 outputs a selecting signal to a certain gate line 46 in the selected period Ts of each subfield, and outputs an unselecting signal in the unselected period Tu. The data line drive circuit 62 outputs a driving signal in the selected periods Ts of assigned subfields of the subfields, and outputs a resetting signal in the selected periods Ts of other subfields. In this example, the data line drive circuit 62 outputs the driving signal in the selected periods Ts corresponding to odd-numbered rows, and outputs the resetting signal in the selected periods Ts corresponding to even-numbered rows.

Specifically, with respect to each of the pixels of a certain odd-numbered row selected by the gate line drive circuit 60, in the selected periods Ts of assigned subfields of the selected row, a selecting signal (positive high-level potential) is supplied to the intermediate electrode 110 of the piezoelectric relay 100 corresponding to the actuator 14, and a driving signal (negative potential) is supplied to the lower electrode 28b. In the unselected periods Tu, an unselecting signal (ground potential) is supplied to the intermediate electrode 110, and a driving signal (negative potential) is supplied to the lower electrode 28b.

In the selected periods Ts of unassigned subfields of the selected row, a selecting signal (positive high-level potential) is supplied to the intermediate electrode 110 of the piezoelectric relay 100 corresponding to the actuator 14, and a resetting signal (positive low-level potential) is supplied to the lower electrode 28b. In the unselected periods Tu, an unselecting signal (ground potential) is supplied to the intermediate electrode 110, and a resetting signal (positive low-level potential) is supplied to the lower electrode 28b.

The potential difference between the ground potential and the driving signal (negative potential) is established so as to correspond to the operating voltage Vh, the potential difference between the selecting signal (positive high-level potential) and the driving signal (negative potential) is established so as to correspond to an on voltage sufficient to flexurally displace the piezoelectric relay 100 in a direction toward the black matrix layer 116, and the potential difference between the unselecting signal (ground potential) and the driving signal (negative potential) is established so as to correspond to an off voltage sufficient to displace the piezoelectric relay 100 in a direction away from the black matrix layer 116.

The potential difference between the ground potential and the resetting signal (positive low-level potential) is established to correspond to the resetting voltage Vr, the potential difference between the selecting signal (positive high-level potential) and the resetting signal (positive low-level potential) is established to correspond to an on voltage sufficient to flexurally displace the piezoelectric relay 100 in a direction toward the black matrix layer 116, and the potential difference between the unselecting signal (ground potential) and the resetting signal (positive low-level potential) is established to correspond to an off voltage sufficient to displace the piezoelectric relay 100 in a direction away from the black matrix layer 116.

Therefore, in the selected periods Ts of assigned subfields of the selected row, when the selecting signal is supplied to the intermediate electrode 110, since the piezoelectric relay 100 is flexurally displaced into an on state, the upper electrode 28a contacts the ground electrode 118 beneath the black matrix layer 116, and is electrically brought to a ground potential. At this time, if the driving signal is supplied to the lower electrode 28b, then because the operating voltage Vh is applied between the upper electrode 28a and the lower electrode 28b of the actuator 14, the pixel is in an on state, emitting light, in view of the flexural displacement characteristics shown in FIG. 6.

In the unselected period Tu of each subfield, the piezoelectric relay 100 is returned to its original position and is in an off state. Therefore, the upper electrode 28a poses a high impedance, keeping a data signal supplied, i.e., the operating voltage Vh applied, to the actuator 14. Consequently, the actuator 14 remains displaced beyond a certain level, maintaining the on state of the pixel.

At each of the pixels of a certain even-numbered row selected by the gate line drive circuit 60, the resetting voltage Vr is applied between the upper electrode 28a and the lower electrode 28b in the selected period Ts of each subfield. Because of the flexural displacement characteristics shown in FIG. 6, the piezoelectric relay 100 is returned to its original position and is in an off state. Therefore, the light emitted from the pixels of the selected row is extinct. In the unselected period Tu of each subfield, since the data signal remains supplied, i.e., the resetting signal remains applied, to the actuator 14, the actuator 14 is kept in its original returned position, maintaining the off state of the pixel.

In the displaying apparatus Dc according to the third embodiment, as with the displaying apparatus Da according to the first embodiment, it is possible to prevent data signals from being supplied to an unselected row. Therefore, the pixels (actuators) 14 of the unselected row are not required to be driven, so that the electric energy consumption by the display apparatus can effectively be reduced. Since pixels can emit light in the unselected periods Tu, the display apparatus can achieve high raster luminance. It is not necessary to provide a large-scale wiring pattern on the actuator board 18, and the wiring in the display apparatus can be simplified.

In the displaying apparatus Dc according to the third embodiment, the actuators 14, the piezoelectric relays 100, and the ground electrodes 118 are disposed on the actuator board 18. However, as shown in FIG. 33, the actuators 14 may be disposed on the actuator board 18, and the piezoelectric relays 100 and the ground electrodes 118 may be disposed on the rear surface of the actuator board 18.

Figure 33:
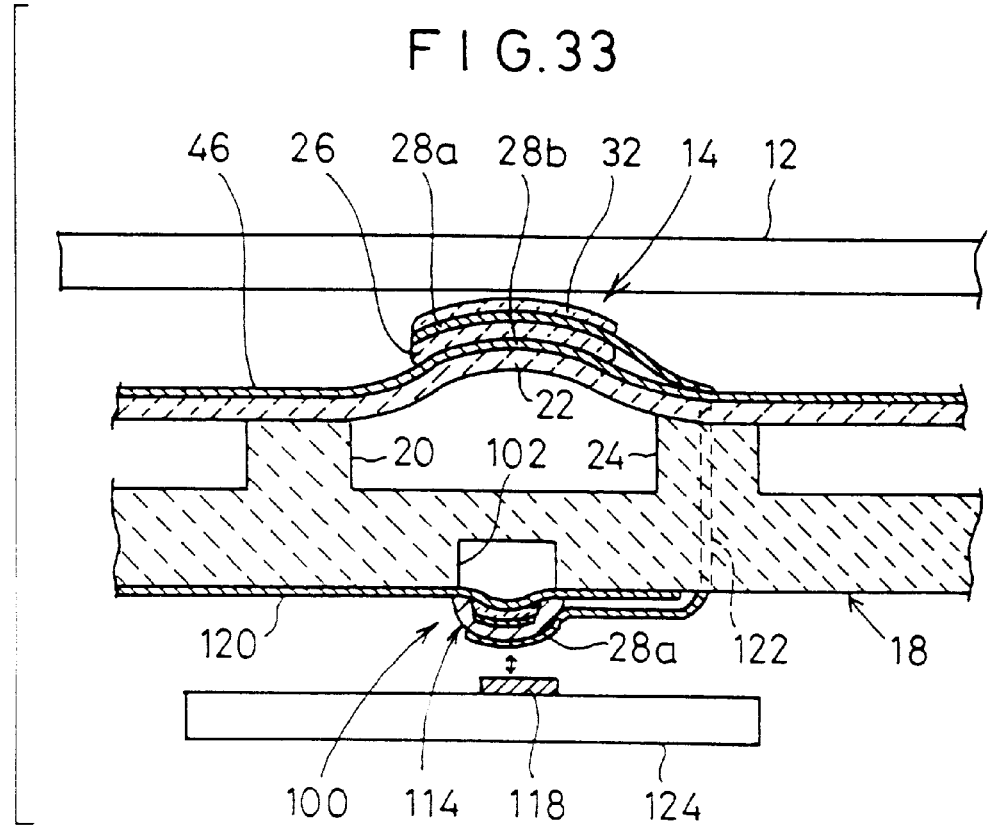
FIG. 33 is a view of another example of the display apparatus according to the third embodiment.

For example, as shown in FIG. 33, the actuator board 18 has a cavity 102 defined therein for providing the piezoelectric relay 100, below the cavity 20 for providing the actuator 14, and a relay assembly 114 is disposed underneath the cavity 102. Since the data line 48 cannot be shared, a new data line 120 for use in switching only is disposed on the rear surface of the actuator board 18. The upper electrode 28a on the piezoelectric relay 100 extends from the actuator 14 through a through hole 122 defined in the actuator board 18. The ground electrode 118 for selective contact with the upper electrode 28a is disposed on a printed wiring board 124 disposed below the actuator board 18.

The electrodes 28a, 28b are disposed on the shape holding layer 26, and may be arranged in an interdigitating pattern, a spiral pattern, or a multi-branch pattern, as with the display apparatus Da, Db according to the first and second embodiments.

Figure 34:
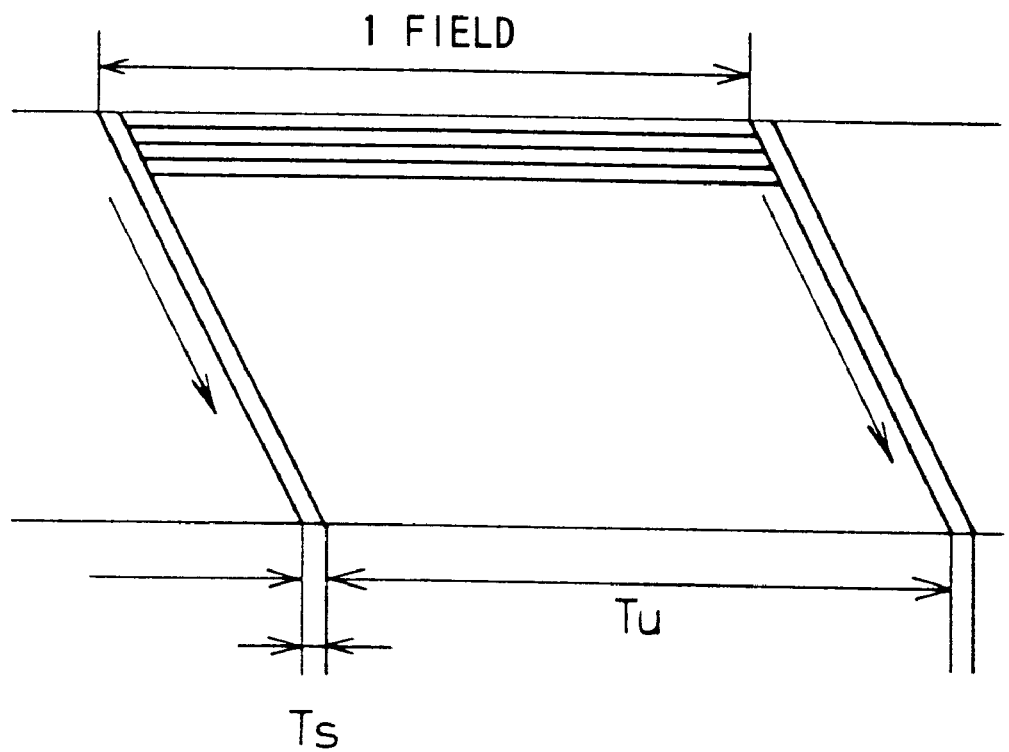
FIG. 34 is a view illustrative of the controlling of gradations which is carried out with one field not divided into a plurality of subfields.

In the display apparatus Da according to the first embodiment through the display apparatus Dc according to the third embodiment, one field is divided into a plurality of subfields, e.g., four subfields. However, as shown in FIG. 34, one field may not be divided into a plurality of subfields, but may be composed of a series of selected periods Ts and unselected periods Tu. In this case, gradations may be controlled according to a voltage control process, but not the time modulation process described above, for displaying images.

Figure 35:
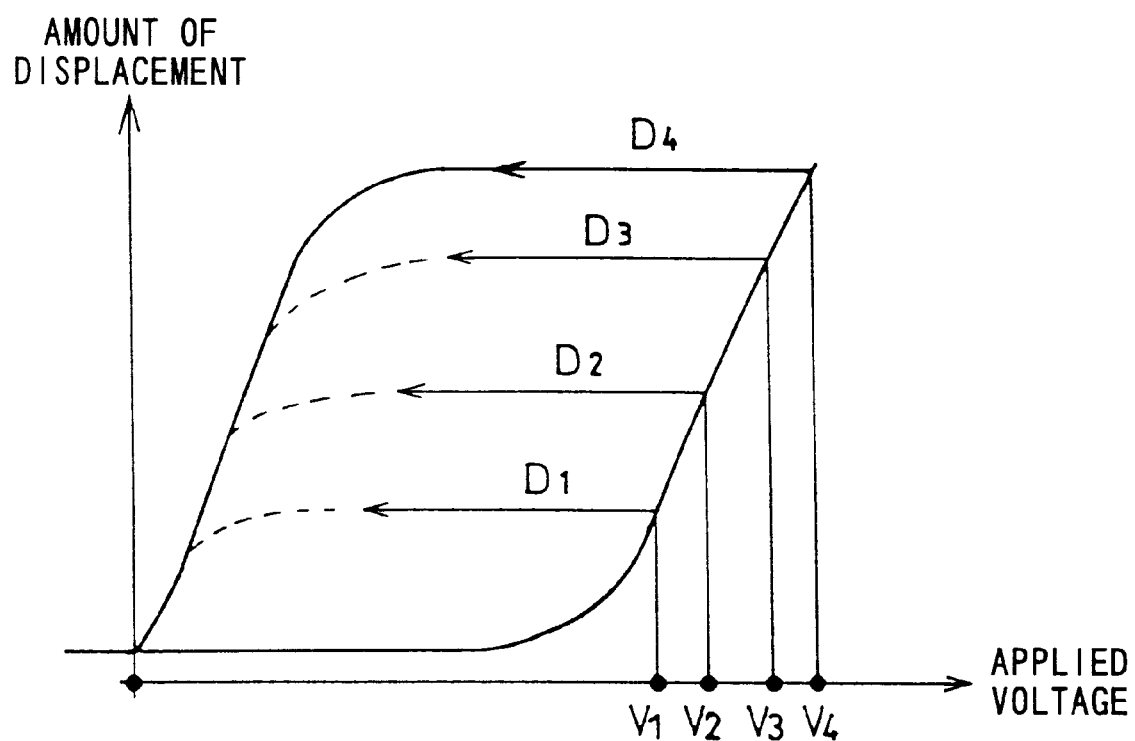
FIG. 35 is a diagram of displacement characteristics of an actuator, illustrative of the controlling of gradations according to a voltage control process.

As shown in FIG. 35, the voltage control process is based on the fact that the actuator 14 which as a shape holding function is displaced in an analog fashion depending on the level of an applied voltage. The controlling of gradations according to the voltage control process can be performed by dividing a voltage applied to a pixel into a plurality of voltages (equal voltages or arbitrary voltages) depending on the resolution of a gradation rendering, and applying a voltage depending on the gradation of the pixel to the actuator 14.

Figure 36:
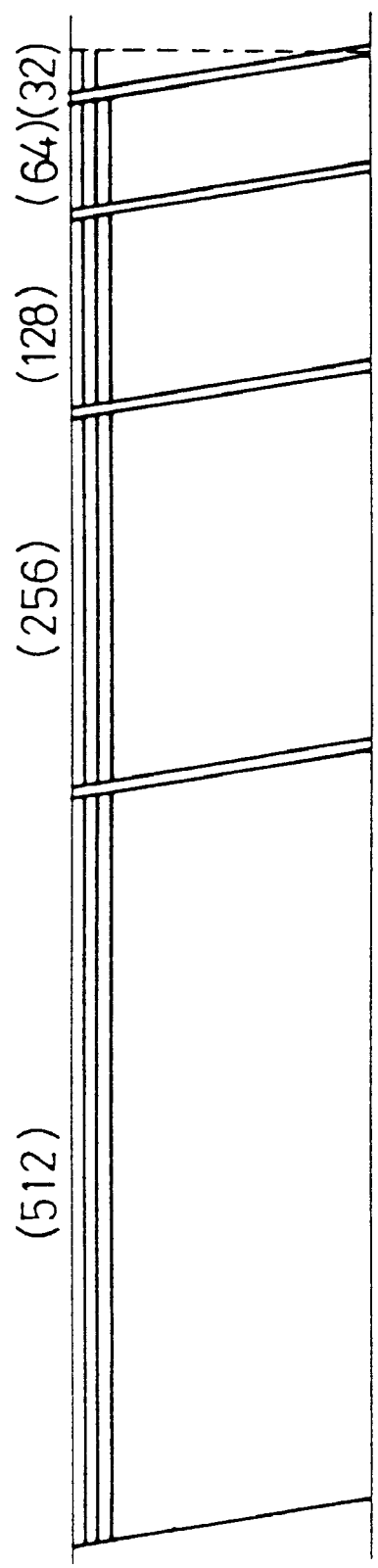
FIG. 36 is a diagram showing one field divided with an increased proportion of an effective display period, for the illustration of the controlling of gradations according to the voltage control process.

One field may be divided into a plurality of equal subfields as shown in FIG. 15, or may be divided with an increased proportion of the effective display period Td as shown in FIG. 36. The dividing process shown in FIG. 36 is advantageous for increasing luminance because the effective display period Td can be utilized maximally.

Features of the division into the equal subfields (see FIG. 15) will be described below in comparison with the division with an increased proportion of the effective display period Td (see FIG. 36). If one field is divided into equal subfields, then since the length of the effective display period Td is large, (1) the peak value of the current can be suppressed, lessening the burden on the circuit, (2) forces that are generated instantaneously are reduced, lowering a load on the structural body (actuator 14) for increased stability over a long period of time, and (3) variations in the response time of pixels are absorbed, reducing luminance variations.

If the selected periods Ts have the same length, then the number of rows that can be selected in one subfield is increased, and the number of rows to which signals can be inputted by the data line drive circuit 62 is increased. Therefore, the number of ICs used by the data line drive circuit 62 is reduced, resulting in a reduction in the cost.

Figure 37:
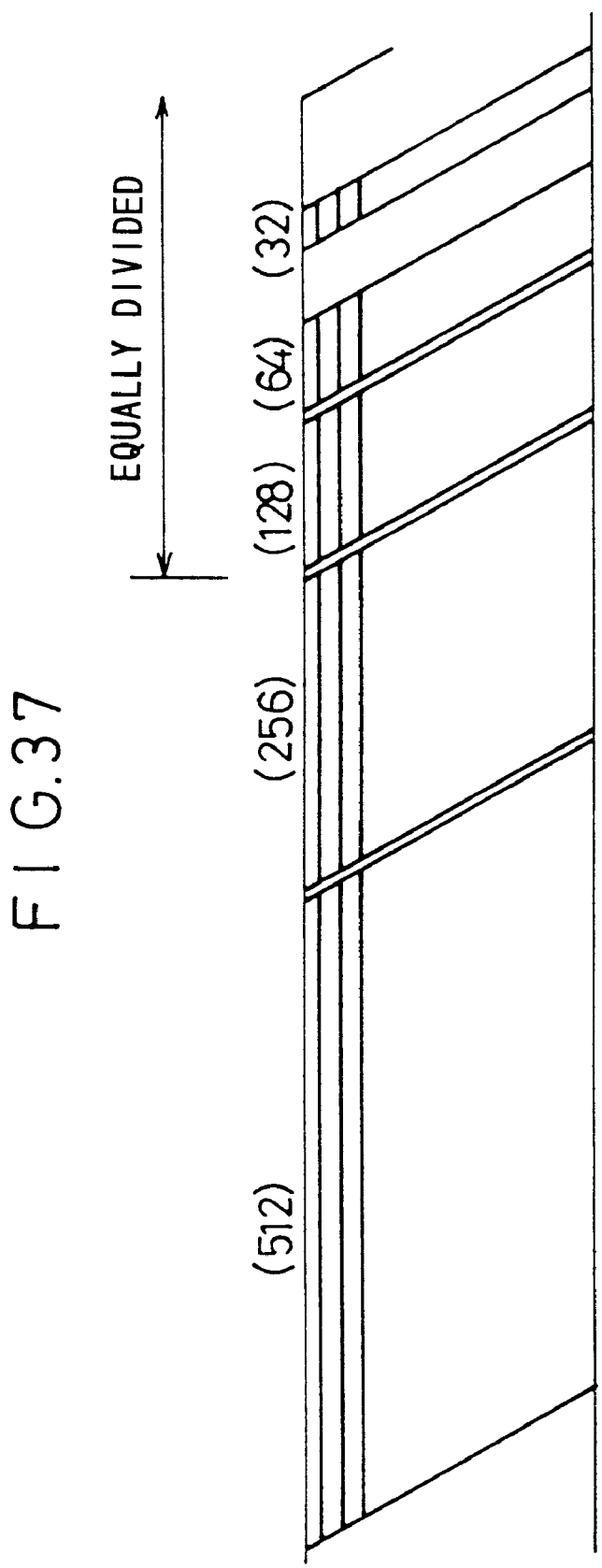
FIG. 37 is a diagram showing a former half of one field divided into a plurality of subfields with an increased proportion of an effective display period, and a latter half thereof divided into a plurality of substantially equal subfields, for the illustration of the controlling of gradations according to the voltage control process.

According to the present embodiment, as shown in FIG. 37, the division ratio can be determined in view of the above various features. For example, it is possible to divide a former half of one field into a plurality of subfields with an increased proportion of the effective display period Td, and to divide a latter half of one field into a plurality of substantially equal subfields. Since this example has the advantages of two dividing processes, it allows gradations to be controlled highly accurately for increased quality of reproduced images.

Figure 38:
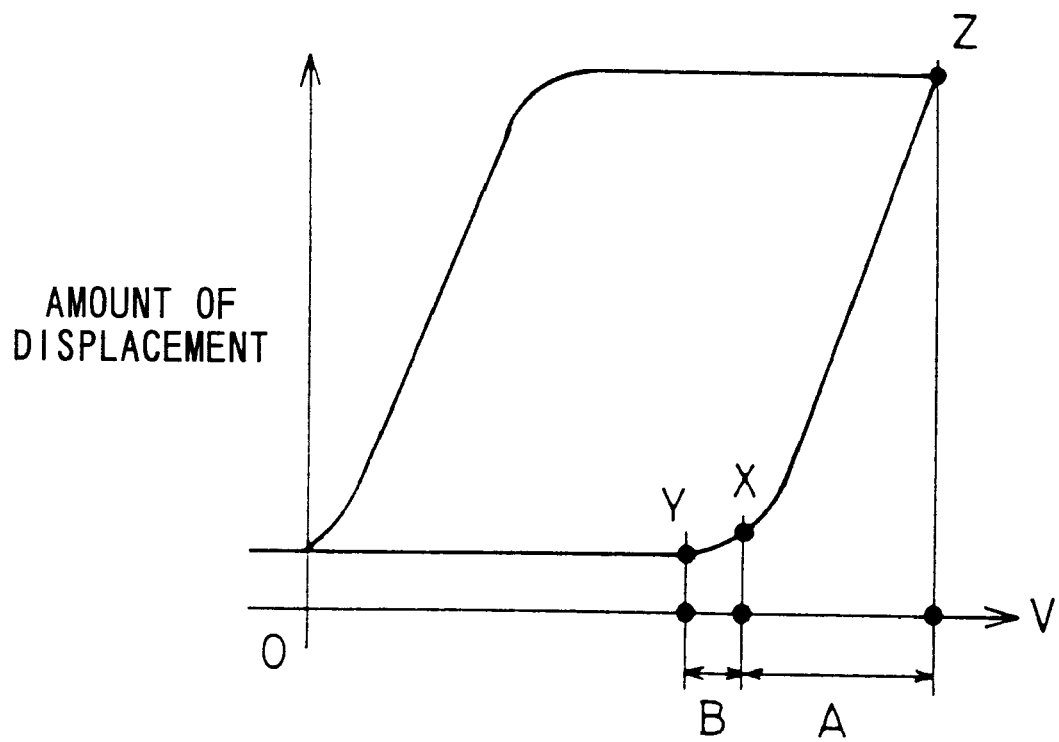
FIG. 38 is a diagram showing the relationship between the maximum value of a voltage applied to an unselected period, the maximum value of a voltage applied by an off signal in a selected period, and the maximum value of a voltage applied by an on signal in the selected period.
Figure 39:
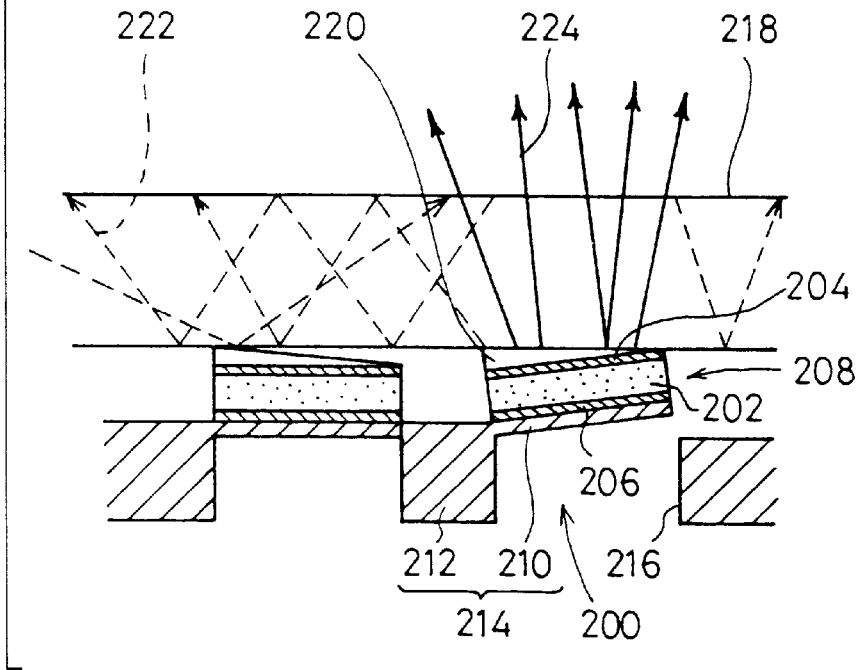
FIG. 39 is a fragmentary cross-sectional view of a display apparatus according to a proposed example.
Figure 40:
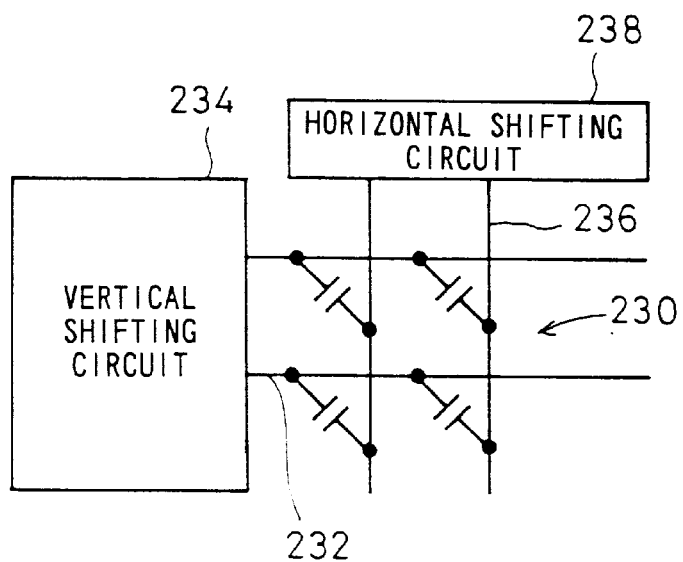
FIG. 40 is a block diagram of a peripheral circuit of the display apparatus according to the proposed example.
Figure 41:
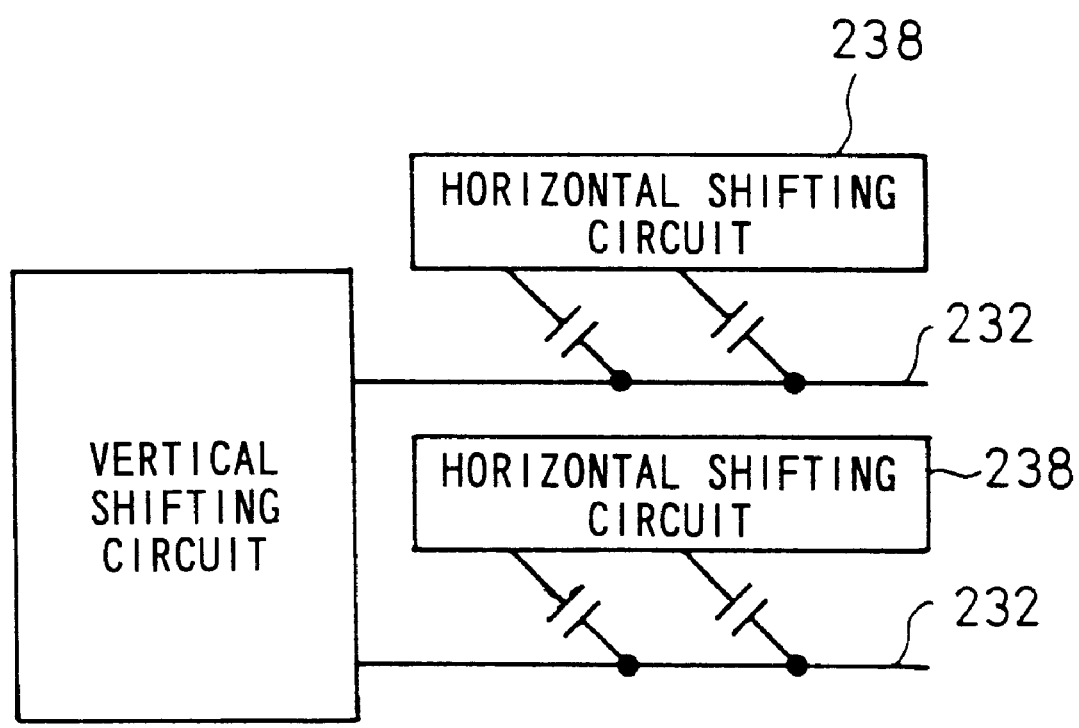
FIG. 41 is a block diagram of another peripheral circuit of the display apparatus according to the proposed example.

As shown in FIG. 38, furthermore, the absolute value (B) of the difference between the maximum value (Y) of a voltage applied to the actuator 14 of each pixel in the unselected period Tu and the maximum value (X) of a voltage applied to the actuator 14 by an off signal in the selected period Ts is 100% or less of the absolute value (A) of the difference between the maximum value (Z) of a voltage applied to the actuator 14 by an on signal in the selected period Ts and the maximum value (X) of a voltage applied to the actuator 14 by an off signal (B≦A). Preferably, B≦0.5 A, and more preferably, B≦0.3 A.

This is because the range of voltages for displacing the actuator 14 a large distance in the on state and displacing the actuator 14 a small distance in the off state can be used in the unselected period Tu. The absolute value A should preferably be set to 10 V or higher, and more preferably be set to 20 V or higher.

It is apparent that the display apparatus according to the present invention is not limited to the above embodiments, but may be of various arrangements without departing from the scope of the invention.

INDUSTRIAL APPLICABILITY

As described above, a display apparatus according to the present invention has a light guide plate for introducing light therein and a driver disposed in confronting relation to a surface of the light guide plate and having an array of as many actuators as the number of pixels, the actuators being controlled for displacement into and out of contact with the light guide plate depending on an attribute of an inputted image signal to control leakage light from the light guide plate in predetermined areas for thereby displaying an image depending on the image signal on the light guide plate, the driver having switching elements which correspond respectively to the actuators and can be turned on and off to control the displacement of the actuators.

The display apparatus has low electric energy consumption and higher raster luminance, and allows wires or interconnections to be formed with ease.

What is claimed is:

1. A display apparatus having a light guide plate for introducing light therein and a driver disposed in confronting relation to a surface of the light guide plate and having an array of as many actuators as the number of pixels, the actuators being controlled for displacement into and out of contact with the light guide plate depending on an attribute of an inputted image signal to control leakage light from the light guide plate in predetermined areas for thereby displaying an image depending on the image signal on the light guide plate, characterized in that:

said driver has switching elements corresponding respectively to said actuators; and said switching elements can be turned on and off to control the displacement of said actuators.

2. A display apparatus according to claim 1, wherein said driver has a board made of ceramics, said actuators being disposed on said board at positions aligned respectively with the pixels, said switching elements being disposed on said board.

3. A display apparatus according to claim 1 wherein each of said actuators comprises a shape holding layer, an operating unit disposed on said shape holding layer and having at least a pair of electrodes, a vibrator supporting said operating unit, and a mount member by which said vibrator is vibratingly supported, further comprising a displacement transfer unit for transferring the displacement of said actuator which is produced in response to the application of a voltage to said electrodes, to said light guide plate.

4. A display apparatus according to claim 1, further comprising:

a first drive circuit for selecting at least a row of said switching elements, a second drive circuit for outputting display information to the selected row of switching elements, and a signal control circuit for controlling said first drive circuit and said second drive circuit;

wherein said signal control circuit controls said first drive circuit and said second drive circuit to control gradations according to at least a time modulation process.

5. A display apparatus according to claim 4, wherein one image has a display period as one field, said display period having a selected period and an unselected period.

6. A display apparatus according to claim 4, wherein one image has a display period as one field, and said one field is divided into a plurality of subfields;

each of said subfields has a selected period and an unselected period; and each of said subfields is set to a time length depending on a unit gradation level assigned to the subfield.

7. A display apparatus according to claim 6, wherein said first drive circuit is controlled for timing by said signal control circuit to finish the selection of all rows in each of said subfields;

said second drive circuit is controlled for timing by said signal control circuit to output data signals, which are produced by assigning display times depending on gradation levels of the pixels of the selected row to the subfields, to the pixels of the selected row in the selecting period of each of said subfields.

8. A display apparatus according to claim 7, wherein at least a reset period for substantially eliminating displayed luminance is provided between said effective display period in a subfield and said effective display period in a next subfield.

9. A display apparatus according to claim 7, wherein a reset period and an unselected period for substantially eliminating displayed luminance are provided between said effective display period in a subfield and said effective display period in a next subfield.

10. A display apparatus according to claim 7, wherein a preparatory period for stabilizing the operation of the actuators is provided immediately before said selected period.

11. A display apparatus according to claim 7, wherein a preparatory period for stabilizing the operation of the actuators is provided in said selected period.

12. A display apparatus according to claim 4, wherein said first drive circuit is capable of establishing at least three voltage levels, and said second drive circuit is capable of establishing at least two voltage levels.

13. A display apparatus according to claim 12, wherein said first drive circuit outputs a selecting pulse signal in said selected period, outputs an unselecting signal in said unselected period, and outputs a resetting pulse signal in said reset period;

said second drive circuit outputs an on signal in the selected periods in effective display periods in assigned subfields of said subfields, and outputs an off signal in the selected periods in effective display periods in other subfields.

14. A display apparatus according to claim 13, wherein a voltage sufficient to flexurally displace the actuator of a pixel to be controlled is applied to said actuator in a period in which said on signal is outputted; and a voltage sufficient to return said actuator from the displacement is applied to said actuator in a period in which said resetting pulse signal is outputted.

15. A display apparatus according to claim 13, wherein the absolute value of the difference between the maximum value of a voltage applied to said actuator of each pixel in said unselected period and the maximum value of a voltage applied to said actuator of each pixel by an off signal in said selected period is 100% or less of the absolute value of the difference between the maximum value of a voltage applied to said actuator of each pixel by an on signal in said selected period and the maximum value of a voltage applied to said actuator of each pixel by an off signal in said selected period.

16. A display apparatus according to claim 13, wherein said first drive circuit outputs a selecting window pulse to apply the voltage sufficient to flexurally displace said actuator of a pixel to be controlled to said actuator in combination with said on signal in said selected period.

17. A display apparatus according to claim 13, wherein said first drive circuit outputs a resetting window pulse to apply the voltage sufficient to return said actuator of a pixel to be controlled from the displacement, to said actuator in said reset period.

18. A display apparatus according to claim 13, wherein said first drive circuit outputs an unselecting window pulse to reduce the difference between average voltages applied in the unselected period to the actuators of the pixels, in said unselected period.

19. A display apparatus according to claim 13, wherein phase information is added to at least said on signal to reduce the difference between average voltages applied in the unselected period to the actuators of the pixels.

20. A display apparatus according to claim 19, wherein phase information is added to said selecting pulse signal and said on signal and/or said off signal.

21. A display apparatus according to claim 19, wherein phase information is added to said resetting signal.

22. A display apparatus according to claim 19, wherein said on signal and said off signal have a pulse duration smaller than an addressing time in said first drive circuit and are out of phase with each other by a predetermined angle.

23. A display apparatus according to claim 13, wherein at least either one of said on signal and said off signal has a pulse period which is 1/n (n is a real number ranging from 1 to 5) of said addressing time.

24. A display apparatus according to claim 1, wherein each of said switching elements comprises a transistor.

25. A display apparatus according to claim 1, wherein each of said switching elements comprises a piezoelectric relay.

26. A display apparatus having a light guide plate for introducing light therein and a driver disposed in confronting relation to a surface of the light guide plate and having an array of as many actuators as the number of pixels, the actuators being controlled for displacement into and out of contact with the light guide plate depending on an attribute of an inputted image signal to control leakage light from the light guide plate in predetermined areas for thereby displaying an image depending on the image signal on the light guide plate, characterized in that:

said driver has switching elements corresponding respectively to said actuators;

each of said switching elements comprises a varistor; and said switching elements can be turned on and off to control the displacement of said actuators.

27. A display apparatus according to claim 26, wherein said driver has a board made of ceramics, said actuators being disposed on said board at positions aligned respectively with the pixels, said switching elements being disposed on said board.

28. A display apparatus according to claim 26, wherein each of said actuators comprises a shape holding layer, an operating unit disposed on said shape holding layer and having at least a pair of electrodes, a vibrator supporting said operating unit, and a mount member by which said vibrator is vibratingly supported, further comprising a displacement transfer unit for transferring the displacement of said actuator, which is produced in response to the application of a voltage to said electrodes, to said light guide plate.

29. A display apparatus according to claim 26, further comprising:

a first drive circuit for selecting at least a row of said switching elements, a second drive circuit for outputting display information to the selected row of switching elements, and a signal control circuit for controlling said first drive circuit and said second drive circuit;

wherein said signal control circuit controls said first drive circuit and said second drive circuit to control gradations according to at least a time modulation process.

30. A display apparatus according to claim 29, wherein one image has a display period as one field, said display period having a selected period and an unselected period.

31. A display apparatus according to claim 29, wherein one image has a display period as one field, and said one field is divided into a plurality of subfields;

each of said subfields has a selected period and an unselected period; and each of said subfields is set to a time length depending on a unit gradation level assigned to the subfield.

32. A display apparatus according to claim 31, wherein said first drive circuit is controlled for timing by said signal control circuit to finish the selection of all rows in each of said subfields;

said second drive circuit is controlled for timing by said signal control circuit to output data signals, which are produced by assigning display times depending on gradation levels of the pixels of the selected row to the subfields, to the pixels of the selected row in the selecting period of each of said subfields.

33. A display apparatus according to claim 32, wherein at least a reset period for substantially eliminating displayed luminance is provided between said effective display period in a subfield and said effective display period in a next subfield.

34. A display apparatus according to claim 32, wherein a reset period and an unselected period for substantially eliminating displayed luminance are provided between said effective display period in a subfield and said effective display period in a next subfield.

35. A display apparatus according to claim 32, wherein a preparatory period for stabilizing the operation of the actuators is provided immediately before said selected period.

36. A display apparatus according to claim 32, wherein a preparatory period for stabilizing the operation of the actuators is provided in said selected period.

37. A display apparatus according to claim 29, wherein said first drive circuit is capable of establishing at least three voltage levels, and said second drive circuit is capable of establishing at least two voltage levels.

38. A display apparatus according to claim 33, wherein said first drive circuit outputs a selecting pulse signal in said selected period, outputs an unselecting signal in said unselected period, and outputs a resetting pulse signal in said reset period;

said second drive circuit outputs an on signal in the selected periods in effective display periods in assigned subfields of said subfields, and outputs an off signal in the selected periods in effective display periods in other subfields.

39. A display apparatus according to claim 38, wherein a voltage sufficient to flexurally displace the actuator of a pixel to be controlled is applied to said actuator in a period in which said on signal is outputted; and a voltage sufficient to return said actuator from the displacement is applied to said actuator in a period in which said resetting pulse signal is outputted.

40. A display apparatus according to claim 38, wherein the absolute value of the difference between the maximum value of a voltage applied to said actuator of each pixel in said unselected period and the maximum value of a voltage applied to said actuator of each pixel by an off signal in said selected period is 100% or less of the absolute value of the difference between the maximum value of a voltage applied to said actuator of each pixel by an on signal in said selected period and the maximum value of a voltage applied to said actuator of each pixel by an off signal in said selected period.

41. A display apparatus according to claim 38, wherein said first drive circuit outputs a selecting window pulse to apply the voltage sufficient to flexurally displace said actuator of a pixel to be controlled to said actuator in combination with said on signal in said selected period.

42. A display apparatus according to claim 38, wherein said first drive circuit outputs a resetting window pulse to apply the voltage sufficient to return said actuator of a pixel to be controlled from the displacement, to said actuator in said reset period.

43. A display apparatus according to claim 38, wherein said first drive circuit outputs an unselecting window pulse to reduce the difference between average voltages applied in the unselected period to the actuators of the pixels, in said unselected period.

44. A display apparatus according to claim 38, wherein phase information is added to at least said on signal to reduce the difference between average voltages applied in the unselected period to the actuators of the pixels.

45. A display apparatus according to claim 44, wherein phase information is added to said selecting pulse signal and said on signal and/or said off signal.

46. A display apparatus according to claim 44, wherein phase information is added to said resetting signal.

47. A display apparatus according to claim 44, wherein said on signal and said off signal have a pulse duration smaller than an addressing time in said first drive circuit and are out of phase with each other by a predetermined angle.

48. A display apparatus according to claim 38, wherein at least either one of said on signal and said off signal has a pulse period which is 1/n (n is a real number ranging from 1 to 5) of said addressing time.

49. A display apparatus according to claim 26, wherein said varistor has an off resistance established such that a variation in a voltage applied to said actuator due to a discharge in the unselected period is kept within 5%; and said varistor has an on resistance established such that a voltage applied to said actuator increases to 95% in an effective selected period.

* * * * *